US008606383B2

(12) United States Patent
Jung et al.

(10) Patent No.: US 8,606,383 B2
(45) Date of Patent: Dec. 10, 2013

(54) AUDIO SHARING

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 485 days.

(21) Appl. No.: 12/799,398

(22) Filed: Apr. 23, 2010

(65) Prior Publication Data

US 2010/0235466 A1    Sep. 16, 2010

Related U.S. Application Data

(63) Continuation of application No. 11/210,284, filed on Aug. 23, 2005, now abandoned.

(51) Int. Cl.
*G06F 17/00* (2006.01)
*G06F 15/16* (2006.01)
*G06F 3/16* (2006.01)

(52) U.S. Cl.
USPC .............................. 700/94; 709/230; 709/231

(58) Field of Classification Search
USPC .............. 700/94; 709/230–232; 369/47.12, 86
See application file for complete search history.

(56) References Cited

U.S. PATENT DOCUMENTS

| 4,124,871 A | 11/1978 | Morrin, II |
| 4,249,218 A | 2/1981 | Davis et al. |
| 4,747,143 A | 5/1988 | Kroeger et al. |
| 5,164,831 A | 11/1992 | Kuchta et al. |
| 5,341,192 A | 8/1994 | Wally, Jr. et al. |
| 5,388,197 A | 2/1995 | Rayner |
| 5,410,343 A | 4/1995 | Coddington et al. |
| 5,418,565 A | 5/1995 | Smith |
| 5,467,288 A | 11/1995 | Faciano et al. |
| 5,477,546 A | 12/1995 | Shibata et al. |

(Continued)

FOREIGN PATENT DOCUMENTS

| JP | 5064225 | 3/1993 |
| JP | H09-018762 | 1/1997 |

(Continued)

OTHER PUBLICATIONS

CG.ITS.TUDELFT.NL, Delft University of Technology; "Shared cameras"; 1 page; located at http://www.cg.its.tudelft.nl/~spiff/descSC.html; printed on Mar. 21, 2011.

(Continued)

*Primary Examiner* — Jesse Elbin

(57) ABSTRACT

One aspect of the disclosure relates to obtaining at least some audio information, at least partially at a shared audio device. The aspect of the disclosure also relates to temporally coordinating transmitting at the shared audio device the at least some audio information and at least some temporally-associated dissimilar-media information that can be received by at least one other shared audio device such that corresponding segments of the at least some audio information can be received at the at least one other shared audio device substantially temporally corresponding to when corresponding segments of the at least some temporally-associated dissimilar-media information can be received at the at least one other shared audio device.

22 Claims, 25 Drawing Sheets

(56) References Cited

U.S. PATENT DOCUMENTS

| | | |
|---|---|---|
| 5,546,145 A | 8/1996 | Bernardi et al. |
| 5,561,883 A | 10/1996 | Landry et al. |
| 5,588,029 A | 12/1996 | Maturi et al. |
| 5,612,715 A | 3/1997 | Karaki et al. |
| 5,629,778 A | 5/1997 | Reuman |
| 5,633,678 A | 5/1997 | Parulski et al. |
| 5,655,144 A | 8/1997 | Milne et al. |
| 5,659,662 A | 8/1997 | Wilcox et al. |
| 5,675,789 A | 10/1997 | Ishii et al. |
| 5,689,343 A | 11/1997 | Loce et al. |
| 5,689,442 A | 11/1997 | Swanson et al. |
| 5,701,163 A | 12/1997 | Richards et al. |
| 5,738,522 A | 4/1998 | Sussholz et al. |
| 5,751,338 A | 5/1998 | Ludwig, Jr. |
| 5,764,800 A | 6/1998 | Yamagata |
| 5,793,630 A | 8/1998 | Theimer et al. |
| 5,796,879 A | 8/1998 | Wong et al. |
| 5,806,005 A | 9/1998 | Hull et al. |
| 5,809,161 A | 9/1998 | Auty et al. |
| 5,822,440 A | 10/1998 | Oltman et al. |
| 5,825,506 A | 10/1998 | Bednar et al. |
| 5,845,166 A | 12/1998 | Fellegara et al. |
| 5,889,895 A | 3/1999 | Wong et al. |
| 5,892,509 A | 4/1999 | Jakobs et al. |
| 5,917,958 A | 6/1999 | Nunally et al. |
| 5,917,962 A | 6/1999 | Chen et al. |
| 5,926,605 A | 7/1999 | Ichimura |
| 5,949,484 A | 9/1999 | Nakaya et al. |
| 5,956,081 A | 9/1999 | Katz et al. |
| 5,959,622 A | 9/1999 | Greer et al. |
| 5,977,867 A | 11/1999 | Blouin |
| 5,995,095 A | 11/1999 | Ratakonda |
| 5,999,214 A | 12/1999 | Inagaki |
| 6,028,585 A | 2/2000 | Ishii et al. |
| 6,034,786 A | 3/2000 | Kwon |
| 6,035,323 A | 3/2000 | Narayen et al. |
| 6,092,670 A | 7/2000 | Marriott |
| 6,115,341 A | 9/2000 | Hirai |
| 6,122,003 A | 9/2000 | Anderson |
| 6,134,345 A | 10/2000 | Berman et al. |
| 6,157,406 A | 12/2000 | Iura et al. |
| 6,157,935 A | 12/2000 | Tran et al. |
| 6,167,350 A | 12/2000 | Hiramatsu et al. |
| 6,167,469 A | 12/2000 | Safai et al. |
| 6,188,383 B1 | 2/2001 | Tamura |
| 6,188,431 B1 | 2/2001 | Oie |
| 6,198,526 B1 | 3/2001 | Ohtsuka |
| 6,204,877 B1 | 3/2001 | Kiyokawa |
| 6,226,672 B1 * | 5/2001 | DeMartin et al. ............ 369/85 |
| 6,229,565 B1 | 5/2001 | Bobry |
| 6,285,794 B1 | 9/2001 | Georgiev et al. |
| 6,332,139 B1 | 12/2001 | Kaneko et al. |
| 6,332,666 B1 | 12/2001 | Ikeda |
| 6,333,792 B1 | 12/2001 | Kimura |
| 6,342,887 B1 | 1/2002 | Munroe |
| 6,356,868 B1 | 3/2002 | Yuschik et al. |
| 6,359,649 B1 | 3/2002 | Suzuki |
| 6,366,577 B1 | 4/2002 | Donovan |
| 6,380,972 B1 | 4/2002 | Suga et al. |
| 6,384,862 B1 | 5/2002 | Brusewitz et al. |
| 6,400,848 B1 | 6/2002 | Gallagher |
| 6,433,818 B1 | 8/2002 | Steinberg et al. |
| 6,445,822 B1 | 9/2002 | Crill et al. |
| 6,446,095 B1 | 9/2002 | Mukai |
| 6,452,974 B1 | 9/2002 | Menon et al. |
| 6,456,339 B1 | 9/2002 | Surati et al. |
| 6,459,823 B2 | 10/2002 | Altunbasak et al. |
| 6,466,253 B1 | 10/2002 | Honjoh |
| 6,466,264 B1 | 10/2002 | Shioji |
| 6,493,028 B1 | 12/2002 | Anderson et al. |
| 6,509,931 B1 | 1/2003 | Mizosoe et al. |
| 6,512,541 B2 | 1/2003 | Dunton et al. |
| 6,515,704 B1 | 2/2003 | Sato |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,535,228 B1 | 3/2003 | Bandaru et al. |
| 6,538,692 B2 | 3/2003 | Niwa |
| 6,539,169 B1 | 3/2003 | Tsubaki et al. |
| 6,542,183 B1 | 4/2003 | DeAngelis et al. |
| 6,546,189 B1 | 4/2003 | Koda |
| 6,567,122 B1 | 5/2003 | Anderson et al. |
| 6,573,927 B2 | 6/2003 | Parulski et al. |
| 6,577,311 B1 | 6/2003 | Crosby et al. |
| 6,577,336 B2 | 6/2003 | Safai |
| 6,583,813 B1 | 6/2003 | Enright et al. |
| 6,587,602 B2 | 7/2003 | Wakisawa et al. |
| 6,611,293 B2 | 8/2003 | Tarnoff et al. |
| 6,650,366 B2 | 11/2003 | Parulski et al. |
| 6,650,704 B1 | 11/2003 | Carlson et al. |
| 6,654,543 B2 | 11/2003 | Ando et al. |
| 6,657,667 B1 | 12/2003 | Anderson |
| 6,678,413 B1 | 1/2004 | Liang et al. |
| 6,687,877 B1 | 2/2004 | Sastry et al. |
| 6,698,021 B1 | 2/2004 | Amini et al. |
| 6,701,058 B1 | 3/2004 | Tsubaki |
| 6,701,845 B2 | 3/2004 | Ohmura |
| 6,710,809 B1 | 3/2004 | Niikawa |
| 6,728,729 B1 * | 4/2004 | Jawa et al. ............ 707/999.003 |
| 6,734,911 B1 | 5/2004 | Lyons |
| 6,735,253 B1 | 5/2004 | Chang et al. |
| 6,738,155 B1 | 5/2004 | Rosenlund et al. |
| 6,741,271 B1 | 5/2004 | McConica et al. |
| 6,750,902 B1 | 6/2004 | Steinberg et al. |
| 6,757,008 B1 | 6/2004 | Smith |
| 6,757,431 B2 | 6/2004 | Loce et al. |
| 6,762,791 B1 | 7/2004 | Schuetzle |
| 6,766,036 B1 | 7/2004 | Pryor |
| 6,774,935 B1 | 8/2004 | Morimoto et al. |
| 6,775,406 B1 | 8/2004 | Watson |
| 6,801,719 B1 | 10/2004 | Szajewski et al. |
| 6,809,759 B1 | 10/2004 | Chiang |
| 6,813,312 B2 | 11/2004 | Tullberg et al. |
| 6,816,071 B2 | 11/2004 | Conti |
| 6,822,660 B2 | 11/2004 | Kim |
| 6,823,092 B1 | 11/2004 | Sato |
| 6,832,009 B1 | 12/2004 | Shezaf et al. |
| 6,864,911 B1 | 3/2005 | Zhang et al. |
| 6,871,010 B1 | 3/2005 | Taguchi et al. |
| 6,876,393 B1 | 4/2005 | Yokonuma |
| 6,885,395 B1 | 4/2005 | Rabbani et al. |
| 6,922,258 B2 | 7/2005 | Pineau |
| 6,930,707 B2 | 8/2005 | Bates et al. |
| 6,940,543 B2 | 9/2005 | Perotti et al. |
| 6,947,075 B1 | 9/2005 | Niikawa |
| 6,961,083 B2 | 11/2005 | Obrador et al. |
| 6,967,675 B1 | 11/2005 | Ito et al. |
| 6,978,311 B1 | 12/2005 | Netzer et al. |
| 6,992,711 B2 | 1/2006 | Kubo |
| 6,999,626 B2 | 2/2006 | Andrew |
| 7,015,949 B1 | 3/2006 | Sah |
| 7,015,954 B1 | 3/2006 | Foote et al. |
| 7,023,469 B1 | 4/2006 | Olson |
| 7,027,084 B1 | 4/2006 | Watanabe |
| 7,031,700 B1 | 4/2006 | Weaver et al. |
| 7,046,273 B2 | 5/2006 | Suzuki |
| 7,046,292 B2 | 5/2006 | Ziemkowski |
| 7,065,418 B2 | 6/2006 | Standard et al. |
| 7,068,316 B1 | 6/2006 | Pine |
| 7,075,567 B2 | 7/2006 | Hunter et al. |
| 7,079,176 B1 | 7/2006 | Freeman et al. |
| 7,084,910 B2 | 8/2006 | Amerson et al. |
| 7,110,025 B1 | 9/2006 | Loui et al. |
| 7,123,292 B1 | 10/2006 | Seeger et al. |
| 7,123,935 B2 | 10/2006 | Takahashi |
| 7,136,094 B2 | 11/2006 | Ziemkowski |
| 7,139,018 B2 | 11/2006 | Grosvenor et al. |
| 7,154,535 B2 | 12/2006 | Yamasaki et al. |
| 7,158,175 B2 | 1/2007 | Belz et al. |
| 7,161,619 B1 | 1/2007 | Niida et al. |
| 7,196,317 B1 | 3/2007 | Meissner, II et al. |
| 7,219,365 B2 | 5/2007 | Sato et al. |
| 7,221,863 B2 | 5/2007 | Kondo et al. |
| 7,227,569 B2 | 6/2007 | Maruya |

(56) References Cited

U.S. PATENT DOCUMENTS

| | | |
|---|---|---|
| 7,257,317 B2 | 8/2007 | Ohnishi |
| 7,287,088 B1 | 10/2007 | Anderson |
| 7,292,229 B2 | 11/2007 | Morag et al. |
| 7,327,385 B2 | 2/2008 | Yamaguchi |
| 7,333,134 B2 | 2/2008 | Miyamoto |
| 7,339,623 B2 | 3/2008 | Kawai |
| 7,340,766 B2 | 3/2008 | Nagao et al. |
| 7,362,968 B2 | 4/2008 | Kim |
| 7,366,979 B2 | 4/2008 | Spielberg et al. |
| 7,379,116 B2 | 5/2008 | Okamura |
| 7,411,623 B2 | 8/2008 | Shibutani |
| 7,417,667 B2 | 8/2008 | Shibutani |
| 7,448,063 B2 | 11/2008 | Freeman et al. |
| 7,460,781 B2 | 12/2008 | Kanai et al. |
| 7,463,216 B2 | 12/2008 | Yamazaki et al. |
| 7,474,338 B2 | 1/2009 | Sato |
| 7,477,296 B2 | 1/2009 | Okumura |
| 7,499,084 B2 | 3/2009 | Kurakata |
| 7,511,737 B2 | 3/2009 | Singh |
| 7,535,491 B1 | 5/2009 | Kumagai et al. |
| 7,542,183 B2 | 6/2009 | Satoh et al. |
| 7,576,770 B2 | 8/2009 | Metzger et al. |
| 7,602,419 B2 | 10/2009 | Kiuchi |
| 7,711,443 B1 | 5/2010 | Sanders et al. |
| 7,782,365 B2 | 8/2010 | Levien et al. |
| 7,840,892 B2 | 11/2010 | Pyhälammi et al. |
| 7,860,319 B2 | 12/2010 | Obrador et al. |
| 8,026,944 B1 | 9/2011 | Sah |
| 2001/0015759 A1 | 8/2001 | Squibbs |
| 2001/0028398 A1 | 10/2001 | Takahashi |
| 2001/0029521 A1 | 10/2001 | Matsuda et al. |
| 2001/0030709 A1 | 10/2001 | Tarnoff et al. |
| 2001/0031005 A1 | 10/2001 | Nister et al. |
| 2001/0032335 A1 | 10/2001 | Jones |
| 2001/0033333 A1 | 10/2001 | Suzuki et al. |
| 2001/0042043 A1 | 11/2001 | Shear et al. |
| 2001/0044858 A1 | 11/2001 | Rekimoto |
| 2001/0050875 A1 | 12/2001 | Kahn et al. |
| 2001/0052083 A1 | 12/2001 | Willins et al. |
| 2002/0006786 A1 | 1/2002 | Mine |
| 2002/0014954 A1 | 2/2002 | Fitzgibbon et al. |
| 2002/0015094 A1 | 2/2002 | Kuwano et al. |
| 2002/0018137 A1 | 2/2002 | Tsuda |
| 2002/0021359 A1 | 2/2002 | Okamoto |
| 2002/0024607 A1 | 2/2002 | Suga et al. |
| 2002/0028026 A1 | 3/2002 | Chen et al. |
| 2002/0028060 A1 | 3/2002 | Murata et al. |
| 2002/0030749 A1 | 3/2002 | Nakamura et al. |
| 2002/0054232 A1 | 5/2002 | Inagaki |
| 2002/0090217 A1 | 7/2002 | Limor et al. |
| 2002/0093575 A1 | 7/2002 | Kusaka |
| 2002/0103813 A1 | 8/2002 | Frigon |
| 2002/0118958 A1 | 8/2002 | Ishikawa et al. |
| 2002/0122194 A1 | 9/2002 | Kuwata et al. |
| 2002/0137529 A1 | 9/2002 | Takahashi |
| 2002/0149677 A1 | 10/2002 | Wright |
| 2002/0171737 A1 | 11/2002 | Tullis |
| 2002/0171747 A1 | 11/2002 | Niikawa et al. |
| 2002/0176016 A1 | 11/2002 | Misawa et al. |
| 2002/0176508 A1 | 11/2002 | Boyce et al. |
| 2002/0191079 A1 | 12/2002 | Kobayashi et al. |
| 2002/0196329 A1 | 12/2002 | Dudkowski |
| 2002/0196344 A1 | 12/2002 | McIntyre et al. |
| 2002/0197067 A1 | 12/2002 | Ohnishi |
| 2003/0007078 A1 | 1/2003 | Feldis, III |
| 2003/0016289 A1 | 1/2003 | Motomura |
| 2003/0018802 A1 | 1/2003 | Romanik et al. |
| 2003/0020814 A1 | 1/2003 | Ono |
| 2003/0021455 A1 | 1/2003 | Dixon et al. |
| 2003/0021591 A1 | 1/2003 | Grosvenor et al. |
| 2003/0025800 A1 | 2/2003 | Hunter et al. |
| 2003/0030731 A1 | 2/2003 | Colby |
| 2003/0037111 A1 | 2/2003 | Yoshioka |
| 2003/0039380 A1 | 2/2003 | Sukegawa et al. |
| 2003/0063211 A1 | 4/2003 | Watanabe et al. |
| 2003/0069898 A1 | 4/2003 | Christodoulou et al. |
| 2003/0072491 A1 | 4/2003 | Sirivara et al. |
| 2003/0081140 A1 | 5/2003 | Furukawa |
| 2003/0090690 A1 | 5/2003 | Katayama et al. |
| 2003/0095191 A1 | 5/2003 | Saito |
| 2003/0103144 A1 | 6/2003 | Sesek et al. |
| 2003/0112354 A1 | 6/2003 | Ortiz et al. |
| 2003/0113014 A1 | 6/2003 | Katoh |
| 2003/0117505 A1 | 6/2003 | Sasaki et al. |
| 2003/0117642 A1 | 6/2003 | Haraguchi |
| 2003/0122940 A1 | 7/2003 | Myojo |
| 2003/0123078 A1 | 7/2003 | Kazami |
| 2003/0128272 A1 | 7/2003 | Clough et al. |
| 2003/0131002 A1 | 7/2003 | Gennetten et al. |
| 2003/0151679 A1 | 8/2003 | Amerson et al. |
| 2003/0152263 A1 | 8/2003 | Kawano et al. |
| 2003/0160870 A1 | 8/2003 | Ziemkowski |
| 2003/0162556 A1 | 8/2003 | Libes |
| 2003/0189654 A1 | 10/2003 | Kage et al. |
| 2003/0206232 A1 | 11/2003 | Suzuki et al. |
| 2003/0222998 A1 | 12/2003 | Yamauchi et al. |
| 2003/0234953 A1 | 12/2003 | Dawson et al. |
| 2003/0236831 A1 | 12/2003 | Ortiz et al. |
| 2003/0236832 A1 | 12/2003 | McIntyre et al. |
| 2004/0001145 A1 | 1/2004 | Abbate |
| 2004/0008258 A1 | 1/2004 | Aas et al. |
| 2004/0012686 A1 | 1/2004 | Ono et al. |
| 2004/0017333 A1 | 1/2004 | Cooper et al. |
| 2004/0032517 A1 | 2/2004 | Walmsley et al. |
| 2004/0037540 A1 | 2/2004 | Frohlich et al. |
| 2004/0042679 A1 | 3/2004 | Yamada |
| 2004/0046885 A1 | 3/2004 | Regan et al. |
| 2004/0056960 A1 | 3/2004 | Hayashi |
| 2004/0061782 A1 | 4/2004 | Kinjo |
| 2004/0062439 A1 | 4/2004 | Cahill et al. |
| 2004/0066968 A1 | 4/2004 | Glickman |
| 2004/0070586 A1 | 4/2004 | Taubin |
| 2004/0070678 A1 | 4/2004 | Toyama et al. |
| 2004/0071445 A1 | 4/2004 | Tarnoff et al. |
| 2004/0075750 A1 | 4/2004 | Bateman |
| 2004/0080653 A1 | 4/2004 | Tanaka et al. |
| 2004/0080661 A1 | 4/2004 | Afsenius et al. |
| 2004/0085456 A1 | 5/2004 | Kwag et al. |
| 2004/0090525 A1 | 5/2004 | Eichmann |
| 2004/0095480 A1 | 5/2004 | Battles et al. |
| 2004/0105015 A1 | 6/2004 | Tsukioka |
| 2004/0119841 A1 | 6/2004 | Shimizu |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0131282 A1 | 7/2004 | Yoshida et al. |
| 2004/0141056 A1 | 7/2004 | Izumi et al. |
| 2004/0145501 A1 | 7/2004 | Hung |
| 2004/0150641 A1 | 8/2004 | Duiker |
| 2004/0150724 A1 | 8/2004 | Nozaki et al. |
| 2004/0160453 A1 | 8/2004 | Horton et al. |
| 2004/0166930 A1 | 8/2004 | Beaulieu et al. |
| 2004/0172440 A1 | 9/2004 | Nakajima et al. |
| 2004/0174434 A1 | 9/2004 | Walker et al. |
| 2004/0174454 A1 | 9/2004 | Okamura |
| 2004/0179121 A1 | 9/2004 | Silverstein |
| 2004/0183903 A1 | 9/2004 | Pedersen |
| 2004/0187583 A1 | 9/2004 | Ogawa |
| 2004/0196388 A1 | 10/2004 | Kaku |
| 2004/0201687 A1 | 10/2004 | Perotti et al. |
| 2004/0201690 A1 | 10/2004 | Bryant et al. |
| 2004/0201709 A1 | 10/2004 | McIntyre et al. |
| 2004/0221063 A1 | 11/2004 | Mogul |
| 2004/0233308 A1 | 11/2004 | Elliott et al. |
| 2004/0239958 A1 | 12/2004 | Nagata et al. |
| 2004/0252193 A1 | 12/2004 | Higgins |
| 2004/0252230 A1 | 12/2004 | Winder |
| 2004/0253990 A1 | 12/2004 | McCoog et al. |
| 2004/0257462 A1 | 12/2004 | Goris et al. |
| 2004/0263634 A1 | 12/2004 | Kiuchi |
| 2004/0263658 A1 | 12/2004 | Cozier et al. |
| 2005/0007471 A1 | 1/2005 | Walmsley et al. |
| 2005/0010407 A1 | 1/2005 | Jaroker |
| 2005/0013602 A1 | 1/2005 | Ogawa |

(56) References Cited

U.S. PATENT DOCUMENTS

| | | |
|---|---|---|
| 2005/0013604 A1 | 1/2005 | Ogawa |
| 2005/0018053 A1 | 1/2005 | Suga et al. |
| 2005/0028221 A1 | 2/2005 | Liu et al. |
| 2005/0033760 A1 | 2/2005 | Fuller et al. |
| 2005/0036033 A1 | 2/2005 | Imai |
| 2005/0046707 A1 | 3/2005 | Takane |
| 2005/0050043 A1 | 3/2005 | Pyhalammi et al. |
| 2005/0052685 A1 | 3/2005 | Herf et al. |
| 2005/0057687 A1 | 3/2005 | Irani et al. |
| 2005/0058321 A1 | 3/2005 | Buehler |
| 2005/0080894 A1 | 4/2005 | Apostolopoulos et al. |
| 2005/0084113 A1 | 4/2005 | Simpson et al. |
| 2005/0093980 A1 | 5/2005 | Nonaka et al. |
| 2005/0103863 A1 | 5/2005 | Zhu et al. |
| 2005/0105806 A1 | 5/2005 | Nagaoka et al. |
| 2005/0113136 A1 | 5/2005 | Gosieski, Jr. |
| 2005/0130717 A1 | 6/2005 | Gosieski, Jr. et al. |
| 2005/0131905 A1 | 6/2005 | Margolus et al. |
| 2005/0132414 A1 | 6/2005 | Bentley et al. |
| 2005/0140803 A1 | 6/2005 | Ohtsuka et al. |
| 2005/0150362 A1 | 7/2005 | Uehara |
| 2005/0152619 A1 | 7/2005 | Motomura et al. |
| 2005/0158015 A1 | 7/2005 | Nakayama et al. |
| 2005/0187901 A1 | 8/2005 | Maritzen et al. |
| 2005/0193421 A1 | 9/2005 | Cragun |
| 2005/0195285 A1 | 9/2005 | Ide |
| 2005/0195291 A1 | 9/2005 | Kubo |
| 2005/0203930 A1 | 9/2005 | Bukowski et al. |
| 2005/0206721 A1 | 9/2005 | Bushmitch et al. |
| 2005/0210267 A1 | 9/2005 | Sugano et al. |
| 2005/0212912 A1 | 9/2005 | Huster |
| 2005/0212950 A1 | 9/2005 | Kanai |
| 2005/0231625 A1 | 10/2005 | Parulski et al. |
| 2005/0262097 A1 | 11/2005 | Sim-Tang et al. |
| 2005/0278461 A1 | 12/2005 | Ohta |
| 2006/0010400 A1 | 1/2006 | Dehlin et al. |
| 2006/0023066 A1 | 2/2006 | Li et al. |
| 2006/0028553 A1 | 2/2006 | Mori et al. |
| 2006/0044394 A1 | 3/2006 | Read |
| 2006/0044398 A1 | 3/2006 | Foong et al. |
| 2006/0044416 A1 | 3/2006 | Miyazaki et al. |
| 2006/0056056 A1 | 3/2006 | Ahiska et al. |
| 2006/0061451 A1 | 3/2006 | Chen |
| 2006/0083440 A1 | 4/2006 | Chen |
| 2006/0087559 A1 | 4/2006 | Huberman et al. |
| 2006/0087941 A1* | 4/2006 | Obradovich ............... 369/47.12 |
| 2006/0092291 A1 | 5/2006 | Bodie |
| 2006/0098112 A1 | 5/2006 | Kelly |
| 2006/0109349 A1 | 5/2006 | Takashima |
| 2006/0112413 A1 | 5/2006 | Ando et al. |
| 2006/0119711 A1 | 6/2006 | Ejima et al. |
| 2006/0125922 A1 | 6/2006 | Albert et al. |
| 2006/0125928 A1 | 6/2006 | Wolcott et al. |
| 2006/0125937 A1 | 6/2006 | LeGall et al. |
| 2006/0126861 A1 | 6/2006 | Saliterman |
| 2006/0143665 A1 | 6/2006 | Meek et al. |
| 2006/0174203 A1 | 8/2006 | Jung et al. |
| 2006/0177132 A1 | 8/2006 | Jackson et al. |
| 2006/0177150 A1 | 8/2006 | Uyttendaele et al. |
| 2006/0192887 A1 | 8/2006 | Miyamaki et al. |
| 2006/0197839 A1 | 9/2006 | Senior et al. |
| 2006/0203099 A1 | 9/2006 | Omata |
| 2006/0226298 A1 | 10/2006 | Pierson |
| 2006/0268117 A1 | 11/2006 | Loui et al. |
| 2006/0274165 A1 | 12/2006 | Levien et al. |
| 2007/0097214 A1 | 5/2007 | Jung et al. |
| 2007/0100533 A1 | 5/2007 | Jung et al. |
| 2007/0100606 A1 | 5/2007 | Rogers |
| 2007/0100621 A1 | 5/2007 | Jung et al. |
| 2007/0120980 A1 | 5/2007 | Jung et al. |
| 2007/0195373 A1 | 8/2007 | Singh |
| 2007/0217761 A1 | 9/2007 | Chen et al. |
| 2007/0252901 A1 | 11/2007 | Yokonuma et al. |
| 2007/0274705 A1 | 11/2007 | Kashiwa et al. |
| 2008/0023232 A1 | 1/2008 | Morag et al. |
| 2008/0192129 A1 | 8/2008 | Walker et al. |
| 2009/0033752 A1 | 2/2009 | Bodnar et al. |
| 2009/0281644 A1 | 11/2009 | Okamoto et al. |
| 2009/0305677 A1 | 12/2009 | Ellison et al. |
| 2010/0017289 A1 | 1/2010 | Sah et al. |
| 2011/0270916 A1 | 11/2011 | Shih et al. |
| 2012/0105716 A1 | 5/2012 | Jung et al. |

FOREIGN PATENT DOCUMENTS

| | | |
|---|---|---|
| JP | 10023303 A | 1/1998 |
| JP | 2001045452 A | 2/2001 |
| JP | 2001086383 | 3/2001 |
| JP | 2001-309236 A | 11/2001 |
| JP | 2002-083280 A | 3/2002 |
| JP | 2002-094862 A | 3/2002 |
| JP | 2003-009044 A | 1/2003 |
| JP | 2004274625 A | 9/2004 |
| WO | WO 2005/112437 A1 | 11/2005 |

OTHER PUBLICATIONS

U.S. Appl. No. 12/290,538, Jung et al.
U.S. Appl. No. 12/284,202, Jung et al.
U.S. Appl. No. 12/283,420, Jung et al.
U.S. Appl. No. 11/213,324, Jung et al.
Adobe.com; "Share images with Photo Mail (Win only)"; pp. 1-4; located at http://www.adobe.com/tips/phsel3photomail/main.html; printed on Jan. 26, 2005.
Canon.ca; "Print/Share Button"; pp. 1-2; located at http://www.canon.ca/digitalphotography/english/ctech_article.asp?id=174&tid=6; bearing a date of Jan. 26, 2005; printed on Jan. 26, 2005.
CG.ITS.TUDELFT.NL; Delft University of Technology; "Shared cameras"; pp. 1; located at http://www.cg.its.tudelft.nl/~spiff/descSC.html; printed on Jan. 27, 2005.
Cisco Systems, Inc.; "Cisco Catalyst 6500 Series Switches—High Availability for the Cisco Catalyst 6500 Series Switches"; pp. 1-9; located at http://www.cisco.com/en/US/products/hw/switches/ps708/products_white_paper09186a0080088874.shtml; bearing a date of 1992-2005; printed on May 3, 2005.
Co-array.org; "A Brief Overview of Co-Array Fortran"; pp. 1-3; located at http://www.co-array.org/caf_intro.htm; printed on May 3, 2005.
Digital Photography Review; "Kodak EasyShare One"; pp. 1-5; located at http://www.dpreview.com/news/0501/05010605kodakeasyshareone.asp; bearing a date of Jan. 6, 2005; printed on Jan. 26, 2005.
Gizmodo.com; "FlashPoint ShareDrives"; pp. 1-2 located at http://www.gizmodo.com/gadgets/peripherals/storage/flashpoint-sharedrives-110083.php; bearing a date of Mon Jun. 27; printed on Jun. 29, 2005; Published by Gawker Media.
Har-Peled, Sariel; Koltun, Vladlen; Song, Dezhen; Goldberg, Ken; CiteSeer.Ist:; "Efficient Algorithms for Shared Camera Control"; pp. 1-2; located at http://citeseer.ist.psu.edu/har-peled02efficient.html; bearing a date of 2002; printed on Jan. 26, 2005.
Hewlett-Packard Development Company, L.P.; "Presenting the big picture"; pp. 1-7; located at http://www.matrixdisplay.com/pdf/HP_Big_Picture_Main_Brochure.pdf; bearing a date of 2003.
HP.com; "HP Image Zone Express step-by-step: HP Instant Share"; pp. 1-4; located at http://www.hp.com/united-states/ize/steps_instant_share.html; printed on Jan. 26, 2005.
Hua, Zhigang; Xie, Xing; Lu, Hanqing; Ma, Wei-Ying; Research.Microsoft.com; "COBO: Building Cooperative Environment for Cross-Device Image Sharing"; pp. 1; located at http://research.microsoft.com/research/pubs/view.aspx?type=technical+report&id=823; bearing a date of Nov. 2004; printed on Jan. 25, 2005.
Mahmoud, Qusay H.; "Getting Started with Data Synchronization Using SyncML"; pp. 1-6; located at http://developers.sun.com/techtopics/mobility/midp/articles/syncml/; bearing dates of Sep. 2004 and 1994-2005; printed on May 3, 2005.
Mobileman; "Nikon D2H WiFi Digital Camera"; pp. 1-2; located at http://www.mobilemag.com/content/100/336/C2502/; bearing a date of Feb. 20, 2004; printed on Jan. 25, 2005.

(56) References Cited

OTHER PUBLICATIONS

Money.cnn.com; "Playboy coming to iPod"; pp. 1-2; located at http://money.cnn.com/2005/01/05/technology/personaltech/playboy_ipod/index.htm; bearing a date of Jan. 5, 2005; printed on Jan. 26, 2005.

National Instruments Corporation; "Advanced Analog Triggering and Synchronization Techniques"; pp. 1-2; located at http://zone.ni.com/devzone/conceptd.nsf/webmain/A387B5C0AC6F6F4E86256C87005FCDDF?opendocument&node=dz00000_us; bearing a date of 2005; printed on May 3, 2005.

National Instruments Corporation; "Genlocking Multiple JAI CV-M1 Cameras"; pp. 1-5; located at http://zone.ni.com/devzone/conceptd.nsf/webmain/7a6b5853548850e886256c21005b1413; bearing a date of 2005; printed on May 3, 2005.

National Instruments Corporation; "Multi-Camera Acquisition"; pp. 1-3; located at http://zone.ni.com/devzone/conceptd.nsf/webmain/D91BAC1317F9D0A686256C9300769A0D; bearing a date of 2005; printed on May 3, 2005.

Roadcasting.org; "A new type of radio"; "Final Design"; "Process"; "Conclusions"; "Recognition"; "How Roadcasting Works"; "Download"; pp. 1-15; located at www.roadcasting.org; printed on Jun. 2, 2005.

Seifert, Eric; Eligator, Ron; "Acoustical Design Considerations at Universal Studios CityWalk™, Orlando, Florida"; Acoustics at CityWalk; pp. 1-5; located at http://www.acousticdimensions.com/tech_CityWalk.htm; bearing dates of Apr. 23, 1999 and Apr. 24, 1999; printed on Jul. 20, 2005.

Sellen, Abigail; Fleck, Rowanne; Kindberg, Tim; Spasojevic, Mirjana; Research.Microsoft.com; "How and Why People Use Camera Phones"; pp. 1-16; located at http://research.microsoft.com/research/pubs/view.aspx?type=technical+report&id=823 bearing a date of Nov. 2004; printed on Jan. 25, 2005.

Starbursthomepage.com; "Life is all about Sharing"; p. 1; located at http://www.starbursthomepage.com/flashpointx.htm; printed on Jun. 29, 2005.

Starbursthomepage.com; "Sharing-On-The-Go Technology"; pp. 1-3; located at http://www.starbursthomepage.com/fsotg.htm; printed on Jun. 29, 2005.

Starbursthomepage.com; "Specifications and Data Transfer Information"; pp. 1-5; located at http://www.starbursthomepage.com/fspec.htm; printed on Jun. 29, 2005.

Starbursthomepage.com; "What are FlashPoint ShareDrives"; pp. 1-4; located at http://www.starbursthomepage.com/fproducts.htm; printed on Jun. 29, 2005.

Sutherland, Ed; "CSR Intros Low-Cost, Single-Chip WiFi"; pp. 1-3; located at http://www.wi-fiplanet.com/news/article.php/3434141; bearing a date of Nov. 10, 2004; printed on Jan. 25, 2005.

"Yamaha Internet 'MidLive vol. 3': An Open Experiment: The First MidLive to Feature Synchronized Streaming of MIDI and Audio Data"; Yamaha News Release: wMid Live vol. 3x; pp. 1-5; located at http://www.yamaha.co.jp/english/news/97121101.html; bearing a date of Dec. 1997; printed on Jun. 19, 2005.

U.S. Appl. No. 12/799,367, Jung et al.
U.S. Appl. No. 12/806,060, Levien et al.
Adobe Photoshop User Guide 5.0;bearing a date of 1998; pp. 1,2,22,31-35,41,46,48,55-58,101,108,128,167-1-167-7,259-284, and 311-316; Adobe Systems Inc.
U.S. Appl. No. 11/998,824, Jung et al.
U.S. Appl. No. 11/998,819, Jung et al.
U.S. Appl. No. 11/998,447, Jung et al.
U.S. Appl. No. 11/901,240, Jung et al.
U.S. Appl. No. 11/703,063, Jung et al.
U.S. Appl. No. 11/173,166, Jung et al.
U.S. Appl. No. 11/143,970, Jung et al.

\* cited by examiner

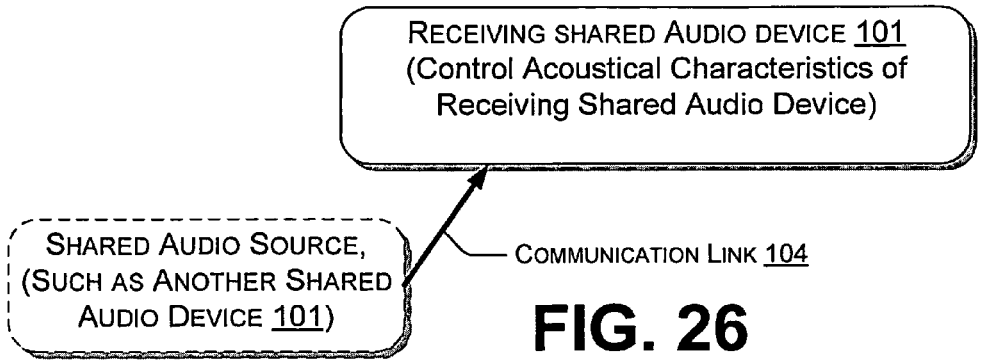

FIG. 26 receiving at a personal live audio system, for a member of an audience or a class, at least some shared audio input pertaining to at least some audio relating to a substantially-live captured event 2802 controlling acoustical characteristics of at least some substantially live audio as can be provided to a user of the personal live audio system by the personal live audio system, wherein the at least some substantially live audio can be generated at least partially in response to the at least some shared audio input 2804 allowing the user to access audio corresponding to the at least some shared audio input if the at least some shared audio input satisfies copywrite considerations 2806

FIG. 27

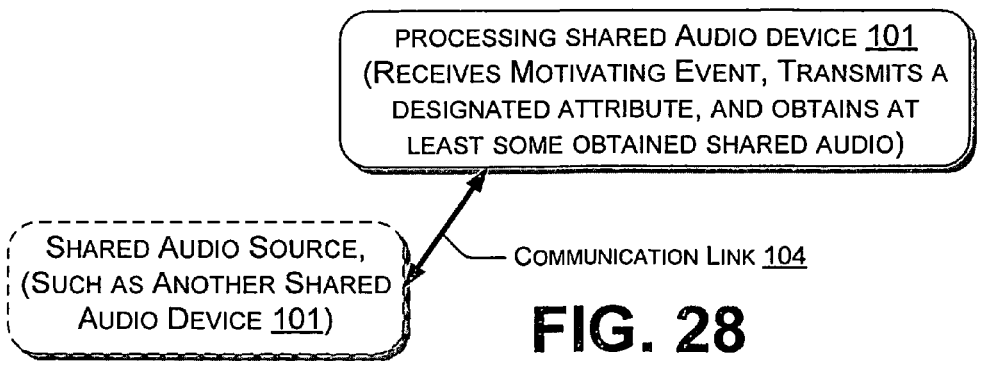

FIG. 28

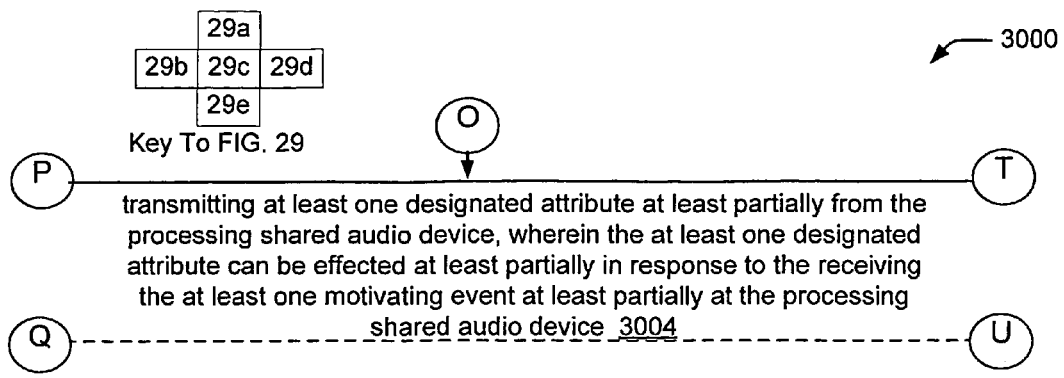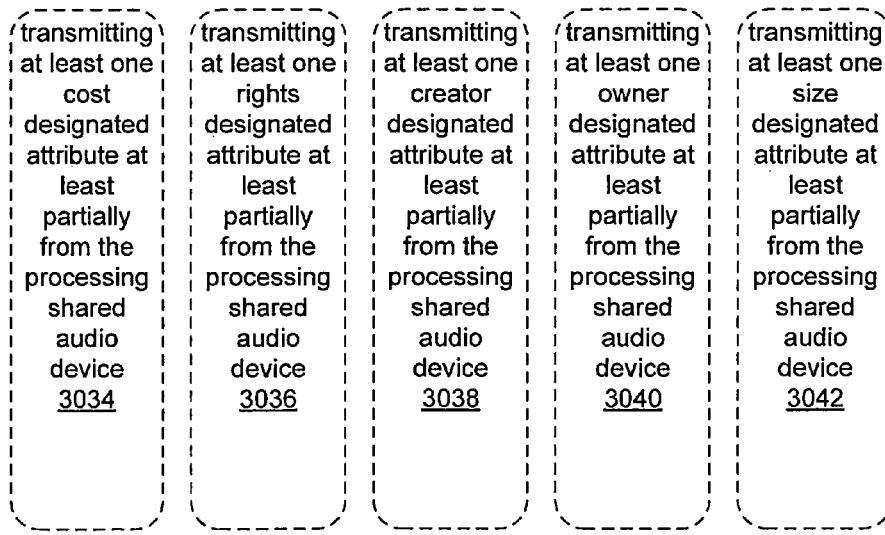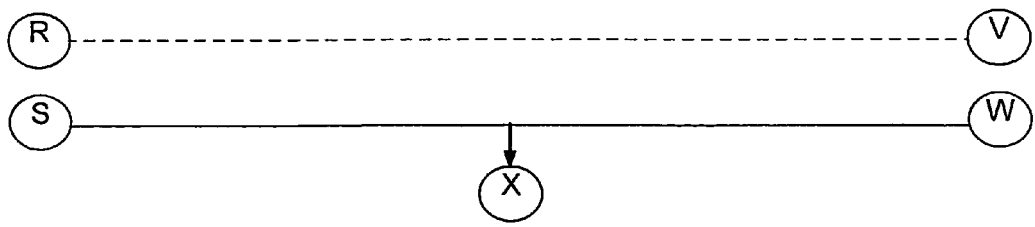
FIG. 29c

AUDIO SHARING

For purposes of the USPTO extra-statutory requirements, the present application constitutes a continuation of U.S. patent application Ser. No. 11/210,284, entitled AUDIO SHARING, naming EDWARD K. Y. JUNG, ROYCE A. LEVIEN, ROBERT W. LORD, MARK A. MALAMUD, AND JOHN D. RINALDO, JR. as inventors, filed 23, AUG. 2005, now abandoned which is currently co-pending, or is an application of which a currently co-pending application is entitled to the benefit of the filing date.

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. (see CITATION). The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. U.S. patent application Ser. No. 11/048,644, entitled SHARED IMAGE DEVICES, naming Edward K. Y. Jung; Royce A. Levien; Robert W. Lord; Mark A. Malamud and John D. Rinaldo, Jr. as inventors, filed 31 Jan. 2005.
2. U.S. patent application Ser. No. 11/048,629, entitled VIEWFINDER FOR SHARED IMAGE DEVICE, naming Edward K. Y. Jung; Royce A. Levien; Robert W. Lord; Mark A. Malamud and John D. Rinaldo, Jr. as inventors, filed 1 Feb. 2005.
3. U.S. patent application Ser. No. 11/064,787, entitled STORAGE ASPECTS FOR IMAGING DEVICE, naming Edward K. Y. Jung; Royce A. Levien; Robert W. Lord; Mark A. Malamud and John D. Rinaldo, Jr. as inventors, filed 23 Feb. 2005.
4. U.S. patent application Ser. No. 11/069,909, entitled SHARING INCLUDING PERIPHERAL SHARED IMAGE DEVICE, naming Edward K. Y. Jung; Royce A. Levien; Robert W. Lord; Mark A. Malamud and John D. Rinaldo, Jr. as inventors, filed 28 Feb. 2005.
5. U.S. patent application Ser. No. 11/089,530, entitled PERIPHERAL SHARED IMAGE DEVICE SHARING, naming Edward K. Y. Jung; Royce A. Levien; Robert W. Lord; Mark A. Malamud and John D. Rinaldo, Jr. as inventors, filed 23 Mar. 2005.
6. U.S. patent application Ser. No. 11/095,768, entitled IMAGE TRANSFORMATION ESTIMATOR OF AN IMAGING DEVICE, naming Edward K. Y. Jung; Royce A. Levien; Robert W. Lord; Mark A. Malamud and John D. Rinaldo, Jr. as inventors, filed 30 Mar. 2005.
7. U.S. patent application Ser. No. 11/115,078, entitled PROXIMITY OF SHARED IMAGE DEVICES, naming Edward K. Y. Jung; Royce A. Levien; Robert W. Lord; Mark A. Malamud and John D. Rinaldo, Jr. as inventors, filed 26 Apr. 2005.
8. U.S. patent application Ser. No. 11/122,274, entitled REGIONAL PROXIMITY FOR SHARED IMAGE DEVICE(S) naming Edward K. Y. Jung; Royce A. Levien; Robert W. Lord; Mark A. Malamud and John D. Rinaldo, Jr. as inventors, filed 4 May 2005.
9. U.S. patent application Ser. No. 11/129,045, entitled SHARED IMAGE DEVICE RESOLUTION TRANSFORMATION naming Edward K. Y. Jung; Royce A. Levien; Robert W. Lord; Mark A. Malamud and John D. Rinaldo, Jr. as inventors, filed 13 May 2005.
10. U.S. patent application Ser. No. 11/143,970, entitled ESTIMATING SHARED IMAGE DEVICE OPERATIONAL CAPABILITIES OR RESOURCES naming Edward K. Y. Jung; Royce A. Levien; Robert W. Lord; Mark A. Malamud and John D. Rinaldo, Jr. as inventors, filed 2 Jun. 2005.
11. U.S. patent application Ser. No. 11/153,868 entitled SHARED IMAGE DEVICE SYNCRONIZATION OR DESIGNATION naming Edward K. Y. Jung; Royce A. Levien; Robert W. Lord; Mark A. Malamud and John D. Rinaldo, Jr. as inventors, filed 14 Jun. 2005.
12. U.S. patent application Ser. No. 11/173,166 entitled RESAMPLING OF TRANSFORMED SHARED IMAGE TECHNIQUES naming Edward K. Y. Jung; Royce A. Levien; Robert W. Lord; Mark A. Malamud and John D. Rinaldo, Jr. as inventors, filed 1 Jul. 2005.
13. U.S. patent application Ser. No. 11/190,516 entitled SHARED IMAGE DEVICE DESIGNATION naming Edward K. Y. Jung; Royce A. Levien; Robert W. Lord; Mark A. Malamud and John D. Rinaldo, Jr. as inventors, filed 26 Jul. 2005.

Certain aspects of the present application relate, in general, to audio sharing mechanisms that allow sharing of audio between multiple shared audio devices.

In certain aspects, a method can include, but is not limited to, obtaining at least some audio information, at least partially at a shared audio device. The method can also include temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information. In addition to the foregoing, other method aspects are described in the claims, drawings, and text forming a part of the present application.

In certain aspects, a method can include, but is not limited to, transmitting a temporal separation indication at a shared audio device that can be received by at least one other shared audio device which can indicate a desired temporal separation of at least some audio information and at least some temporally-associated dissimilar-media information. The method can also include receiving at the shared audio device the at least some audio information and the at least some temporally-associated dissimilar-media information that have been substantially temporally separated to allow for the at least some audio information and the at least some temporally-associated dissimilar-media information to be temporally coordinated at the shared audio device. In addition to the foregoing, other method aspects are described in the claims, drawings, and text forming a part of the present application.

In certain aspects, a method can include, but is not limited to, transmitting at least partially using an audio projection system that can be heard by an audience including at least one member. The transmitting at least partially using the audio projection system can include providing at least one audience live audio source that can be received by one or more members of the audience including an individual member of the audience. The transmitting at least partially using the audio projection system can also include providing at least one personal live audio source that can be received by the individual member of the audience. In addition to the foregoing, other method aspects are described in the claims, drawings, and text forming a part of the present application.

In certain aspects, a method can include, but is not limited to, receiving, at least partially using an audio reception system. The receiving can also include coordinating, at least partially based upon relative reception times of at least one audience live audio source and at least one personal live audio source. In addition to the foregoing, other method aspects are described in the claims, drawings, and text forming a part of the present application.

In certain aspects, a method can include, but is not limited to, receiving at a personal live audio system, for a member of an audience or a class, at least some shared audio input pertaining to at least some audio relating to a substantially-live captured event. The method can also include controlling acoustical characteristics of at least some substantially live audio as can be provided to a user of the personal live audio system by the personal live audio system, wherein the substantially live audio can be generated at least partially in response to the at least some shared audio input. In addition to the foregoing, other method aspects are described in the claims, drawings, and text forming a part of the present application.

In certain aspects, a method can include, but is not limited to, receiving at least one motivating event at least partially at a processing shared audio device. The method can include transmitting at least one designated attribute at least partially from the processing shared audio device, wherein the at least one designated attribute can be effected at least partially in response to the receiving the at least one motivating event at least partially at the processing shared audio device. The method can also include obtaining at least some obtained shared audio at the processing shared audio device that is obtained in accordance with the at least one motivating event, and is at least partially in response to the transmitting the at least one designated attribute. The method can include processing the at least some obtained shared audio to derive at least one processed shared audio at least partially at the processing shared audio device. In addition to the foregoing, other method aspects are described in the claims, drawings, and text forming a part of the present application.

In certain aspects, a method can include, but is not limited to, obtaining user instructions relating to at least one designated attribute and at least some shared audio at least partially at an obtaining shared audio device, wherein the at least one designated attribute can be received at least partially from a processing shared audio device. The method can include generating at least some obtained shared audio at the obtaining shared audio device at least partially by processing the at least some shared audio to satisfy the at least one designated attribute. The method can also include transmitting the at least some obtained shared audio from the obtaining shared audio device that can be received by, and processed at, the processing shared audio device. In addition to the foregoing, other method aspects are described in the claims, drawings, and text forming a part of the present application.

In certain aspects, a method can include, but is not limited to, designating at least partially at a designating shared audio device an attribute. The method can include using the attribute by an at least one obtaining shared audio device for capturing at least some shared audio. In addition to the foregoing, other method aspects are described in the claims, drawings, and text forming a part of the present application.

In certain aspects, an apparatus can include, but is not limited to, a shared audio device at least partially configurable to obtain at least some audio information. The shared audio device can be at least partially configurable to temporally coordinate transmitting at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information when presented to the at least one other shared audio device. In addition to the foregoing, other apparatus aspects are described in the claims, drawings, and text forming a part of the present application.

In certain aspects, an apparatus can include, but is not limited to, a shared audio device configurable to transmit a temporal separation indication that can be received by at least one other shared audio device, but temporal separation indication can indicate a desired temporal separation of at least some audio information and at least some temporally-associated dissimilar-media information. The apparatus can include the shared audio device configurable to receive the at least some audio information and the at least some temporally-associated dissimilar-media information that have been substantially temporally separated to allow for the at least some audio information and the at least some temporally-associated dissimilar-media information to be temporally coordinated at the shared audio device. In addition to the foregoing, other apparatus aspects are described in the claims, drawings, and text forming a part of the present application.

In certain aspects, an apparatus can include, but is not limited to, an audio projection system operable to transmit at least some shared audio such that can be heard by an audience including at least one member. The audio projection system can be operable to provide at least one audience live audio source that can be received by one or more members of the audience. The audio projection system can be operable to provide at least one personal live audio source that can be received by an individual member of the audience. In addition to the foregoing, other apparatus aspects are described in the claims, drawings, and text forming a part of the present application.

In certain aspects, an apparatus can include, but is not limited to, an audio reception system at, least partially operable to receive. The audio reception system can at least partially interact with an audience live audio source and at least one personal live audio source operable to coordinate, at least partially based upon relative reception times of the at least one audience live audio source relative to the at least one personal live audio source. In addition to the foregoing, other apparatus aspects are described in the claims, drawings, and text forming a part of the present application.

In certain aspects, an apparatus can include, but is not limited to, a personal live audio system being operable to receive, for a member of an audience or a class, at least some shared audio input pertaining to at least some audio relating to a substantially-live captured event. The personal live audio system being operable to control acoustical characteristics of at least some substantially live audio, wherein the substantially live audio can be generated at least partially in response to the audio input. In addition to the foregoing, other apparatus aspects are described in the claims, drawings, and text forming a part of the present application.

In certain aspects, an apparatus can include, but is not limited to, a processing shared audio device at least partially operable to receive at least one motivating event. The apparatus can include the processing shared audio device at least partially operable to transmit at least one designated attribute, wherein the at least one designated attribute can be effected at least partially in response to the processing shared audio device at least partially receiving the at least one motivating event. The apparatus can further include the processing shared audio device at least partially operable to obtain at least some obtained shared audio that is obtained in accordance with the at least one motivating event, at least partially in response to the processing shared audio device at least partially transmitting the at least one designated attribute. The apparatus can include the processing shared audio device at least partially processing the at least some obtained shared audio to derive at least one processed shared audio. In addition to the foregoing, other apparatus aspects are described in the claims, drawings, and text forming a part of the present application.

In certain aspects, an apparatus can include, but is not limited to, an obtaining shared audio device at least partially operable to obtain user instructions relating to at least one designated attribute and at least some shared audio, wherein the at least one designated attribute can be received at least partially from a processing shared audio device. The apparatus can include the obtaining shared audio device at least partially operable to generate at least some obtained shared audio at least partially by processing the shared audio to satisfy the at least one designated attribute. The apparatus can include the obtaining shared audio device at least partially operable to transmit the at least some obtained shared audio that can be received by, and processed at, the processing shared audio device. In addition to the foregoing, other apparatus aspects are described in the claims, drawings, and text forming a part of the present application.

In certain aspects, a personal shared audio device includes a statistical computation portion and a receiving portion. The statistical computation portion can be operable to perform statistical arithmetic calculations relative to statistical information. The receiving portion can be operable to receive shared audio. In addition to the foregoing, other apparatus aspects are described in the claims, drawings, and text forming a part of the present application.

In one or more various aspects, related apparatus and systems include but are not limited to circuitry and/or programming for effecting the herein-referenced method aspects; the circuitry and/or programming can be virtually any combination of hardware, software, electro-mechanical system, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing contains, by necessity, simplifications, generalizations and omissions of detail; consequently, those skilled in the art will appreciate that the foregoing is illustrative only and not intended to be in any way limiting. Other aspects, features, and advantages of the devices and/or processes and/or other subject matter described herein should become apparent in the text set forth herein.

BRIEF DESCRIPTION OF THE FIGURES

FIG. 26 shows a block diagram of one embodiment of an audio controlling device;

FIG. 27 shows a flow diagram of one embodiment of controlling acoustical characteristics of received audio that can utilize multiple shared audio devices, similar to as described with respect to FIG. 26;

FIG. 28 shows a block diagram of one embodiment of the shared audio device;

FIGS. 29a, 29b, 29c, 29d, and 29e show a flow diagram of one embodiment of a processing and/or sharing technique that can utilize multiple shared audio devices, similar to as described with respect to FIG. 28;

DETAILED DESCRIPTION

Figure 1:
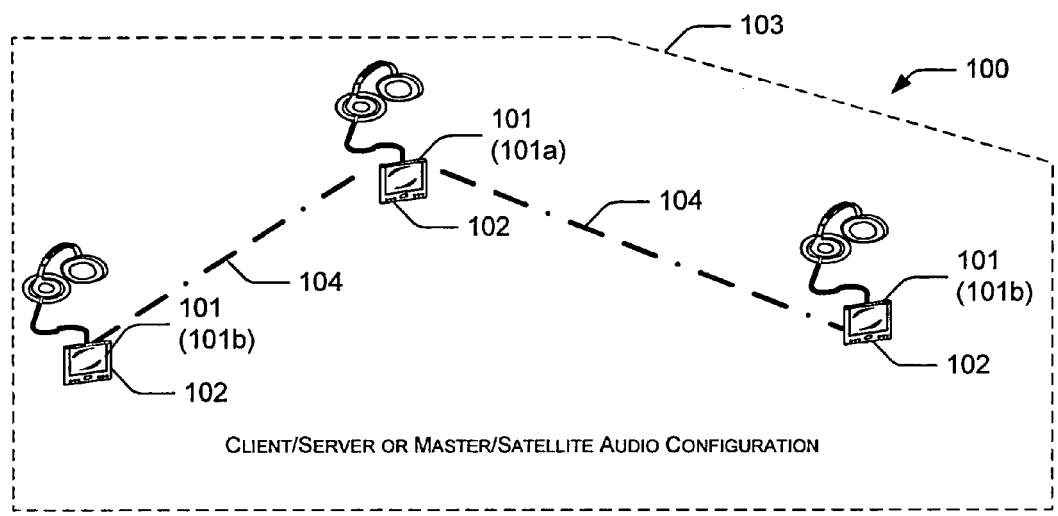
FIG. 1 shows a schematic diagram of one embodiment of a shared audio network including at least one of the shared audio devices.
Figure 2:
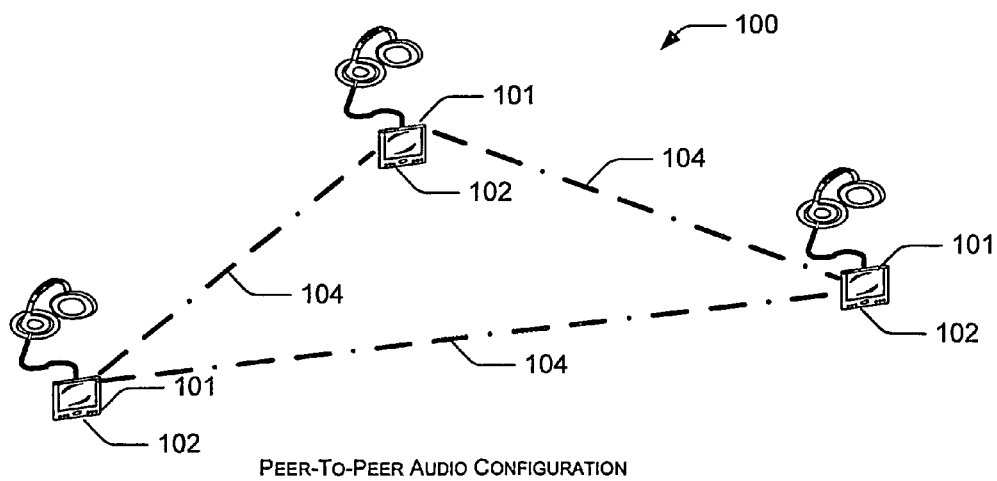
FIG. 2 shows a schematic diagram of another embodiment of the shared audio network including at least one of the shared audio devices.
Figure 3:
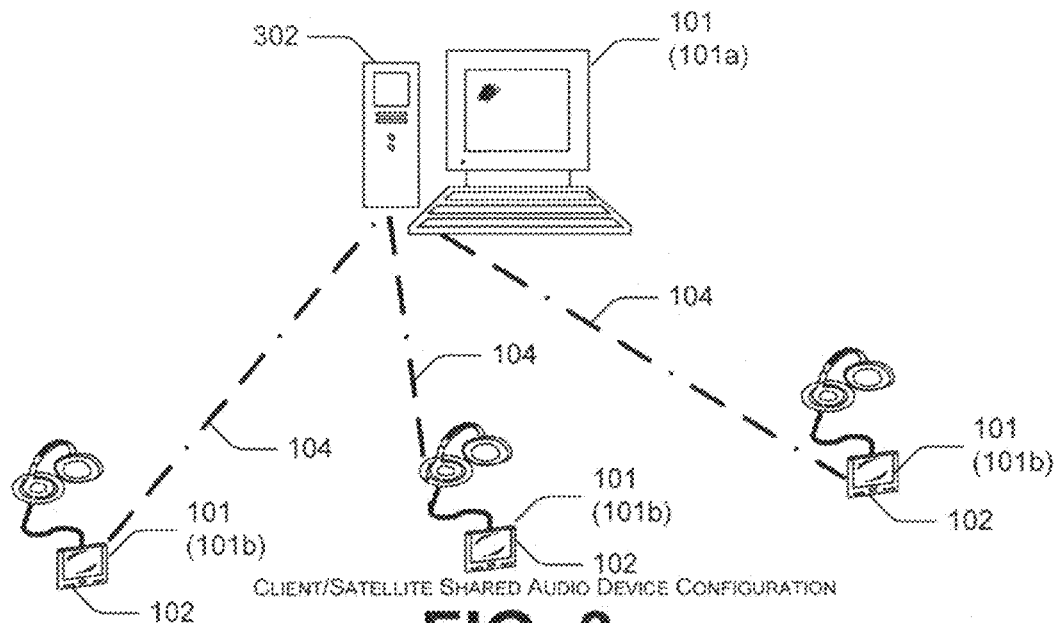
FIG. 3 shows a schematic diagram of another embodiment of the shared audio network including at least one of the shared audio devices.
Figure 4:
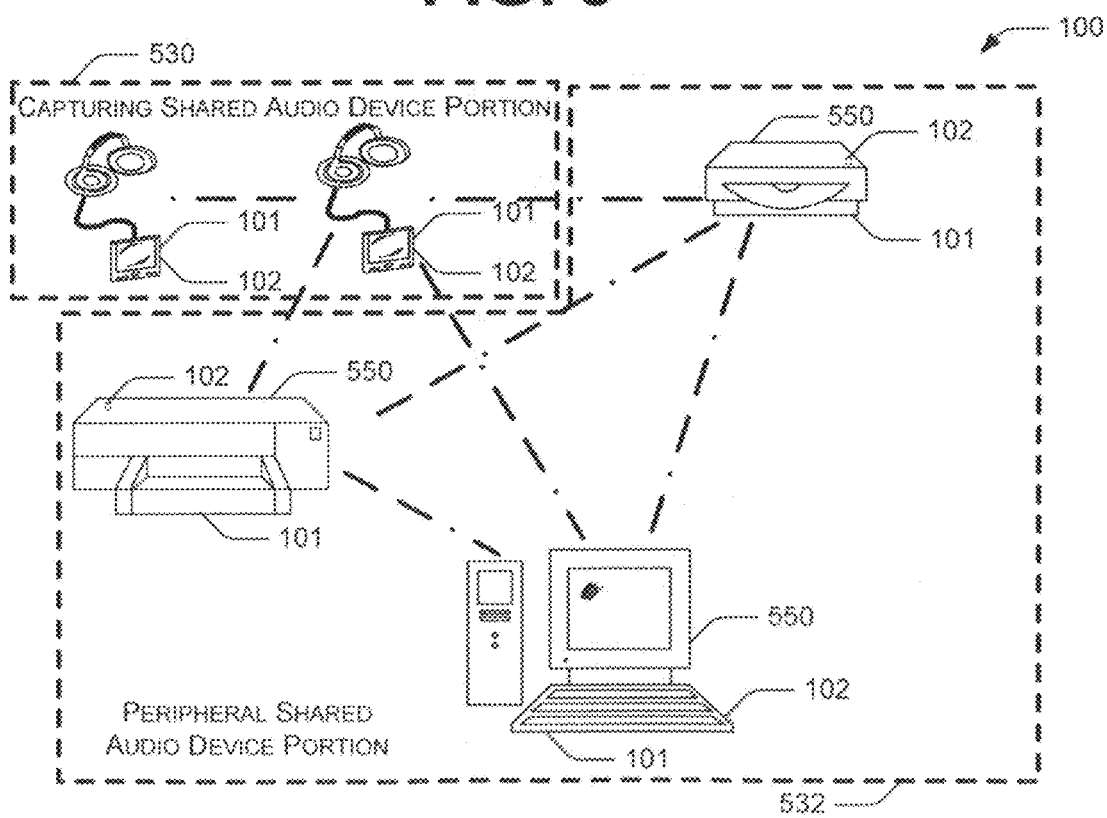
FIG. 4 shows a schematic diagram of yet another embodiment of the shared audio network including at least one of the shared audio devices.

This disclosure describes a number of embodiments of the shared audio devices 101 that can be configured to operate within a shared audio network 100, and that can include at least one sharing mechanism 102. Certain embodiments of the at least one sharing mechanism 102 can be integrated in, and/or utilized by, one or more shared audio devices 101. Different embodiments of the shared audio network 100 are as described with respect to FIGS. 1, 2, 3, 4, 5, and/or 6, and can be arranged in a variety of shared audio network 100 configurations. Certain embodiments of the shared audio devices 101 can capture audio, and therefore are referred to in this disclosure as an obtaining shared audio device, or alternatively as a recording shared audio device. The present disclosure describes a number of shared audio devices that can perform a variety of functions on shared audio including, but not limited to, sharing, transferring, obtaining, or copying shared audio. In this disclosure, the term "capture" can apply to either recording such as by using a microphone, a mixing technique, a processing technique, by combining multiple streams (the streams can include, but are not limited to audio, video, voice, graphics, text, and/or other data), and/or by otherwise generating or producing audio or portions thereof that can be shared. Sharing of audio can be associated with sharing of a variety of media, such as, for example, sharing audio, images, text, and/or other data. Different embodiments of the shared audio device 101 can each perform one or more processes that can include one or more of, but are not limited to: capturing, creating, recording, processing, storing, transferring, obtaining, retaining, playing-back, and/or receiving the audio and/or the shared audio. Many embodiments of the sharing mechanism 102 can be integrated between one or more shared audio devices 101.

In different embodiments, a shared audio device can be configured as a personal shared audio device that can typically be used by an individual, or alternately as a group shared audio device that can typically be used by a group of individuals. Multiple shared audio devices can be arranged in a networked configuration, e.g., a teacher of a class or a presenter can have a shared audio device that can share audio (and other data) with the members of their class or group. In certain embodiments, each member can process an individual shared audio device and/or a group shared audio device by which they can interact with the teacher or presenter, and in certain embodiments record the presentation or class (or selected portions thereof).

Within this disclosure, the term "audio" includes, but is not limited to any voice, audio, acoustic, or sound-related media that can be transmitted such as, but not limited to: music, voice, recordings, etc. Within this disclosure, the terms "audio information" or "audio" can pertain to, but are not limited to, audio, one or more string of audio, icons that pertain to audio or streams thereof, portions of signals or streams of audio, statements or streams of audio, audio having been altered or modified, information pertaining to audio such as metadata, etc. that can be transmitted such as, but not limited to: music, voice, recordings, etc. There are a number of live audio aspects, and substantially-live audio aspects, that are described and provided with respect to this disclosure. Unless otherwise described within this disclosure, the terms "live" and "substantially live" as they pertain to audio may be applied to such varying audio applications as live concerts, teleconferencing, audio presentation, distance-learning, classroom-presentation, or any other situation where audio that is being captured in one location is being presented to one or more users at another location. In different embodiments, the different shared audio devices that are sharing audio therebetween can be located at locations that may or may not be remotely located.

Within this disclosure, capturing of audio may include such processes as recording (utilizing one or more audio tracks), combining or mixing one or more audio tracks to form the distinct audio track, and/or any other similar process resulting in producing new audio. The term "obtain" can apply to obtaining shared audio either by recording, capturing, or by data transfer from another shared audio device. The term "retain" can apply to storing shared audio for some duration regardless how temporary or permanent the storage duration within a memory storage device. Within this disclosure, obtaining audio may include such processes as capturing of audio, retrieving audio from one or more data storage locations, retrieving audio from at least one other shared audio device, and/or any other technique by which the shared audio device can retrieve audio. A variety of techniques may be used to capture shared audio and/or audio. Mixing or overlaying of shared audio may be utilized by which multiple streams or tracks of audio may be combined.

As described within this disclosure with respect to FIG. 1, for example, a sharing region 103 may be established (for example, for the duration of the sharing session that in many embodiments may be temporary), to set forth the geographic location where one or more shared audio devices may share at least some audio therebetween. Within this disclosure, the sharing region 103 may be considered as a geographic region where shared audio devices can share audio contained in one to another shared audio device. Within this disclosure, the sharing region 103 can represent two-dimensional or three-dimensional geographic area or volume in which the shared audio devices are intended to operate. The sharing region can be established differently in a variety of embodiments such as, for example, for a fixed time duration of the sharing session, or for as long as a shared audio device, or another device, is positioned proximately of the sharing region. In certain embodiments, a particular user can set up a sharing region as desired based on, for example, positional information such as can be derived from global positioning system (GPS), input recording coordinates of one or more shared audio devices, and/or positions defined relative to a particular building or structure, etc.

A variety of configurations of sharing regions 103 (see, e.g., FIG. 1) are described herein, including those sharing regions that are established with respect to a shared audio device, those sharing regions that are established with respect to a fixed area, and/or those sharing regions that are established with respect to a combination of a shared audio device and a fixed area. If in certain embodiments, positional information such as can be derived by a global positioning system (GPS), Loran system, etc., can be utilized to determine positional coordinates of one or more of the shared audio devices 101, or alternatively another location, with respect to the sharing region. In certain embodiments, processing a position relative to one or more fixed and known global coordinates can be utilized.

In certain embodiments, any shared audio device of the type being utilized by the sharing session that is within the sharing region may be allowed to join the sharing session. In other embodiments, the user of the shared audio device may have to provide a password to join the sharing session. In still other embodiments, the user of shared audio device can provide a sharing password in addition to being within the sharing region to join the sharing session. As such, there are a variety of permissible techniques that can be utilized to join the sharing session, that are within the intended scope of the present disclosure.

In certain instances, but not others, a particular sharing region 103 (see, e.g., FIG. 1) may be temporarily and/or geographically established to support a particular sharing session. As such, a sharing session may be established relative to a particular geographic location for a particular duration, such as within a concert hall for the duration of a concert, or for a classroom during class. In certain instances but not others, the sharing region in the sharing session can thereby be geographically related to the particular area for the duration of a particular sharing session; such as for a duration of a sharing session that is associated with a particular person's house, park, building, commercial setting, sports event, business event, etc.

In many embodiments, the term "proximity" indicates those shared audio devices 101 are sufficiently close to operably couple with each other and/or other devices within the sharing region, such as to establish a communication link 104. In certain embodiments, a wireless link can provide the geographic proximity that allows data transfer of the shared audio, or portions thereof. In certain embodiments, the communication link that can transfer shared audio and/or audio information can include a direct-vocal link such as an individual talking directly to another person (e.g., a teacher speaking to a class, a presenter talking to individuals in a small building, or a singer or announcer in a small auditorium or venue singing or talking to an audience or sporting-event attendees.

Within the disclosure, certain embodiments of the shared audio devices 101 can include, but are not limited to, compact disc (CD) players, audio flash memory devices, tape recorders, digital recording and/or playback devices, personal audio play-back devices (similar to those commercially available as MP3 players, Walkman, IPODs, etc.), and a variety of other audio capturing and/or playback devices. Within this disclosure, terms are applied to certain "shared audio device" to describe what action the shared audio device can be configured to perform, perhaps as well as other actions. For example, those shared audio devices 101 that can capture or otherwise obtain shared audio information can be referred to in this disclosure' as "obtaining shared audio devices", to distinguish themselves from those shared audio devices 101 that cannot capture or otherwise obtain shared audio, audio, or audio information. In many embodiments, obtaining shared audio devices can capture audio from a speaker/teacher/presenter, and forward that obtained audio to one or more other shared audio devices (that may be configured as personal or group shared audio devices). Many embodiments of the obtaining shared audio devices, such as digital recorders, can typically record audio and forward the audio to one or more personal shared audio devices.

Many of those shared audio devices that cannot capture or otherwise obtain audio can be referred to within this disclosure as "peripheral shared audio devices" since they perform such peripheral (to capturing) actions as storing, saving, storing and forwarding, playing-back, and/or otherwise processing data associated with audio. This disclosure describes a number of different operations and techniques that can be performed by the peripheral shared audio devices that include, but are not limited to, designating an attribute of audio to be captured, synchronizing audio to be captured between multiple shared audio devices, sharing audio between different shared audio devices, and/or capturing shared audio. A single shared audio device can be configurable to perform one, or many of these operations either simultaneously or sequentially. For example, an obtaining shared audio device, can capture certain shared audio; then share other audio with other shared audio devices, and can also designate an attribute of an image to be captured by other shared audio devices.

Certain embodiments of the shared audio devices that are used to play shared audio, which can use a variety of techniques to play audio (songs) such as music and/or video similar to as radio is played. In this configurations, a relatively long playlist of shared audio can be programmed or selected using typical tuner/controller/user interface techniques. For example, a user can select to play a variety of shared audio by selecting particular artists, or alternatively in certain embodiments the shared audio device can utilize a pseudo-randomized audio selector to effectively shuffle between a variety of songs and/or video clips that may be selected or played. As such, while the embodiments of the shared audio device can be configured to be used in a variety of live concerts, classrooms, etc. as described in this disclosure; in many embodiments the shared audio device can be also be used as a typical audio and/or video system.

Certain aspects of this disclosure describe a motivating event that can be utilized by multiple shared audio devices that can be utilized during obtaining a shared audio device. Certain embodiments of motivating events include, but are not limited to, obtaining a shared audio, obtaining an audio processing goal, receiving an indication that audio has been captured, receiving user instructions that it is desired to modify and/or capture at least some audio, etc. Within this disclosure, the term "obtaining" can apply to capturing a shared audio, such as by recording audio; or alternatively receiving audio at the shared audio device. Such motivating events thereby allows, for example, for a shared audio device to control or alter a manner in which it (or alternatively, another shared audio device) obtains shared audio. In certain embodiments, the shared audio device can utilize at least one motivating event to derive a designated attribute.

Within the disclosure, the terms "audio", or "audio information" can pertain to full audio, streams or portions of audio, segments of audio, information that describes audio such as metadata (that can contain such information as the artist(s), individual(s), subject(s) of the audio, identifying where or when the audio was captured, some identifying reference number retaining to the audio, etc.). Within this disclosure, metadata can be associated with particular audio or a number of audio recordings in a variety of ways. It is envisioned that the metadata that is associated with the particular audio can be modified as, for example, such that the audio itself can be altered by, for example, altering the data content or characteristics of the audio. In certain embodiments, metadata that represents one embodiment of audio can be used during processing of the audio. For example, if it is desired to determine all audio captured of a particular artist or individual, or recorded by a particular individual or studio, the metadata can be queried in certain instances to derive one or more audio recordings that satisfy that particular query.

This disclosure describes a number of embodiments of sharing mechanisms, by which one designating shared audio device can designate an attribute by which audio can be obtained by the same or another obtaining shared audio device. Examples of attributes that may be designated to an obtaining shared audio device (which, respectively, captures or retrieves audio) may pertain to the shared audio, or alternatively may relate to the at least some temporally-associated dissimilar-media information. As such, aspects relating to the shared audio and/or the temporally-associated dissimilar-media information can be as varied as, but are not limited to: format, subject, captured region, event, cost (e.g., micropayments), rights, creator, owner, size, transformation, use (e.g. providing a buddy icon on a desktop background that allows multiple shared audio devices used by a number of pre-determined and pre-agreed "buddies" to share audio or temporarily-associated dissimilar-media information in a controllable fashion therebetween, but not with other shared audio devices), audio information, attachments (e.g., other audio, images, metadata, etc.), promotions (e.g. audio might be associated with a coupon, either in paper or electronic form), use (e.g. audio might be usable in a game, or serve as a ticket). It is also to be understood, in certain embodiments but not others, a shared audio device configured as an audio designating device may not have the capability to capture audio. For instance, certain audio designating devices may be configured to issue instructions and/or information to an obtaining shared audio device about how the obtaining shared audio device should capture audio. A variety of user-interface techniques may be used by the user in combination with the designating shared audio device to determine audio that are desired to be captured or recorded including, but not limited to, menu-drive instructions, laser selection devices, optical selection devices, other selective pointing devices, or other vocal or audio instructions, etc.

Certain embodiments of the at least some temporally-associated dissimilar-media information can vary considerably depending upon a desired use of the shared audio device. For example, users of shared audio devices can perform such varied queries as: what football player from the user's alma mater that made it to the NFL had the greatest number of rushing yards? What minor-league pitching prospect has the lowest earned run average (era) against left-handed hitters? How did the forward of the local soccer team perform over the last month as compared to the month prior to that? Sports, business, and other activities that can utilize shared audio devices are full of potential statistics; as listeners to sporting events, etc., are reminded. The shared audio device provides a technique by which users such as sports fans can receive personalized statistics; and where the statistics can be updated based on input to the shared audio device. Users of any other endeavor (financial, political, etc.) that relates to statistics could also utilize their versions of the personal shared audio device.

Certain embodiments of the shared audio device that can update the at least some temporally-associated dissimilar-media information based on received input from the shared audio or the audio information could also provide very recent statistical information. For example, assume that a baseball batters average could be modified as they hit a base hit, or struck out. It is envisioned that certain embodiments of the personal shared audio device can thereby modify the statistical information based on received audio information or shared audio.

It is envisioned that many of the concepts described in this disclosure that may apply to shared audio devices may pertain to such audio sharing applications as: multiple users sharing audio recordings (e.g., in digital or analog format), multiple users sharing music recordings (in digital or analog format), and/or live concerts or performances in which individuals can have individual acoustic-enhancing headsets that can be synchronized with the audio speakers, etc. As such, to it is to be understood that shared audio devices may be applied to a variety of technologies. Additionally, it is to be understood that a variety of processing techniques may be performed by a shared audio device. Within this disclosure, the use of an adjective positioned prior to the term "shared audio device" describes one process (and not necessarily the only process) for which the shared audio device can be used. For example, an obtaining shared audio device can be considered as a shared audio device that can capture audio, while in certain embodiments, the obtaining shared audio device can also playback, transfer, receive, and/or to perform a variety of other processes relating to the audio. Additionally, a processing shared audio device can be considered as a shared audio device that can process audio, and perhaps in certain embodiments perform other operations with respect to audio. Many embodiments of the shared audio devices can thereby perform all variety of operations on audio, voice, music, and/or other media such as text, audio, images, or graphics.

Certain embodiments of the shared audio device can include a variety of copyright-limiting aspects, in which only the audio, voice, etc. that have particular copyright characteristics may be processed in a particular manner. For example, in one embodiment, a shared audio device that can capture audio may only capture audio whose recording would not violate copyright laws. As such, in one embodiment, data that does violate copyright law may be tagged in a particular manner, while data does not violate copyright law may be tagged in another. Based upon the type of audio is being attempted to be captured and/or otherwise recorded, if recording the audio would violate copyright regulations, the shared audio device can be provided with a recording-limiting device that will limit recording, playback, or some other operation. By comparison, a variety of processes can be performed upon audio that does not violate copyright restrictions. In certain embodiments, metadata can be used to describe whether the audio, music, etc. is copyright-protected or not. In a manner as described within this disclosure, certain embodiments of shared audio devices can be configured to reduce the spread of non-copyright protected audio.

Examples of Shared Audio Devices

A variety of configurations of audio devices can therefore be configured as described within this disclosure, which can allow sharing or transferring of shared audio between multiple shared audio devices (e.g., within the sharing region and/or for the sharing session). Considering the recent transformations to technology of audio devices in general, it is likely that audio devices will continue to undergo a variety of transformations and improvements, and will continue to be applied to a variety of technologies. Certain embodiments of shared audio devices can be configured to capture shared audio, such as those that can record and/or otherwise capture audio. Other embodiments of shared audio devices can be configured to be incapable of capturing audio. As such, capturing of shared audio represents a delineation between certain shared audio devices such as can be accomplished by certain shared audio devices, but not others.

Examples of shared audio devices 101 that are not configurable to capture shared audio information can include, but are not limited to, altered versions of certain laptop computers, desktop computers, portable audio store and play-back devices, digital video disk (DVD) devices, personal display assistants (PDA), printers, compact disk (CD) drives, personal audio devices such as IPods, Walkman, etc. Certain embodiments of portable audio store and play-back devices can be configurable to utilize peer-to-peer communications, and may be capable of transferring shared audio there between. Certain embodiments of the shared audio devices that cannot capture shared audio information operate largely to retain, obtain, store, process, and/or play-back shared audio devices.

In different embodiments, the sharing mechanism can be configurable to provide a varying degree of automated publishing functions between multiple shared audio devices. Certain shared audio that can be captured by a shared audio device can be distributed or transmitted to, and/or received by, other shared audio devices, and thereby be "published" and made public (and therefore can be considered to be no longer private). One embodiment of the sharing mechanism 102 allows the shared audio device 101 to toggle on/off publishing of the shared audio to switch between the audio being public and private. In certain embodiments, such publishing can be automatically set for a prescribed duration such as temporally or more permanently defined by a "sharing session", after which duration the shared audio devices each returns to their non-sharing configuration. In other embodiments, the sharing session can be permanent or have a lengthy duration.

Certain embodiments of the shared audio device 101 that includes at least a portion of the sharing mechanism 102 can be modifiable to provide a variety of functions. Many embodiments of shared audio devices that can capture shared audio, such as digital recorders, can also function as storage devices to store some audio data. Certain capturing embodiments of shared audio devices can also act as a memory acquisition device that obtains or retains audio from other shared audio devices. Other embodiments of the shared audio device 101 such as portable audio storage and play-back devices can be configurable as storage devices, in which shared audio can be stored, accessed, and/or played-back.

The very structure, nature, and/or operation of certain embodiments of such shared audio devices such as digital recorders and/or digital audio devices (e.g., audio systems, home theaters, and personal digital audio devices, etc.) are likely to change as the technologies associated with audio devices (e.g., playing-back, digital signal processing, filtering, etc.), improves. It is likely that digital recorders, digital audio devices, audio devices, music devices, or other shared audio devices may generally develop greater memory storage capabilities in the present and future as the associated memory storage technologies improve. In this disclosure, multiple obtaining shared audio devices and/or multiple peripheral shared audio devices could be "networked" in such a manner that substantial audio can be transferred between multiple obtaining shared audio devices. Certain obtaining shared audio devices can be optimized for their data storage or processing capabilities, and as such may act somewhat like computer servers. Other obtaining shared audio devices can be optimized for their photographic or zooming abilities, and as such may be considered as true capturing or shared audio devices. As the characteristics and abilities of different shared audio devices vary more, the benefits of networking the shared audio devices increases as well. Certain sharing concepts, as described herein, enhance the networking aspects of the obtaining shared audio devices.

The audio characteristics conversion portion can in certain embodiments, but not others, act to alter the characteristics, quality, or data content of the audio that might have been captured or otherwise obtained. As described within this disclosure, certain embodiments of the audio characteristic conversion portion may be configurable to modify the audio characteristics (such as increase or decrease the audio quality) as to vary the data content. Different embodiments of the data content conversion portion are described herein. Audio characteristics varying can in certain embodiments, but not others, be associated with increasing or decreasing the data content of at least a portion of an audio recording.

One embodiment of the shared audio network 100 can include a shared audio device 101, an optional peripheral shared audio device (that may be referred in this disclosure as another shared audio device), and an optional communication link 104. The shared audio device 101 can be configurable to capture audio. In different embodiments, the shared audio device 101 can be alternatively configured to be similar as, but not limited to, a digital recorder, a personal recording and/or playback device (e.g., a Walkman, an MP3 player, or an IPOD), a cellular phone with picture taking capabilities, a computer or PDA with audio processing and/or picture taking capabilities, an audio equalization and/or play-back device, etc. Different embodiments of the shared audio device 101 can capture, record, process, play-back metadata associated therewith, save, store-and-forward, or otherwise process a variety of audio, thumbprints, voice, images or other information relating to the audio such as metadata. Different embodiments of the shared audio device 101 can be configured to capture, obtain, retain, or otherwise process a variety of audio. Many embodiments of shared audio devices 101 are also configurable to display some additional information as selected and/or controlled by a user of the shared audio device. Such additional information can vary depending upon the desired use of the shared audio device, but certain types of additional information can include, but are not limited to, additional audio, text, images, photographs, graphical information, metadata, and/or other such similar related information. In many embodiments, the additional information can be correlated with, and provide some description, understanding, or explanation that relates to the shared audio and as provided by the shared audio device.

During certain audio recording and/or music recording sessions, it is known to record a number of recordings of a single session, for example, in which the different recordings have different data content. For example, one recording may be used during playback using a higher-quality playback system, one of the recordings may be used during playback using a lower quality playback system. Shared audio devices can select the audio characteristics, such as the quality of the source, to use depending upon a number of factors including, but not limited to, playback characteristics/quality potential of the shared audio device, intended use of the particular shared audio, memory storage amount of the shared audio device, data transfer rate(s) of the shared audio devices and the associated communication link(s), etc.

In this disclosure, the term "subscribing" to shared audio may pertain to a user joining their shared audio device (which, in different embodiments, can be configured either as an obtaining shared audio device or as a peripheral shared audio device) in a session to provide shared audio to and/or receive shared audio from other shared audio devices. In certain embodiments of the shared audio device, it may be desired to subscribe to different functions such as by using different mechanisms. While certain particular operational embodiments of shared audio devices may be described with respect to this disclosure, this disclosure is intended to describe other shared audio devices that can perform varied or alternative functions.

Certain embodiments of shared audio devices 101 provide a sharing mechanism 102 by which certain shared audio devices that are enrolled in a sharing session may not share every audio recording that it is being captured. For example, certain types of audio and as can be captured by a particular shared audio device may be considered as private, and therefore may not be used in certain embodiments for general distribution during a sharing session with other member shared audio devices. Certain communication links 104 that connect between pairs of shared audio devices can be configurable to transfer information that is largely or entirely private in one direction, while the communication links transfer data as public in another direction. In other embodiments, the communication links can be configurable to transfer information that is largely public in both directions, or alternatively transfer information that is largely private in both directions. For example, a variety of communication links may be provided from an obtaining shared audio device to a peripheral shared audio device; while the same or an alternate communication link may be provided from the peripheral shared audio device to the obtaining shared audio device.

Certain embodiments of shared audio devices 101 can provide such operations as, but are not limited to: performing active sharing between multiple shared audio devices, temporarily pausing or muting the active sharing, resuming the active sharing after temporarily pausing or muting, connecting with other devices and/or people, or temporarily performing or delaying a variety of operations. Such temporary pausing or muting of sharing operations may be equated to temporarily halting a subscription for a particular shared audio device; and in many embodiments the shared audio that was shared during this pausing or muting period can be transmitted or collected after the pausing or muting. Other aspects and concerns of sharing the shared audio can relate to managing the shared audio devices. Examples of these tasks include controlling and selecting audio characteristics, allowing shared audio to exit a particular shared audio device but not enter the same shared audio device, or vice versa.

It is to be understood that certain embodiments of the shared audio device 101 can be configurable in a variety of network configurations, for example as described in this disclosure with respect to FIGS. 1, 2, 3, 4, 5, and/or 6. These network configurations as provided within this disclosure are intended to be illustrative in nature, and not limiting scope. Additionally, the multiple shared audio devices that are included in a particular network can frequently change their association, operation, and/or network configuration. For example, the sharing mechanism 102 as described with respect to FIG. 1 can, during a particular time period, involve the left-most satellite shared audio device 101b transmitting a shared audio to the master shared audio device 101a. Within this disclosure, any reference to the number 101 followed by a letter (e.g., 101a, 101b, 101g, etc) may indicate an instance or example of the shared audio device 101, such as described in this disclosure. The master shared audio device 101a can thereupon transmit another shared audio to another one of the satellite shared audio devices 101b during a subsequent period. An adjective modifying the term "shared audio device" can describe one particular operation that the particular shared audio device can perform. As such, a capturing shared audio device can capture audio (but perhaps can also perform other operations with respect to audio). In this disclosure, some description of the shared audio device may be included (e.g., master shared audio device, satellite shared audio device, sharing shared audio device, obtaining shared audio device, etc.). These descriptions are intended to be descriptive in nature, and not limiting in scope, and it is to be understood that many of these shared audio devices can perform a wide variety of functions in addition to that described. As such, the communications or networked configurations of multiple embodiments of the shared audio devices can be fluid, changeable, and reliable to transfer a variety of shared audio (that may be captured by one or more shared audio devices) in a substantially controllable fashion.

Certain embodiments of shared audio devices 101, as described with respect to FIGS. 1 to 6, can each include an actuatable segment of a share mechanism 102, such as a share button, which a user of the shared audio device 101 can actuate by such action as physically pressing. An actuating portion of a sharing mechanism can act to join a number of shared audio devices during a particular sharing session, and/or possibly perform some other function(s) relative to the sharing session. In certain embodiments, the actuating portion of the shared audio device can include an authorization portion, by which certain users are authorized to gain access to the shared audio and/or the temporally-associated dissimilar-media information using their shared audio device, as described in this disclosure. Actuating portions of certain embodiments of share mechanisms 102 can be conveniently located on some external casing of a digital camera or camcorder, or some other such location for easy actuation. Certain embodiments of the share mechanisms 102 can include those components and/or processes that allow one shared audio device to share and/or copy audio with at least one other shared audio device during a particular sharing session.

In another embodiment, a share mechanism 102 can be included in a computer and/or controller based program to control the sharing process between multiple shared audio devices. As such, certain embodiments of share mechanisms 102 can integrate a plurality of shared audio devices, since more than one shared audio device are involved in sharing audio. Such a share mechanism can include an actuating portion and/or an authentication or authorization portion. The actuating portion can actuate the sharing mechanism between a number of shared audio devices, a graphical user interface (GUI) or play-back that can project the shared audio to the users across multiple shared audio devices, and an authentication or authorization portion that can provide authentication or authorization between multiple shared audio devices.

A number of other embodiments of the actuating portion of the sharing mechanism can differ considerably from a manually-actuated shared mechanism (such as a share button) to more automatic type devices. Certain embodiments of such shared audio devices can rely on proximity between shared audio devices. Certain embodiments of the sharing mechanism 102 can utilize near-field shared audio devices that are within a prescribed range that can be automatically actuated to copy and/or share the shared audio information. In certain embodiments, the actuating portion of the share mechanism can even be remotely positioned from the associated shared audio device 101, such as in a remote-control of the type that is in common usage for audio systems, television, home entertainment systems, etc.

In another embodiment of the shared audio device 101, as described with respect to FIGS. 1 to 6, physical contact may actuate a share mechanism 102 within plurality of shared audio devices 101. A Java ring (as produced and made commercially available by Dallas Semiconductor) provides an example of a commercially available actuating mechanism that can transmit data (audio-based, image-based, etc.) between numerous devices resulting from physical contact of those devices. An embodiment of a share mechanism 102 can include a Java ring or other similar device to automate actuation of many aspects of sharing audio between multiple shared audio devices 101. In certain embodiments, the actuating portion of the share mechanism can be positioned remotely from the associated shared audio device 101, such as is well known in a remote control of the type that is in common usage for television, etc.

Shared Audio Device Configurations

Figure 5:
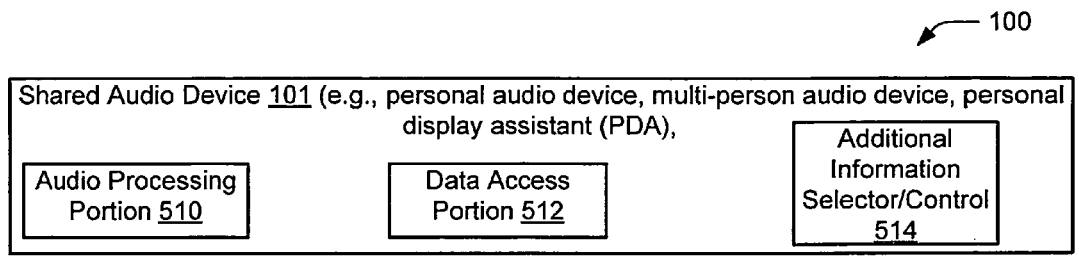
FIG. 5 shows a block diagram of an embodiment of the shared audio network including at least one of the shared audio devices.

Certain embodiments of a single shared audio device 101 can operationally include, be associated with, and/or integrate an audio processing portion 510, a data access portion 512, and/or an additional information selector/control 514 as described herein with respect to FIG. 5 and/or 6. In FIG. 5 and/or 6 the certain operable configurations of the shared audio devices 101 that indicate a variety of operations that can utilize the shared audio device; and similar modifications can be provided between these illustrative figures can also be provided while remaining within the intended scope of the present disclosure. Certain embodiments of the audio processing portion 510 include those elements, components, etc. that are necessary to provide such processing and as may be necessary to transform shared audio, temporally-associated dissimilar-media information, signals, data, audio information, etc. into audio, music, voice, etc. that can be provided from speakers, headphones, etc. In addition, certain embodiments of the audio processing portion 510 can temporally correlate, process, and/or control such additional information as may be provided by the additional information selector/control 514. In certain embodiments, the audio processing portion 510 can be configured to capture, record, obtain, share, process, retrieve, and/or perform other processes with respect to the audio data of the shared audio device 101.

Certain embodiments of the shared audio device can include an audio codec (not illustrated). Certain embodiments of the audio codec can allow audio sharing of the shared audio between a first shared audio device that utilizes audio in a first format and a second shared audio device that utilizes audio in a second format. As such, it is to be understood that certain shared audio devices can communicate with other embodiments of shared audio devices that utilize different formats within the shared audio utilizing one or more audio codecs.

Certain embodiments of the data access portion 512, similar to as described with respect to FIG. 5 and/or 6, can allow the shared audio device 101 to receive and/or transmit a variety of information that can include, but is not limited to, the shared audio, a variety of additional information temporally associated with the shared audio, audio information, graphical information, images, text, metadata, etc. Certain embodiments of the data access portion 512 can be configured to transfer these types of information via the communication link 104 (which may utilize wireless, wired-based, optical-based, ultrasonic, and/or a variety of other technologies to transfer data), similar to as described with respect to FIGS. 1 to 4, from one shared audio device to another.

Other embodiments of the data access portion 512 can include a data storage component that can contain additional information, audio, images, text, etc. associated with the shared audio, such that the additional information, images, text, etc. can be physically provided to the shared audio device. The types of data storage components that can be utilized within the data access portion 512, can include, but are not limited to, read-only memory (ROM), random-access memory (RAM), flash memory, volatile memory, non-volatile memory, removable memory, non-removable memory, and/or other types of memories that can be provided.

Certain embodiments of the data access portion 512 can provide access to digital and/or analog data, audio information digital or analog signals, metadata, vocal, voice, and/or additional information that can be temporally related to the shared audio. Certain embodiments of the additional information selector/control 514 can allow a user to interface with the data access portion 512 to control the shared audio and/or at the additional information that can be utilized by the shared audio device. Consider those instances, for example, where the shared audio devices being utilized by a number of students in a class, a number presentees in a presentation, a number of attendees of a sporting event, and/or a number of attendees to a live Concert. The lecture or classroom notes and/or drawings, as well as words to the songs or words for live concerts or presentations, etc. can be provided either by downloading the data over the communication link, or having a memory device such as flash memory provided to the users in such manner that the data (the shared audio and/or the additional information that can be temporally correlated or related to the shared audio) can be integrated within the shared audio device.

Figure 6:
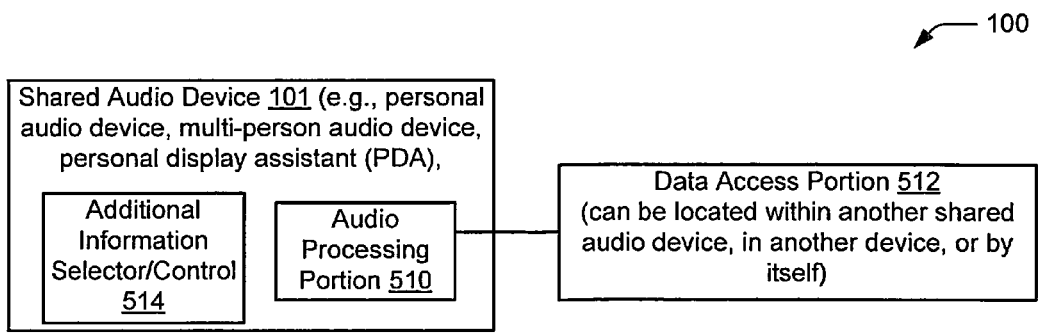
FIG. 6 shows a block diagram of an embodiment of the shared audio network including at least one of the shared audio devices.

Certain embodiments of shared audio devices 101 can effectively have their audio processing portion 510, their data access portion 512, and/or their additional information selector/control 514 operationally separated such that certain ones, or all of, the portions 510, 512, and/or 514 can actually be located within separate ones of one or more shared audio devices, or only one of the audio processing portion 510, as described herein with respect to FIG. 6. FIGS. 5 and 6 indicate that there can be a variety of arrangements of the audio processing portion 510, the data access portion 512, and/or the additional information selector/control 514 can be provided while still utilizing one or more shared audio devices. Other arrangements of the portions 510, 512, and/or 514 can be provided as well, while remaining within the intended scope of the present disclosure.

As described with respect to FIGS. 5 and 6, the audio processing portion 510, the data access portion 512, and/or the additional information selector/control 514 can be provided in a variety of configurations. Additionally, a variety of shared audio and/or additional information can be utilized within a single shared audio device, or alternatively different embodiments of the shared audio device. For example, a single shared audio device 101 can be utilized by: a user (or alternatively, a number of users) that are attending a class in which the additional information might be class notes and/or class drawings; a user attending a live concert or presentation in which textual words are being provided by the shared audio device that correspond to songs; and/or words in one or more languages that correspond to spoken shared audio, in which the shared audio device acts as a language translator for the user. The shared audio device 101 can be configured for a variety of applications depending upon data being provided via the data access portion 512, such as can be controlled by the additional information selector/control 514.

Different embodiments of the additional information selector/control 514 can be menu-driven, and/or controlled by switches, knobs, or any of a wide variety of user interfaces such as can be provided to conventional audio systems.

Examples of the Controller

Figure 7:
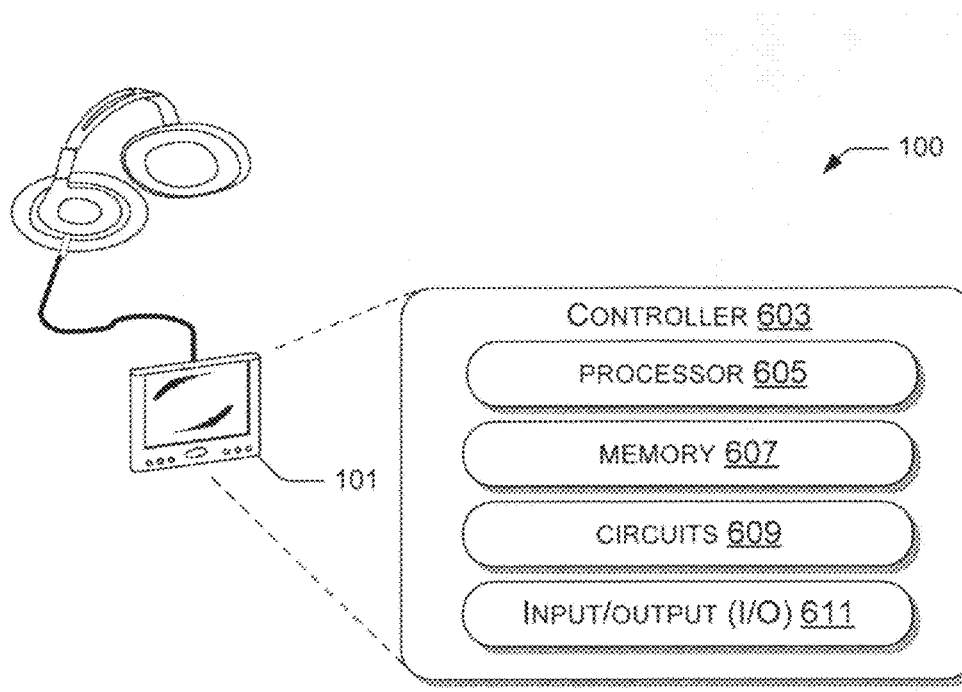
FIG. 7 shows a block diagram of an embodiment of one of the shared audio devices, including one embodiment of a controller.
Figure 8:
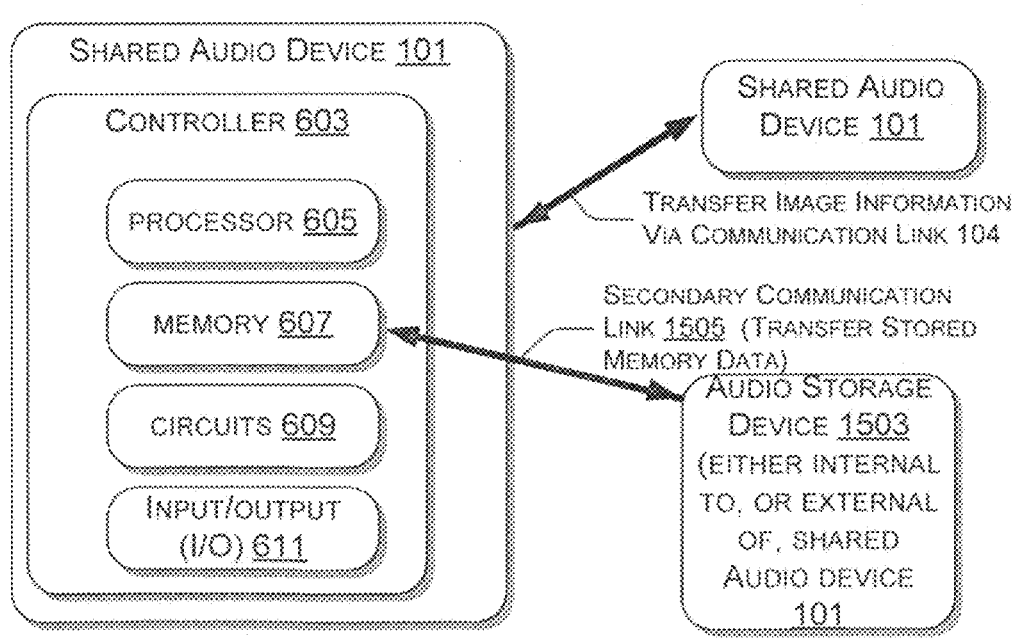
FIG. 8 shows a block diagram of another embodiment of one of the shared audio devices, including another embodiment of a controller.

Shared audio devices can be applied to provide a large variety of audio sharing applications, including but not limited to sharing of at least some temporally-associated dissimilar-media information and/or shared audio. It is envisioned that the role of a single shared audio device can be varied (perhaps by reconfiguring the user interface, downloading different software, hardware, and/or firmware into the shared audio device, etc.), to provide different applications based at least in part on varying a configuration or operation of a controller. This portion describes certain embodiments of the controller. This portion describes certain embodiments of the controller that may be configured to allow such functionality and alterability. Many embodiments of shared audio devices utilize processing and/or filtering techniques when performing a variety of processes of respect to the shared audio and/or the temporally-associated dissimilar-media information such as can be provided by the audio processing portion 510 as described with respect to FIGS. 5 and 6. FIGS. 7 and 8 show two different embodiments of a controller 603 (they can be provided utilizing a computer, microprocessor, microcontroller, etc.) as can be integrated within certain embodiments of the shared audio device 101 to assist in providing the sharing of at least portions of shared audio and/or other information associated with the shared audio between multiple shared audio devices. Certain sharing-related aspects, such as synchronization and/or designation of aspects as described within this disclosure, can be performed by the controller 603. For example, consider a pair of shared audio devices 101, in which each one of the two shared audio devices 101 as described with respect to FIG. 7 and/or 8, provides an example of either a peripheral shared audio device and/or an obtaining shared audio device. As such, in different embodiments, two obtaining shared audio devices can be operably coupled to each other, two peripheral shared audio devices can be operably coupled to each other; or one peripheral shared audio device can be operably coupled to an obtaining shared audio device in a manner that allows transmitting audio information at, or receiving audio information at each or both of the shared audio devices 101.

As described within this disclosure, multiple embodiments of the shared audio devices 101 are able to transfer audio information, one or more portions of audio, etc. to each other via the communication link 104. One embodiment of the controller 603 includes a processor 605 such as a central processing unit (CPU), a memory 607, a circuit or circuit portion 609, and an input output interface (I/O) 611 that may include a bus (not shown). In certain embodiments, the processor 605 can have a more limited capacity than perhaps a CPU, such as would occur with a microprocessor or microcomputer. Different embodiments of the controller 603 can be a general-purpose computer, a specific-purpose computer, a microprocessor, a microcontroller, a personal display assistant (PDA), and/or any other known suitable type of computer or controller that can be implemented in hardware, software, electromechanical devices, and/or firmware. Certain portions of the controller 603 can be physically or operably configurable in each shared audio device as described with respect to FIGS. 1 to 4. With certain embodiments of the shared audio device, the processor 605 as described with respect to FIG. 7 performs the processing and arithmetic operations for the controller 603. The controller 603 controls the signal processing, database querying and response, computational, timing, data transfer, and other processes associated with the shared audio device. In certain embodiments, one or more simplified versions of the controller 603 that can be provided with respect to FIG. 7 and/or 8, and that could be configured to provide a transfer of shared audio between multiple shared audio devices.

Certain embodiments of the memory 607 include random access memory (RAM) and read only memory (ROM) that together store the computer programs, operands, and other parameters that control the operation of the shared audio device. In certain embodiments, the memory can include flash memory or other similar memory components. The memory 607 can be configurable to contain the shared audio information obtained, retained, or captured by that particular shared audio device 101 (that may be configurable in different embodiments as the peripheral shared audio device of the obtaining shared audio device).

In certain embodiments, the bus is configurable to provide for digital information transmissions between the processor 605, circuits 609, memory 607, I/O 611, and/or the audio storage device 1503 as described with respect to FIG. 8. In this disclosure, the memory 607 can be configurable as RAM, flash memory, semiconductor-based memory, or any other type of memory that is configurable to store data pertaining to audio. The bus also connects I/O 611 to the portions of the shared audio devices that either receive digital information from, or transmit digital information to other portions of the shared audio network 100.

Certain embodiments of the shared audio device 101 as described with respect to FIG. 7 includes a transmitter portion (not shown) that can be either included as a portion of the controller 603, or alternately can be provided as a separate unit (e.g., microprocessor-based). In certain embodiments, the transmitter portion can transmit audio information between different shared audio devices over wired and/or wireless communication links.

Certain embodiments of the shared audio device 101 as described with respect to FIG. 7 includes an operation altering portion (not shown) that can be either included as a portion of the controller 603, or alternately can be provided as a separate unit (e.g., microprocessor-based). Examples of operation altering portions include, but are not limited to, altering a resolution, altering a contextual library, altering an aspect ratio, altering a color intensity and/or brightness at a second shared audio device (such as an obtaining shared audio device) by transmitting appropriate audio information from a first shared audio device (such as a peripheral shared audio device).

The memory 607 can provide one example of a memory storage portion. In certain embodiments, the monitored value includes, but is not limited to: a percentage of the memory 607, a certain amount of audio that is stored in the memory 607, or for motion audio recording interval (audio or video recording intervals).

To provide for overflow, primary, secondary, or additional ability for the memory 607 of certain embodiments of the shared audio device 101, the audio storage device 1503 as described with respect to FIG. 8 can operably couple to the memory 607 to allow a controllable transmitting of memory data, audio-related signals, and/or other audio-related data from the shared audio device 101 to the audio storage device when the monitored value of data within the memory 607 (e.g., the memory storage portion) exceeds a prescribed value. One embodiment of the audio storage device 1503 as described with respect to FIG. 8, can be attached to, but is not limited to, the data access portion 512, as described with respect to FIG. 5 or 6. The prescribed value can include, e.g., some percentage amount or some actual amount of the value. In different embodiments, the audio storage device 1503 can be included as a portion of the shared audio device 101, as external to the shared audio device, or as electrically connected (such as by an electrical coupling) to the shared audio device. Different embodiments of the audio storage device 1503 can be configurable as a mobile random access memory (RAM) device, a flash memory device, a semiconductor memory device, or any other memory device (that may or may not be distinct from the memory 607) that can store shared audio, audio information, data, temporally-associated dissimilar-media information, etc. within the memory 607.

In certain embodiments, a secondary communication link 1505 can be established between the shared audio device 101 (for example, the memory 607) and the audio storage device 1503. The secondary communication link 1505 can be structured similar to as the communication link 104, as described with respect to FIGS. 1-4, or alternatively can utilize network-based computer connections, Internet connections, etc. to provide data transfer between the shared audio device 101 that includes the controller 603, and the audio storage device 1503. The secondary communication link 1505 can be established prior to, during, and/or following the existence of the shared session.

In certain embodiments of the shared audio device 101, the particular elements of the controller 603 (e.g., the processor 605, the memory 607, the circuits 609, and/or the I/O 611) can provide a monitoring function to monitor the amount of shared audio, temporally-associated dissimilar-media information, and/or audio information contained therewithin. Such a monitoring function by the shared audio device can be compared to a prescribed limit, such as whether the number of audio (songs, tracks, etc.) contained in the memory 607, the amount of data contained within the memory 607, or some other measure relating to the memory is approaching some value. The limits to the value can, in different embodiments, be controlled by the user or the manufacturer. In certain embodiments, the memory 607 stores audio relating to an audio embodiment of the shared audio device. In certain embodiments the measure relating to the memory approaching some value may pertain to some recording duration, such as audio recording duration or associated video recording duration. Using the recoding duration, certain embodiments of motion picture shared audio devices can thereby quantify how much the shared audio, or other audio, has captured.

In certain embodiments, the I/O 611 provides an interface to control the transmissions of digital information between each of the components in the controller 603. The I/O 611 also provides an interface between the components of the controller 603 and different portions of the shared audio device. The circuits 609 can include such other user interface devices as a display and/or a keyboard (which can be varied, miniaturized, and/or be provided in a variety of graphical-based user interfaces for certain embodiments of shared audio devices).

In other embodiments, the controller 603 can be constructed as a specific-purpose computer such as an application-specific integrated circuit (ASIC), a microprocessor, a microcomputer, or other similar devices. A distinct controller 603 can be integrated into certain embodiments of the shared audio device 101, the share mechanism 102, and/or the communication link 104, as described with respect to FIG. 1, 2, 3, 4, 5, or 6.

In certain embodiments, the shared audio device 101 including the controller 603 can be configured as a peripheral shared audio device. Such peripheral shared audio devices can be configured to include sufficient audio storage in the memory 607 to allow storage of the audio for a session. Additionally, in certain embodiments the peripheral shared audio device can transmit operational instructions (either computer based or manual) to instruct either a user at the obtaining shared audio device how to operate the obtaining shared audio device; or ultimately can automatically operate the obtaining shared audio device(s) according to the operating information or instructions. The operating information or instructions can include, but is not limited to, how much audio to capture, where and how to capture the audio (direct on a recording of the audio utilizing speaker layout to and/or directionality), the subject of the desired audio, recording characteristics, audio quality, etc. In this manner, certain embodiments of peripheral shared audio devices can effectively control the operation of an associated obtaining shared audio device by effective use of operating information.

Examples of Temporally-Associated Dissimilar-Media Information within Shared Audio Devices Certain embodiments of the shared audio device 101 are configured to allow temporal coordination of certain media, which may in certain embodiments be audio-based or non-audio-based, with at least some shared audio (or alternatively some information or data that is related to the at least some shared audio). Certain embodiments of the shared audio device 101 can provide for sharing at least some audio information between multiple shared audio devices, as well as storing, sharing, processing, altering, deleting, and/or other processes of temporally-associated dissimilar-media information utilizing a variety of embodiments of one or more shared audio devices. Certain embodiments of the additional information, such as selected and/or controlled by the additional information selector/control 514 as described with respect to FIG. 5 and/or 6, can include, but are not limited to, the temporally-associated dissimilar-media information as described within this disclosure, and vice versa. Certain embodiments of shared audio devices 101 allow for coordination between the at least some audio information and the temporally-associated dissimilar-media information that is being shared between multiple shared audio devices. To consider the large variety of temporally-associated dissimilar-media information that can be displayed and/or provided by the shared audio device, it is important to consider the varied applications of the shared audio device 101.

Certain embodiments of the media may be characterized as including temporally-associated dissimilar-media information, which can be considered as being temporally associated with the at least some audio information, as well as including the similar-media as the at least some audio information. As such, the user of certain embodiments of shared audio devices can utilize (hear, see, feel, or otherwise experience) temporally-associated dissimilar-media information that can (but does not have to) vary in some temporal fashion based upon some variation of at least some shared audio. Having the temporally-associated dissimilar-media information being temporally associated to the shared audio indicates that the selection of the playback-time, display time, presentation time, etc. corresponds approximately to the shared audio. Certain embodiments of the temporally-associated dissimilar-media information may include dissimilar media from the at least some shared audio. Examples of media that are dissimilar from the at least some audio information may include text, audio (that contains dissimilar content from that provided by the shared audio, such as audio from an announcer, audio in another language or dialect, etc.), images, graphics, drawings, sound recordings, etc.

Certain embodiments of shared audio, or alternatively shared audio information, that extend between multiple shared audio devices, can include words/songs/audio/etc. spoken directly from the presenter/teacher/announcer to the presentee/student/listener. The shared audio can thereby generally utilize one or more communication link(s) established between an obtaining shared audio device and one or more personal shared audio devices. As such, the combination of the obtaining shared audio device with a personal shared audio device allows for temporally coordinating the temporally-associated dissimilar-media information provided over the personal shared audio device with the shared audio spoken directly from the presenter/teacher/announcer to the presentee/student/listener.

Other embodiments of shared audio, by comparison, extend along the communication link from the obtaining shared audio device to one or more personal shared audio devices. In these embodiments, the shared audio and the temporally-associated dissimilar-media information both can generally travel in parallel over one or more communication links established between the obtaining shared audio device and the personal shared audio device. Certain embodiments of temporally-associated dissimilar-media information may be relatively sporatically displayed as compared to the shared audio (containing, for example, still or moving images of a player or performer, statistics, or other information) that change every once in awhile, as compared to shared audio that may change more continously.

Certain embodiments of the temporally-associated dissimilar-media information (which can be temporally associated with the at least some audio information) allows for some retrieval of certain types of media based on the particular at least some audio information that is being provided. For example, consider a sporting event in which during a particular time, a considerable amount of the audience or spectators focus upon audio relating to a particular player, performer, etc. As such, a variety of the shared audio devices that are configured to provide the temporally-associated dissimilar-media information to an audience that relate to the audio information; and in certain embodiments, individual or group member of the audience can select that particular information that may be of great concern. For example, during a period when a particular field-goal kicker for football team is attempting a field goal, particularly relevant temporally-associated dissimilar-media information may include, but is not limited to, the field-goal kicker's name, field-goal percentages, other statistics, college, previous teams, prior experience, and the like. In the case of live-concert, such as an opera, an example of relevant temporally-associated dissimilar-media information may include, but not be limited to, the words in the language that the opera is being sung in, or in certain embodiments, a translated language, as well as the name, and perhaps a description, of the performers. In the case of the live-concert, such as a rock concert, an example of relevant temporally-associated dissimilar-media information may include, but not be limited to, the words of the concert in the language of the concert and/or a translated language, and a description of the band and/or its members. As such, many documents of the temporarily-associated dissimilar-media information can vary depending upon a particular application, and how the user configured a shared audio device. Each user can customize the temporally-associated dissimilar-media information presented by the shared audio device 101 utilizing their additional information selector/control 514 as described with respect to FIG. 5 and/or 6. Each shared audio device can be configured to provide certain temporally-associated dissimilar-media information whenever a particular event (such as a sporting event or other performance) occurs.

Certain embodiments of temporally-associated dissimilar-media information therefore can be statistically related. A particular user, with access to information from which they can derive statistics, can thereby derive their own (e.g., customized) statistical information using the shared audio device. For example, consider that a user of shared audio device wishes to display particular statistics relating to the shared audio, and the statistical information could be updated based upon input from the shared audio. As such, the temporally-associated dissimilar-media information could indicate live updates as to batting and/or pitching averages (in baseball), for example. As such, a particular shared audio device can be configured to maintain the batting/pitching averages or other temporally-associated dissimilar-media information of individual players that may be updated virtually instantaneously based at least partially upon input received from the shared audio.

Figure 9:
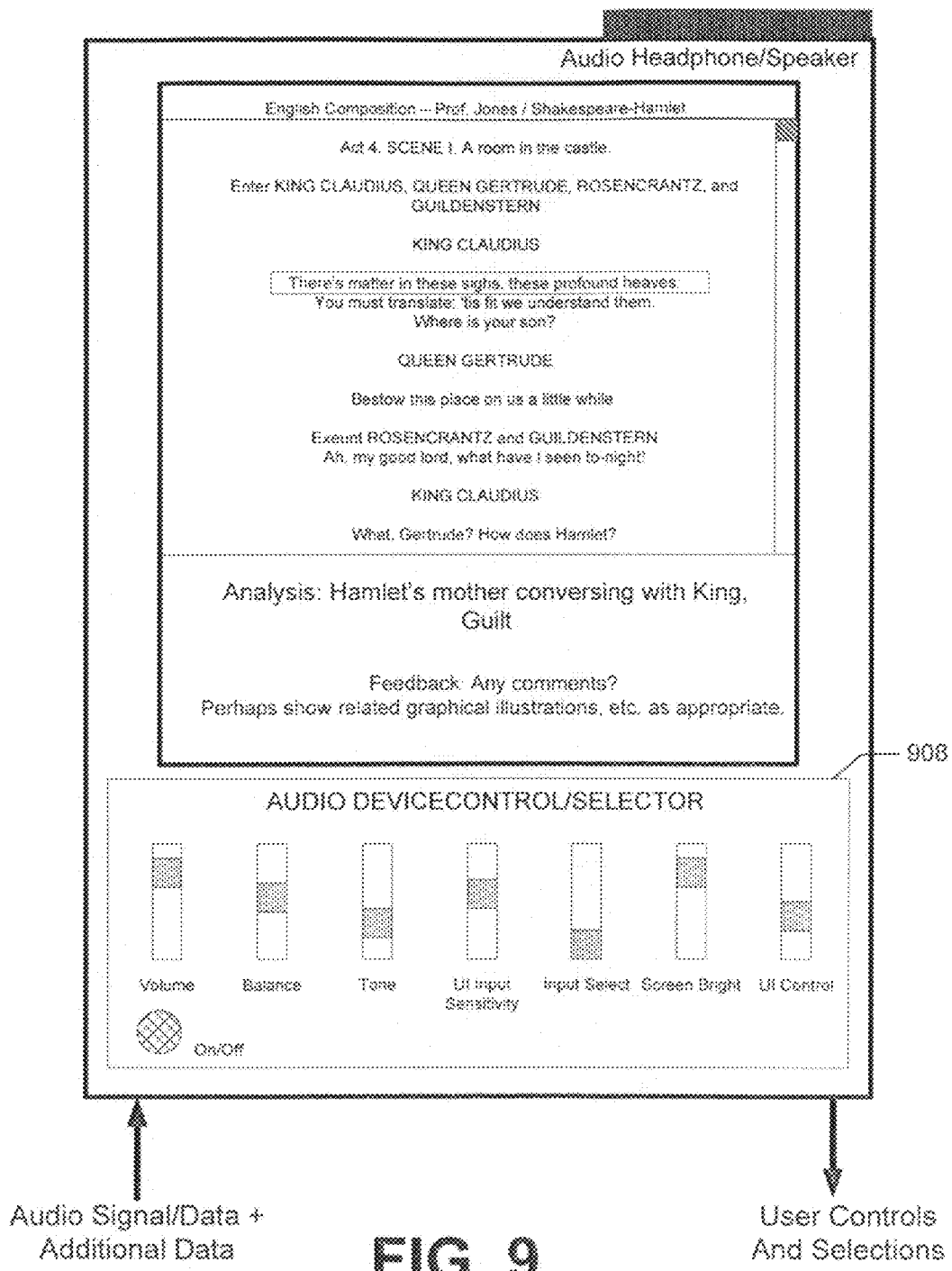
FIG. 9 shows a front view of one embodiment of the shared audio device that includes one embodiment of a display that can be used for teaching application.
Figure 10:
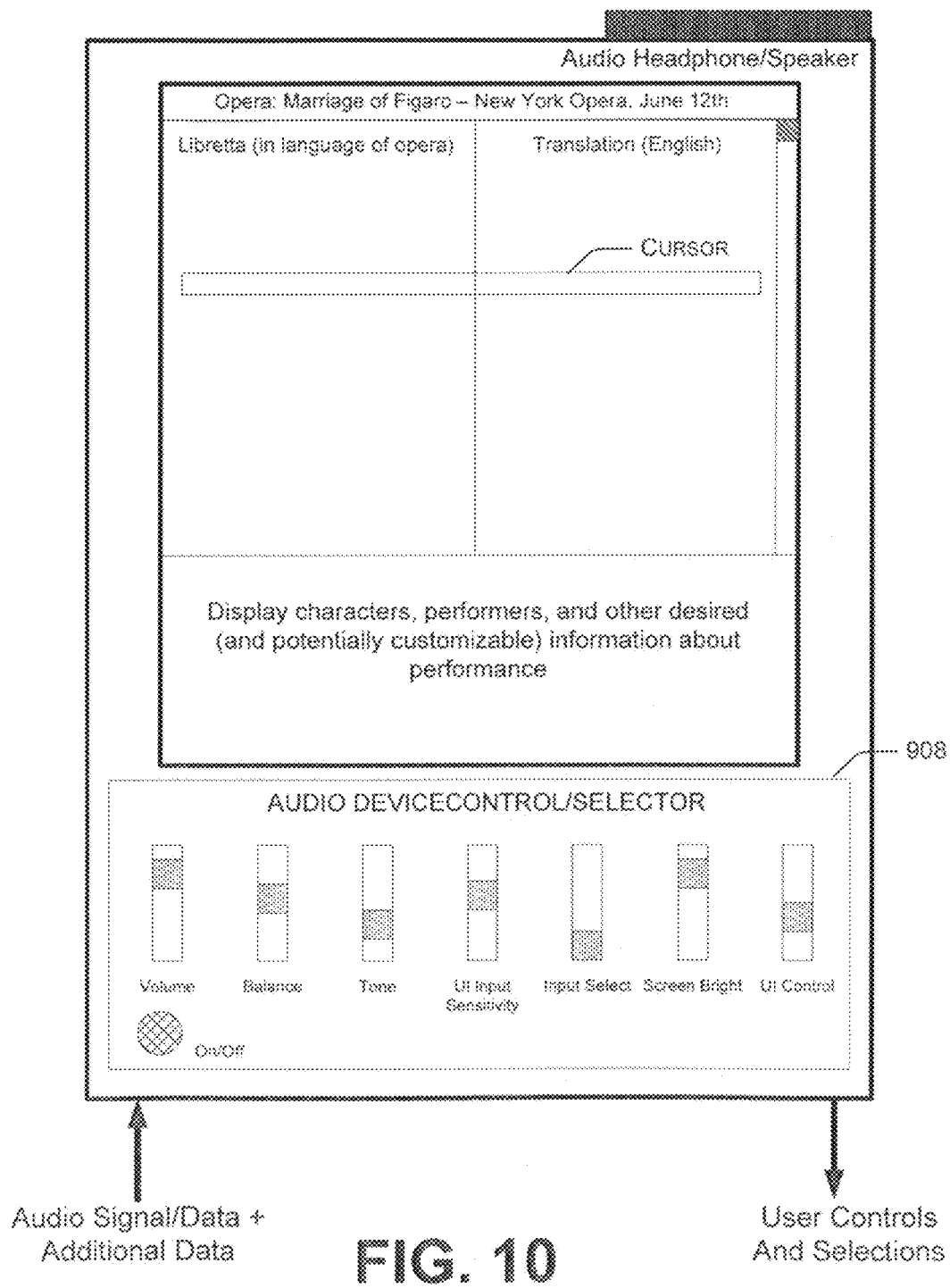
FIG. 10 shows a front view of another embodiment of the shared audio device that includes another embodiment of the display that can be used for a live-concert application.
Figure 11:
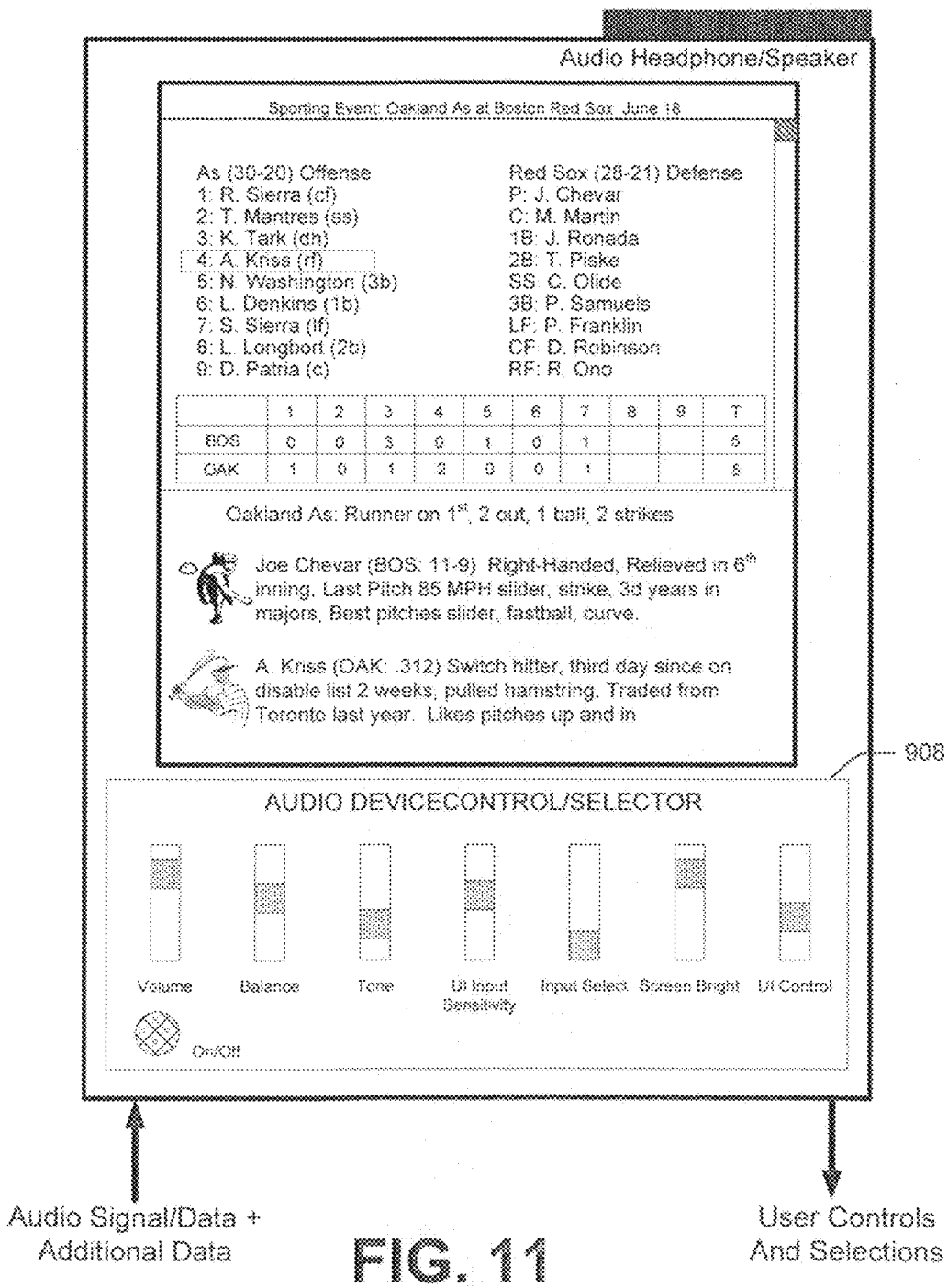
FIG. 11 shows a front view of still another embodiment of the shared audio device that includes yet another embodiment of the display that can be used for sports-event application.

There are a variety of types of temporally-associated dissimilar-media information that can be provided in addition to some shared audio, which can include, but are not limited to, textual information relating to a particular lecture, concert, performance, sporting event, etc.; and/or image information that may relate to a current performer, sports figure, writer, author, etc. Additionally, some additional audio that may be provided either in combination with, or to supplement, the shared audio. FIGS. 9 to 11 illustrate a variety of embodiments of textual and/or image types of temporally-associated dissimilar-media information, that are illustrative in nature and are not intended to be limiting in scope.

Consider, for example, FIG. 9 that provides some outlined information pertaining to a current lecture (in this instance relating to an English class relating to Shakespeare Works) but these concepts could apply to virtually any subject in a similar or dissimilar language to that known by the user of the shared audio device. For example, the shared audio device could be readily used to provide drawings, equations, figured, notes, text, etc. as temporally-associated dissimilar-media information in math, physics, or other science classes that rely heavily on graphs, equations, etc. that could be provided. As such, errors in notes for students of such classes could be reduced by using many embodiments of shared audio devices, in which the equations, diagrams, images etc. could be provided as temporally-associated dissimilar-media information.

The display of certain embodiments of a shared audio device can provide a current translation of a language provided by a person speaking in a foreign language, similar to as indicated with respect to the temporally-associated dissimilar-media information displayed in FIG. 10 (which provides a translation of an opera). As such, the shared audio device 101 can act as an excellent translator depending upon the selected temporally-associated dissimilar-media information.

Certain embodiments of the shared audio device 101, as described with respect to FIGS. 9 to 11, can include a control input portion 908 by which the user can control, utilizing a variety of techniques, the operation of the shared audio device. As such, a variety of information can be provided in different embodiments of the shared audio device, and additionally be transferred between shared audio devices. For example, it is envisioned that certain embodiments of shared audio devices can be configured to provide a variety of temporally-associated dissimilar-media information depending, for example, upon who is using the shared audio device, the location of the shared audio device, and/or particular input pertaining to the shared audio device. As such, the types of the shared audio and/or the temporally-associated dissimilar-media information that is provided to the user of the shared audio device depending upon the particular use of the shared audio device. For example, a shared audio and/or a displayed temporally-associated dissimilar-media information that is provided to a user of the shared audio device who is attending a concert may in certain embodiments be expected to differ considerably from the shared audio and/or temporally-associated dissimilar-media information for a user attending a classroom lecture.

A variety of different control inputs 908 can be provided for different embodiments of the shared audio device 101 that may include, but are not limited to: analog switches and controls, digital switches and controls, menu-driven controls, etc. of a similar type to those that are utilized in audio devices, computers, personal display assistants (PDAs), etc. Considering that the user interfaces of the commercially-available audio devices have been modified to be approved to often provide greater appearance, functionality, and/or reliability. Such modifications of user interfaces for audio devices are expected to continue into the future.

Certain embodiments of the shared audio device can be applied to many embodiments of live concerts, such as illustrated with respect to FIG. 10. For example, consider that audience audio systems (e.g., large speaker systems suited for an entire audience) are often attempted to be provided for an entire audience as a one-size-fits-all audio solution. As such, individuals who attend a live concert are unable to control such acoustic characteristics as the volume, balance, tone, fidelity, etc. of the audio. In certain large concert venues, the audio from such stadium audio systems, for example, can echo and may provide other such distortions, thereby possibly diminishing the audio fidelity provided by certain embodiments of shared audio devices. For example, concert-attendees or sporting event-attendees located in the upper rows of a large stadiums seldom experience superior audio from existing audio systems. Certain concert venues may be even unable to host a concert simply because the concert would provide too much noise within the particular neighborhood. As such, providing audio to live concerts may represent a balancing of interests, which is seldom optimized. This disclosure provides a variety of techniques by which personal shared audio devices can be provided to attendees of concerts, etc., by which individual concert, sporting event, etc. attendees can, in many embodiments, experience individually-controllable audio characteristics such as audio of a relatively high or low quality.

In certain embodiments, during such an event, a number of audio feeds may be provided which relate generally to the particular event; but may differ based on an announcer(s) or commentator(s), spoken language(s), the type of information being provided, etc. As such, users have many embodiments of personal shared audio devices that can control many aspects of shared audio devices. As such, the shared audio device 101 provides a number of techniques by which a variety of users attending a variety of events, classes, or performances may desire to have a personal audio experience. Certain embodiments of shared audio devices can even be rented at an event, in a similar manner to which attendees of a sporting event or concert may purchase a program. Many embodiments of shared audio devices can be configured to provide similar information as programs, however the information provided by many embodiments of shared audio devices can be modified and/or are responsive to a current state of the shared audio.

Certain embodiments of shared audio devices can thereupon be configured as a personal shared audio device. For certain embodiments of the personal shared audio device, live-feed from the performer(s) can be directed to concert-attendees over a wired connection, a wireless connection, a datalink connection, or alternatively any other type of connection known to transfer audio data/information. Certain embodiments of the personal shared audio devices can be configured to be controlled by the user, and thereby, the personal shared audio device can be configured for filtering, controlling, and/or otherwise processing whichever audio (including, but not limited to, the at least some audio information and/or the temporally-associated dissimilar-media information) is received over the shared audio device. In certain embodiments of concert venues utilizing shared audio devices in which the neighborhood noise is a significant or limiting concern, as well as certain other concerts, the volume of the audience-speaker audio can be considerably reduced, and each user of a shared audio device can thereupon select their individual volume, filtering processes, types of information provided, etc. Those users of certain embodiments of shared audio devices that are sitting in far-removed seats can thereupon obtain individually audio-characteristics-controllable audio over their shared audio devices.

Consider, for example, the shared audio device that is being utilized to provide shared audio for a sporting event, classroom, or other presentation. As one more sports announcer, presenter, teacher, etc. may provide the at least some shared audio over an obtaining shared audio device 101; it is to be understood that each individual may be associated with one or more distinct streams of shared audio and/or other information or data that are shared between shared audio devices. The user of certain embodiments of personal receiving shared audio device 101 that is receiving the shared audio may also select among a variety of the temporally-associated dissimilar-media information that can be received. A user interface, selector, or other suitable mechanism can be utilized to multiple received streams of shared audio. The user of each personal receiving shared audio device 101 may in certain embodiments also select that particular information that they wish to have displayed for a particular event, and also may in certain embodiments select how the received information is to be displayed. In this manner, the information provided to each user of a personal receiving shared audio device 101 may be customized by and/or for that particular user. In certain embodiments, the user of each personal shared audio device may select a language in which the shared audio is provided, as well as between a number of announcers. In sporting embodiments involving shared audio devices, one embodiment of the temporally-associated dissimilar-media information can include, for example, text, images, or other audio pertaining to a particular sports figure who may be the temporary center of attention (e.g., a hockey player with the puck, a baseball player up at bat, etc). In certain classroom embodiments involving an obtaining shared audio device utilized by the teacher/presenter/professor, certain embodiments of personal/receiving shared audio devices may receive temporally-associated dissimilar-media information can include black-board or white-board type information associated with the teacher's presentation. For example, consider a potential use of certain embodiments of shared audio devices in which a teacher of a class wishes to discuss a particular topic relating to a picture or drawing; such a picture or drawing can be presented over a display of the shared audio device. In certain embodiments, a teacher or professor can control which slide to provide to their students personal/receiving shared audio devices, such as utilizing a control, switch, user interface, etc. Consider that a language teacher, poetry teacher, etc. may wish to describe a particular poem, provide a snippet of a speech or other audio track, etc. The class could, in certain instances, listen to the particular poem, audio, speech, other audio, etc. that may be considered as temporally-associated dissimilar-media information, at least partially utilizing their shared audio devices. Other types of temporally-associated dissimilar-media information can also be provided in certain embodiments such as images, drawings, graphs, other audio, etc. In certain embodiments of shared audio devices, the temporally-associated dissimilar-media information can be provided in combination with the shared audio as spoken directly by the professor or teacher. In certain embodiments of shared audio devices, the professor or teacher can even speak a keyword or activate some media-switching device so that all the shared audio devices that are providing temporally-associated dissimilar-media information can be synchronized to the particular lecture or performance.

In many instances, the particular temporally-associated dissimilar-media information that can be provided as being temporally coordinated with the at least some audio information can be prepared by the teacher, presenter, professor, etc., prior to the presentation, to transfer from their obtaining shared audio device to their student's personal receiving shared audio devices during the presentation. In many embodiments, the students can thereby select segments of the particular temporally-associated dissimilar-media information that they will receive on their shared audio device (e.g., a tuning or filtering function), and in many embodiments, students can also select segments of the shared audio and/or temporally-associated dissimilar-media information that they will save (e.g., a saving function). The students can thereupon review their received temporally-associated similar-media information, as well as the shared audio, as desired. In those instances where the temporally-associated dissimilar-media information includes drawings and/or text (e.g., words, sentences, paragraphs, etc.), the temporally-associated dissimilar-media information can be provided as graphical images directly to the users of the participating shared audio devices. For example, during a physics, math, or science lecture, it would be likely that much of the temporally-associated dissimilar-media information could include graphs, equations, scientific principles or tutorials, associated text, etc.

In certain embodiments, the users of shared audio devices can handwrite their notes over the temporally-associated dissimilar-media information in a similar fashion to PC handwriting programs such as provided by many tablet-PCs. Such handwriting characteristics over computer screens are commercially available, and will not be further detailed herein.

As a result, a teacher, presenter, professor, performer, etc. associated with the class or presentation may not have to spend the time to draw graphs, equations, and/or text upon a whiteboard and/or the blackboard, which can represent a considerable time savings considering conventional classroom techniques. Additionally, students or attendees do not have to spend time copying certain notes that have been prepared for those embodiments of shared audio devices that are capable of storing audio and/or other temporally-associated dissimilar-media information. Allowing the students to select that particular temporally-associated dissimilar-media information and/or shared audio that they wish to receive on certain embodiments of their personal shared audio device can allow students a more interactive learning experience. In addition, classes, presentations, etc. can be made more seamless. In addition, teachers who are presenters can be free to provide more elaborate versions of the temporally-associated dissimilar-media information, which may be useful for teaching, emphasizing of a particular point, etc. Certain embodiments of the obtaining shared audio device and/or the personal receiving shared audio devices, can be provided by the school and/or university that is providing the class; wherein certain embodiments of the obtaining shared audio device and/or a personal receiving shared audio devices can be owned by the teachers and/or students. Certain embodiments of shared audio devices can be configured as either obtaining shared audio devices and/or personal receiving shared audio devices.

It may often be difficult for concert attendees to understand many of the words spoken or sung during a concert. In certain large and/or remote classes, the audio may not be of a desired characteristic, quality, etc., and may not be individually controllable. This can become especially true in large and/or remote venues, when sounds over speaker systems can become distorted based on such audio distortions as feedback, echoing, etc. This can also be true when a concert attendee is attending a concert that is not being performed in their native language. Certain embodiments of the shared audio devices can provide certain types of the temporally-associated dissimilar-media information synchronized with a particular lecture or performance. In certain embodiments of shared audio devices, the temporally-associated dissimilar-media information can thereby present words or lyrics of which a live-performer, presenter, and/or teacher is currently saying or singing. Consider an instance of an opera or other performance in a foreign language, the temporally-associated dissimilar-media information can include audio, words, text, and/or graphics, etc. that pertains to one or more languages. As such, certain embodiments of the shared audio devices can effectively allow temporally-associated dissimilar-media information to be overlayed, and thereby operate as a translator system that can be effectively used as a teaching tool to learn a foreign language. A variety of cursors can be provided to act as a placeholder for at least one of the displayed languages.

Certain embodiments of the at least some audio and/or the temporally-associated dissimilar-media information included as live-concert material may be protected by copyright protection. Consider that certain shared audio devices can be configured to record certain audio. As such, certain embodiments of shared audio devices that are configurable to allow for a copyright-protection may allow only that audio and/or other information that is not copyright-protected to be recorded. Those streams of audio and/or other data that are copyright protected can be transmitted over certain data-links that are not recordable. As such, certain embodiments of shared audio devices that include recording functionality can receive data over recordable-data streams and non-recordable data streams. Copyright, and otherwise proprietary information, can be transmitted to one or more of the shared audio devices over the non-recordable data streams.

It is to be understood that the type of data that is being provided to the users of the shared audio devices has to be consistent with the data that can be utilized by each of those shared audio devices. For example, displaying certain drawings as temporally-associated dissimilar-media information over shared audio devices requires that the shared audio devices also include a location to graphically display such temporally-associated dissimilar-media information. Providing certain additional audio or other acoustic information as temporally-associated dissimilar-media information requires that each particular participating shared audio device be configured to adequately present multiple streams of audio (at least one stream corresponding to the temporally-associated dissimilar-media information, and at least another stream corresponding to the at least some audio).

In a classroom/presentation type session, certain embodiments of shared audio devices can be configured either as audience shared audio devices (such as obtaining shared audio device, most likely used by the teacher/presenter), or alternatively personal shared audio devices (such as peripheral shared audio devices, most likely used by the students/presentees). Audience shared audio devices can be considered as those shared audio devices that can present the shared audio to at least one, but typically two or more, or alternatively the entire audience. Personal shared audio devices can be considered as those shared audio devices that can present shared audio to a single user.

Certain embodiments of the shared audio devices allow the temporally-associated dissimilar-media information and/or the at least some audio information to be stored thereupon. As such, any at, least some audio information and/or temporally-associated dissimilar-media information can be saved, and/or later retrieved or reviewed by the users/student/presenter/etc.

Examples of Personal Shared Audio Devices

As described in many embodiments of the shared audio devices in the current disclosure, many embodiments of personal shared audio devices allow for multiple users of shared audio devices to each selectively control input to their particular shared audio device. Such control of the input to the shared audio devices can include, but is not limited to, control of the at least some audio information and/or control of the at least some temporally-associated dissimilar-media information. Controlling of the temporally-associated dissimilar-media information includes such aspects as selecting languages of the audio input, controlling volume, audio fidelity, balance, and/or other audio characteristics of the audio, selecting between certain temporally-associated dissimilar-media information, controlling muting of the audio input, filtering audio input, allowing student input and/or feedback to particular class or presentations, and a variety of techniques often associated with digital signal processing techniques.

The different embodiments of the personal shared audio divide therefore allow users to largely control their concert, sporting event, learning, or other experience. The users of certain embodiments of shared audio devices can control the shared audio and/or the temporally-associated dissimilar-media information that is being provided by the shared audio device.

Different embodiments of shared audio devices can either reduce or block out the audio provided, for example, at a large concert hall. For example, certain embodiments of shared audio devices can be configured as noise-reducing headsets that may, or may not, include active-noise cancellation techniques such as is commercially available with current headsets.

Certain embodiments of the personal shared audio devices can include delay structure such that the time that the shared audio and/or the temporally-associated dissimilar-media information is provided to the user more closely corresponds to the time that it is presented over the audience audio systems. As such, certain embodiments of the personal shared audio system provide a mechanism to enhance the audio provided to the user, instead of attempting to provide a second audio source.

Examples of Sharing Sessions

As described in this disclosure, it may be useful in certain embodiments (while not in other embodiments) to incorporate some type of a sharing session that extends for the duration of a session in which at least one shared audio device associate, on a sharing basis, with those other member shared audio devices. As such, the sharing session can represent the duration over which certain embodiments of shared audio devices 101 may share their shareable resources, such as audio files.

Certain embodiments of sharing sessions may be temporary, and thereby last for a prescribed duration. For example, certain examples of sharing sessions can be associated with a particular event, such as a class or alternatively a live concert. With many embodiments of the shared audio devices 101, as soon as the sharing session is complete, the member shared audio devices will not be able to share shared audio and/or temporally-associated dissimilar-media information associated with the sharing session. As such, a particular user of a shared audio device can be provided authorization to access an event such as a live concert, translated event, classroom event, etc. for a particular night, but the following night the same user would not be have access to another event at the same location. Similarly, a shared audio device being used in a classroom/presentation/translation configuration may also be provided with limited authorization so they will not be provided with a relatively temporary authorization. In certain embodiments, the shared audio devices can thereby be provided with an authorization portion that can allow the user/shared audio device to be authorized to access shared audio, temporally-associated dissimilar-media information, etc. for a sharing session.

In certain embodiments of shared audio devices, at least some sharing sessions with particular users can be less temporary considering the potential life of the shared audio device. For example, a single user may utilize a number of shared audio devices, and then may wish to transfer shared audio between, for example, an shared audio device that is obtaining some shared audio and at least one other (e.g., peripheral) shared audio device.

There can be many embodiments of types of sharing sessions, as described within this disclosure. For example, in some sessions, the shared audio that has been captured can be shared or copied between some of the other shared audio devices 101. As such, if a number of shared audio devices each captured an audio (or portions thereof) for a particular sharing session, then some of the shared audio devices can be expected to have a large number of shared audio to capture, process, manage, consider, store, and/or view. In other embodiments of the sharing sessions, only a certain number of the audio are shared or copied with certain shared audio devices.

One embodiment of the sharing session may involve a group of users for a session (e.g., a sporting event, a concert, a classroom, or parents for a particular child's birthday party), each of which have a shared audio device that may be configurable (authenticated or authorized) to gain access to the shared audio at that event. In one embodiment, certain shared audio devices 101 could obtain or retain shared audio even after they had left, but before the event has ended. It is likely that the shared audio network 100 would utilize one or more wireless links to provide the flexibility between the shared audio devices such as is provided with certain local area networks. Alternatively, the audio could be accessed later over e.g., wide area networks to obtain or retain large volumes of the data associated with a number of pictures.

For certain embodiments, it may be desired to allow a certain shared audio device 101 to join a plurality of concurrent sharing sessions. A user would then be able to determine which one of multiple sharing sessions they wished to be a member. As such, such a shared audio device 101 could obtain or retain information from at least certain other shared audio devices from both/all of the concurrent sharing sessions. Access to the multiple sharing sessions can be covered by providing multiple passwords or pass-phrases that each relate to the different concurrent sharing sessions. In certain embodiments, it is therefore possible for certain shared audio devices 101 to subscribe to multiple sharing sessions simultaneously. Logically, this sharing of one shared audio device into multiple sharing sessions can be envisioned as, e.g., a Venn diagram in which each shape represents one of multiple potentially-overlapping concurrent sharing sessions. In these embodiments, the sharing sessions that each shared audio relates to can be identified; or in certain embodiments, a particular shared audio device pertains to both/all of the concurrent sharing sessions.

With many embodiments of sharing sessions that are established on peer-to-peer shared audio networks similar to as described above with respect to FIG. 2; the networks can have the capability of replicating data that has been lost (or not obtained) by a particular shared audio device 101. As such, when a particular shared audio device 101 joins the sharing session, it may be able to query at least some of the devices to obtain the shared audio that have been captured are recorded through the beginning of that sharing session. As such, when a member of the sharing session or event arrives part of the way through the event, they may be able to access the previously captured audio, etc. that pertain to the sharing session.

Replication of lost, or never obtained, data may be successfully performed in many peer-to-peer shared audio networks as well as other networks (e.g., master-satellite). Such data replication represents an advantage of certain peer-to-peer shared audio networks. This replication may not apply to sharing sessions that have already both started and ended, even for peer-to-peer shared audio networks. As such, in many embodiments, users of shared audio devices 101 that might have joined the sharing session after the sharing session has ended may not be able to obtain those shared audio files substantially directly (but perhaps can obtain the sharing session audio from a friend or a family member). Certain embodiments of the shared audio network 100 may include a concept of a synchronized master shared audio device from which a latecomer can obtain the shared audio.

Though dissimilarities exist between different types of sharing sessions between shared audio devices 101, there can also be a great deal of commonality. For example, many embodiments of the sharing sessions can be identified by a unique session identifier. With certain embodiments of the sharing sessions, those who are attending should be able to access the shared audio captured by some of the shared audio devices 101 associated with that sharing session (while this may not be true in other embodiments of the sharing session). Many embodiments of sharing sessions rely on a broadcast by which audio (or portions thereof or information relating thereto) are transmitted to other members of the session, in many instances without an addressing mechanism.

A user can get access to sharing sessions in certain embodiments after they have left that sharing session, such as a party. For example, the sharing session may be configurable such that the members can access audio relating to any portion of the shared session following the shared session from one of the session members (perhaps after providing a suitable password to rejoin and/or access audio from the session). In certain embodiments, such sharing session members may be able to access the shared audio after they leave the sharing session using a different mechanism, such as the Internet or another embodiment of network (e.g., or other shared audio network). The particular configuration of the shared audio network largely determines how current members, as well as past members, of the sharing session may access shared audio from the shared audio network.

Consider that for certain embodiments, when a user actuates a sharing mechanism 102 to join a particular sharing session, that they establish a sharing session identity (ID). For certain embodiments of shared audio devices 101, they should be able to use the sharing session ID to later retrieve pictures even after they have left the event. For example, the password can be used as a host-name or sharing session ID for the event. The sharing session ID may be associated with authorization, such as a user having to input their session ID and a password into their shared audio device prior to being authenticated. Sharing session names can also default to easily remembered things such as date, name of the sharing session, etc. Certain authorization concepts and mechanisms are described in this disclosure. Shared audio devices can be associated with one or more from a set of shared default keywords such as "physics class", "concert", "Christmas", "sports event", "business meeting", etc. For a number of embodiments, the information associated with each particular sharing session could, in certain embodiments, be retrievable later from a central computer, a server, etc.

For a particular sharing session member who shows up late to the sharing session or meeting, it may be important that different session attendees have the capability of "pulling in" new members, and providing them the shared audio going back to the beginning of the sharing session. For example, assume that there are four currently-joined shared audio devices 101 in a session, and a new shared audio device is being joined using the first shared audio device to establish a new grouping of five shared audio devices. Such joining techniques may, for example, rely on point-to-point communication, master-satellite communication, client-server communication, or other shared communication techniques. In one embodiment, for example, the user of the first shared audio device 101 actuates the sharing mechanism that publishes the shared audio to allow the joining shared audio device to become part of the sharing session, and thereby gain access to the audio already captured by other session shared audio devices. A number of different sharing session configurations for the sharing mechanisms can thereby be provided depending on the application or as a design choice. One embodiment of sharing between multiple shared audio devices involves a first person actuating the sharing mechanism 102, at which point other shared audio devices within range may be able to access those. This embodiment could be considered as simply opening up some of the session information contained in one shared audio device 101 to other shared audio devices.

Another embodiment of shared audio devices can be considered as a "published with synchronized timestamp", such that each user actuates the sharing mechanism at the same time to get synchronized, and therefore is able to somewhat control the dispersal of the shared audio. Another embodiment of a shared audio device can be referred to as a "shared plus password" in which the password may be utilized to join a sharing session.

Examples of Viewfinders for Shared Audio Devices

Certain embodiments of a shared audio device include viewfinders that can provide a variety of graphical-based, image-based, textual-based, or other temporally-associated dissimilar-media information using certain embodiments of shared audio devices. In certain embodiments of shared audio devices, but not others, a sharing mechanism might be considered to function as a virtual picture frame or viewfinder that allows remotely-located shared audio devices that can be configured such as digital cameras or camcorders to capture shared audio, as well as to provide other temporally-associated dissimilar-media information to the shared audio. Viewfinders therefore provide a mechanism for one shared audio device (which may be configurable as either a peripheral shared audio device, the obtaining shared audio device, personal shared audio device, and/or another shared audio device) to observe audio that has been, or is being, captured by another shared audio device (which may be configurable as either a peripheral shared audio device, the obtaining shared audio device, the personal shared audio device, and/or another shared audio device). As such, certain embodiments of viewfinders may be considered as operating to "share and/or remotely control another shared audio device's viewfinder". In one embodiment, a viewfinder at a first shared audio device can display at least some audio that is being captured at a second shared audio device. The second shared audio device acts by displaying at least a portion of the at least some audio that is displayed by the first shared audio device as it could appear at the first shared audio device. Those embodiments of shared audio devices 101 that are provided with viewfinders can be used by users to perform a variety of processing related to the shared audio including, but not limited to, viewing the shared audio, selecting those shared audio to keep and those to discard, determine those shared audio that will undergo further processing, and determine those shared audio to select an increased resolution version of (e.g., when provided with thumbnails, audio information or portions thereof, or metadata describing some aspect of the audio). For example, certain embodiments of viewfinders may display thumbnails of shared audio. From the thumbnails, the user determines those shared audio that are to be accessed in more detail (e.g., having a greater resolution).

Certain embodiments of a sharing menu (not illustrated) can be integrated as a portion of the viewfinder of certain embodiments of the shared audio device 101 (e.g., such as being located on the display of the shared audio device). The shared audio device can allow a user to join a particular session, for which they are proximately located using one of the above-described mechanisms such as geographic proximity, proximity by communications link, and/or proximity by password.

The sharing menu can include a variety of questions, such as including input for the name and/or identity of the user, the user password, indicating whether this shared audio device is the master device for a particular session, and indicating whether the particular session has a prescribed duration, and if so, when is the timeout. The embodiment of the sharing menu is illustrative in nature, and not limiting in scope, and in actuality can be provided with a variety of appearances, shapes, and/or questions.

Figure 12:
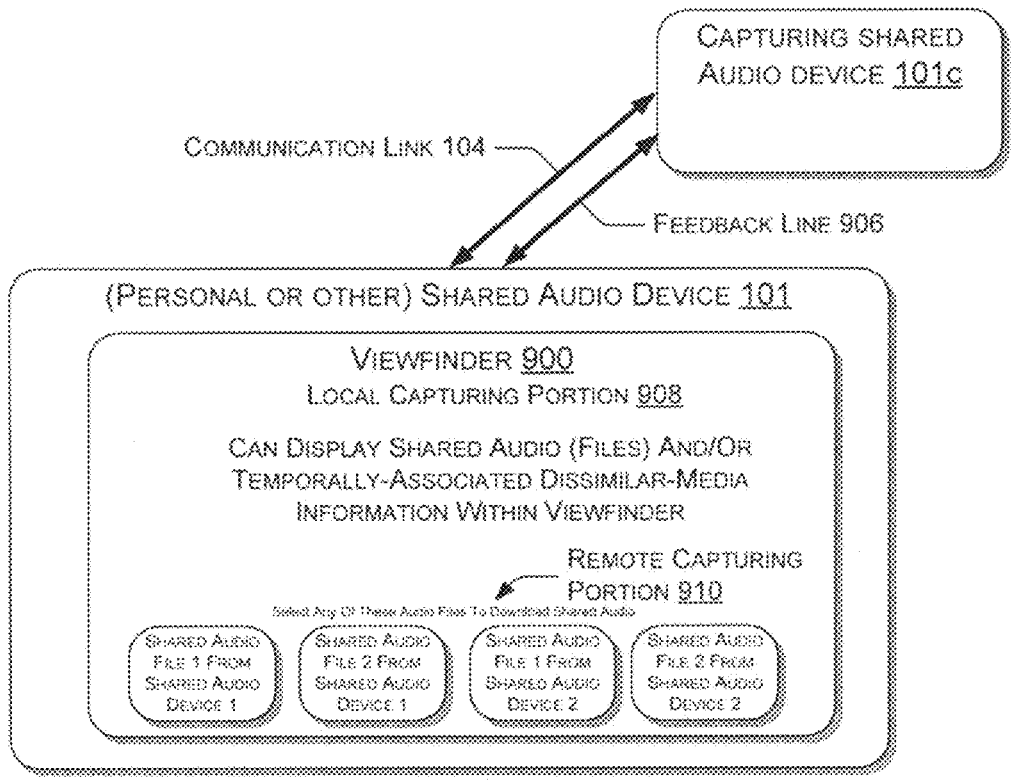
FIG. 12 shows a block diagram of one embodiment of a viewfinder 900 that is integrated within one of the shared audio devices.

FIG. 12 shows one embodiment of a viewfinder 900 that is integrated within a shared audio device 101. In certain embodiments, the shared audio device 101 can be a portable audio storage and/or display device, or a computer to obtain and/or retain shared audio. Certain embodiments of shared audio devices do not include the viewfinder 900, and as such would not be used to display shared audio. In this disclosure, the viewfinder 900 refers not only to traditional optical viewfinders, but also to liquid crystal display (LCD) or other displays such as might be located on the back of the digital camera or camcorder.

As described with respect to FIG. 12, the shared audio device 101 is in communication via a communication link of 104 with the capturing shared audio device 101c. For example, the capturing shared audio device 101c is configurable for capturing audio, certain ones of which can be shared audio and/or temporally-associated dissimilar-media information. The viewfinder 900 can thereby display the identity of certain shared audio files and/or temporally-associated dissimilar-media information captured by the instant shared audio device 101 over a local capturing portion 908 of the viewfinder 900; and/or also display shared audio files and/or temporally-associated dissimilar-media information captured by a remote capturing shared audio device 101c (e.g., over a remote capturing portion 910 of the viewfinder). Certain embodiments of the viewfinder also include an actuation portion (as known in user-interface technologies) by which the particular shared audio and/or the temporally-associated dissimilar-media information can be selected and/or actuated. For example, shown in FIG. 12 are audio files 1 and 2 from a shared audio device 1, and audio files 1 and 2 from a separate shared audio device 2; these audio files may serve as examples of shared audio. In addition, different embodiments of the shared audio device 101 as described with respect to FIG. 12 are configured as the obtaining shared audio device (that can capture shared audio and/or temporally-associated dissimilar-media information), or alternately as a peripheral shared audio device. As an aside, note that although a certain configuration of the local capturing portion 908 and the remote capturing portion 910 are shown, in certain embodiments of the viewfinder 900 other configurations/locations of the remote capturing portion 910 in addition to the local capturing portion 908 are possible.

The selection of a relative display of the remote capturing portion 910 relative to the local capturing portion 908 over the viewfinder 900 can be a design choice, and the present description is not intended to be limiting in scope. For example, the remote capturing portion 910 of the viewfinder 900 can be provided relative to the local capturing portion 908 as an overlying window, an underlying window, a top or bottom window, an additional box, overlying text that is physically typed above the local capturing portion 908, or a variety of other configurations that are known to those skilled in graphical user interfaces (GUIs) such as Windows (as designed and made commercially available by Microsoft) and Mac (as designed and made commercially available by Apple Computer).

Also described with respect to FIG. 12, is an optional feedback line 906 that can be considered as associated with the communication link 104. The communication link 104 and/or the feedback line 906 can provide data transfer to allow a user interface between a shared audio device 101 and another shared audio device 101c. Certain embodiments of the communication link 104 and/or the feedback line 906 as described with respect to FIG. 12 allows a user at a local shared audio device 101 to provide imaging input to a shared audio device 101c. Certain embodiments of the communication link 104 and/or the feedback line 906 can be configurable as a wireless link, similar in configuration to the communication link 104. In certain embodiments, the feedback line can be integral with the communication link 104.

In certain embodiments, the communication link 104 and/or the feedback line 906 includes an audio transmission line, by which one user can indicate to another user at the shared audio device 101c to, perhaps, move the particular shared audio device 101*c* to another location, use a different microphone to obtain shared audio, alter audio characteristics, otherwise adjust the settings of the obtaining shared audio device, provide a shared audio, do not provide a shared audio, capture another shared audio, to not capture another shared audio, or perform a variety of other task(s) with the shared audio device 101*c*.

Non-verbal instructions, similar in nature to those described as being transmitted over the audio version of the communication link 104 and/or the feedback line 906, can also be transmitted over a text-based or other graphical version of the communication link 104 and/or the feedback line 906. The different embodiments of the communication link 104 and/or the feedback line 906 can be added, in addition to those communication links 104 and/or the feedback lines 906 that are integral with each communication link 104, as described in this disclosure. Increasing the types and amount of communications that can be transmitted utilizing the communication link 104 and/or the feedback line 906 can thereby provide more interaction between the users and remotely-located shared audio devices, thereby potentially improving an overall audio sharing experience.

As described in this disclosure, certain embodiments of the viewfinder 900 thereby can be configurable in a variety of configurations to display the shared audio or other related information in a variety of formats depending upon the type of the shared audio device, the volume of data that is available to store therein, the amount of shared audio that actually are stored therein, and the user input.

The viewfinder 900 may be utilized in a variety of shared audio devices 101 to display certain shared audio. As such, a first shared audio device can capture or copy a shared audio, or a portion thereof, from a second shared audio device at a remote location from the first shared audio device. Under these circumstances, the first shared audio device can actually utilize the imaging aspects or equipment of the second shared audio device.

This use of viewfinders 900 for the shared audio devices can also be applied to business, educational, personal, or other applications. For example, there might be multiple blackboards or whiteboards (or other temporally-associated dissimilar-media information) in a sharing session that can be captured by multiple teachers or presenters, and/or multiple shared audio devices. Alternatively, a user may wish to view what is going on in one class while attending another. Certain embodiments of the shared audio device as described in this disclosure can thereby, essentially, bookmark activities at another shared audio device.

Sharing or copying audio files between multiple shared audio devices can be considered as copying captured audio files from the obtaining shared audio device to the other shared audio devices (such other shared audio devices can be configurable either as a capturing and/or peripheral shared audio device). The characteristics, quality, resolution, and other characteristics of each shared audio are initially determined by the audio properties of the obtaining shared audio device that captured that shared audio.

Consider that, in one embodiment, a first shared audio device has a higher resolution compared to other shared audio device(s), such that relatively high quality or low quality shared audio can be copied and distributed with other shared audio devices (that are only capable of capturing a different resolution shared audio). Each audio file can be captured by the particular desired obtaining shared audio device (a particular characteristic, a particular quality, an amount of memory used, a flash capability, a demonstrated ability to take good shared audio, etc.). The shared audio captured by multiple shared audio devices can then be copied or shared into each desired shared audio device.

As such, a particular user may have a number of obtaining shared audio devices, each shared audio device is considered optimal to capture a particular type of audio. The sharing mechanism as described in this disclosure thereby allows the shared audio that is being captured by each of these obtaining shared audio devices to be transferred between these multiple shared audio devices to one or more selected shared audio devices. Those audio files received by the selected shared audio device from each of these "optimized" shared audio devices are thereby identical to those audio files captured by the obtaining shared audio device.

Certain embodiments of the viewfinder 900 provide a mechanism by which the shared audio device displays those audio files which, in time, can be copied to at least one other shared audio device.

In certain embodiments, the viewfinder 900 is used to subscribe to data from other shared audio devices. New functionality might be provided to one shared audio device based on the audio, data, and/or information being shared or copied from other shared audio devices. For example, the viewfinder 900 might annotate its display to show which geographic areas have been sufficiently captured or covered by previous shared audio.

Consider that certain embodiments of the viewfinder 900 can be configured to display a variety of files of shared audio or audio information, as well as a number of images (e.g., the temporally-associated dissimilar-media information) have been captured relating to the same event. In certain embodiments, this similar-composition shared audio can be applied to devices lacking a sharing mechanism, as well as a shared audio device 101. For example, if a particular user has captured a large number of audio of one particular object, they would likely want to have an indication of it so that they can change the subject of further shared audio. The recognition algorithm can vary widely in scope. For example, in one embodiment, positional information relating to where shared audio has been captured could be indicated and searched, based on derived GPS coordinates and/or other positional audio information. In one embodiment, those shared audio that the current shared audio device (or any particular shared audio device) has captured can be highlighted in some manner along the bottom, side, top, etc. of the viewfinder 900.

In certain embodiments, positional information such as those from global positioning system (GPS), metadata, or those including reference to some geographic location, particular individual, or setting can be used to indicate where certain audio has been captured. For example, if outdoors, then GPS derived positional information can be used to indicate the physical location, and therefore information about the subject, of some particular shared audio.

As memory technology improves, more audio and other memory storing-capabilities will likely be provided to many individual shared audio devices. The cost of individual digital shared audio devices will likely continue to decrease as the associated technology improves. The sharing or copying of a considerable number of shared audio devices from one obtaining shared audio device to another will become more affordable, especially as memory storage cost drops. Other types of shared audio sorting, shared audio querying, or shared audio storing techniques may be provided by a computer after the shared audio could have been obtained or retained from a digital camera, camcorder, or web site. However, this feature will also likely be useful for the sharing mechanism between multiple shared audio devices.

In one embodiment, the most recently input information (e.g., one or few shared audio) of the sessions shared audio devices 101 can also be shown on the viewfinder 900 such as shown with respect to FIG. 12. For example, display the last five or ten shared audio files captured in one embodiment. These disclosure pertaining to user interfaces and audio files are intended to be illustrative in nature, and not limiting in scope.

Examples of Shared Audio Devices and their Audio Sharing Techniques

In general, the shared audio devices 101 can be arranged in a variety of configurations to provide a variety of audio functionality thereby allowing sharing between multiple shared audio devices, similar to as described with respect to FIGS. 1 to 6. In addition, the shared audio devices can be configured to provide a variety of functionality, such as obtaining shared audio devices (e.g., those that are configurable to capture or record audio) or peripheral shared audio devices (e.g., those that are not configurable to capture or record audio). Within these generalized aspects, the shared audio devices can be arranged in a variety of configurations to provide a variety of relative operations.

Figure 13:
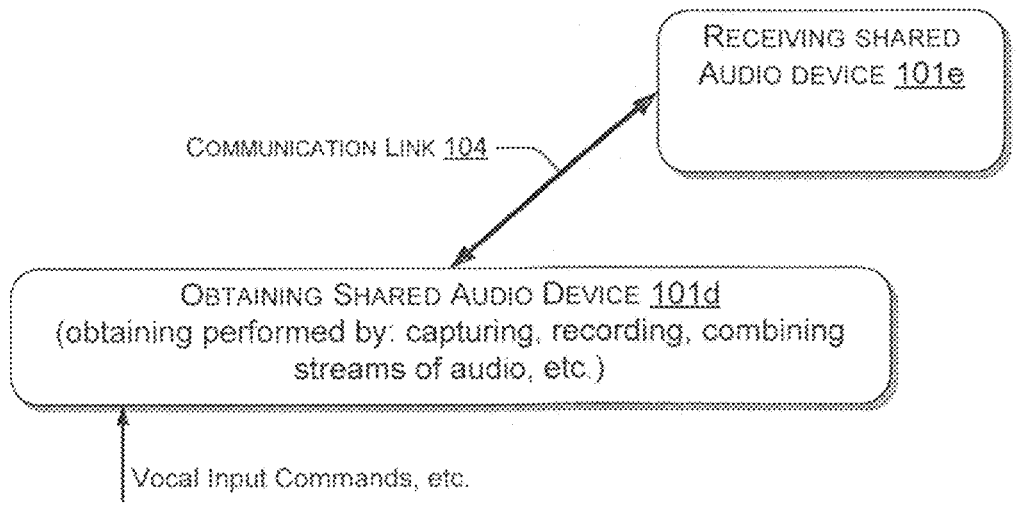
FIG. 13 shows a schematic diagram of one embodiment of multiple shared audio devices sharing shared audio.

In certain aspects such as described with respect to FIG. 13, shared audio devices can be configured to allow transfer of data (the data corresponding to audio) therebetween upon actuation of a sharing button or other sharing mechanism. As such, a user can provide input to determine whether to transfer one or more shared audio files to another particular shared audio device. For example, FIG. 13 illustrates an obtaining shared audio device 101d, receiving shared audio device 101e, and the communication link 104 to allow data to be transferred from the obtaining shared audio device 101d to the receiving shared audio device 101e, and a control mechanism (not shown). The embodiments of control mechanism may include, but not limited to, buttons that can be depressed, menu items that can be selected, microphones that can be keyed, and/or other user interface techniques, etc. In certain embodiments, the control mechanism can be selected to change the state of the temporally-associated dissimilar-media information, either by switching to the next item to be displayed in a series, or alternatively to describe a particular item to be displayed (e.g., show next slide, or switch to a particular graph, audio, image, or text portion). Upon the actuation of the control mechanism (not shown), the state of the temporally-associated dissimilar-media information can change. In different embodiments, input can be received from a user to determine which other shared audio devices are within a particular sharing session, and allow the shared audio to transfer to only those shared audio devices. In certain aspects, a user interface can be provided to allow user interfacing with shared audio devices (see, e.g., a user interface provided in FIGS. 9-11). The design and operation of such user interfaces is generally well known as utilized on computers, laptops, personal display assistants (PDAs), cellular phones, etc. The user interface, as well as other control devices, may be utilized by a user to provide input to effectively control sharing of the shared audio and/or the temporally-associated dissimilar-media information between shared audio devices. The user interface should also be configured to display the temporally-associated dissimilar-media information in whichever format is most appropriate (e.g., text provided in a desired language; graphs, images, videos, etc. provided as appropriate for classes, and as desired for sporting events or live concerts).

Certain embodiments of the sharing mechanism are arranged similarly to commercially available graphical user interfaces (GUI), in which a user of the shared audio device could in certain embodiments provide interactive input to determine which audio files to transfer, perhaps input query to indicate which files satisfy a particular input set of requirements, and also in certain embodiments allow a member of a particular sharing session to control those other members of the sharing session with which to share audio with, or alternatively to receive shared audio therefrom. In certain embodiments, such sharing criteria can be modified within some time period, or alternatively on a case-by-case basis.

Figure 14:
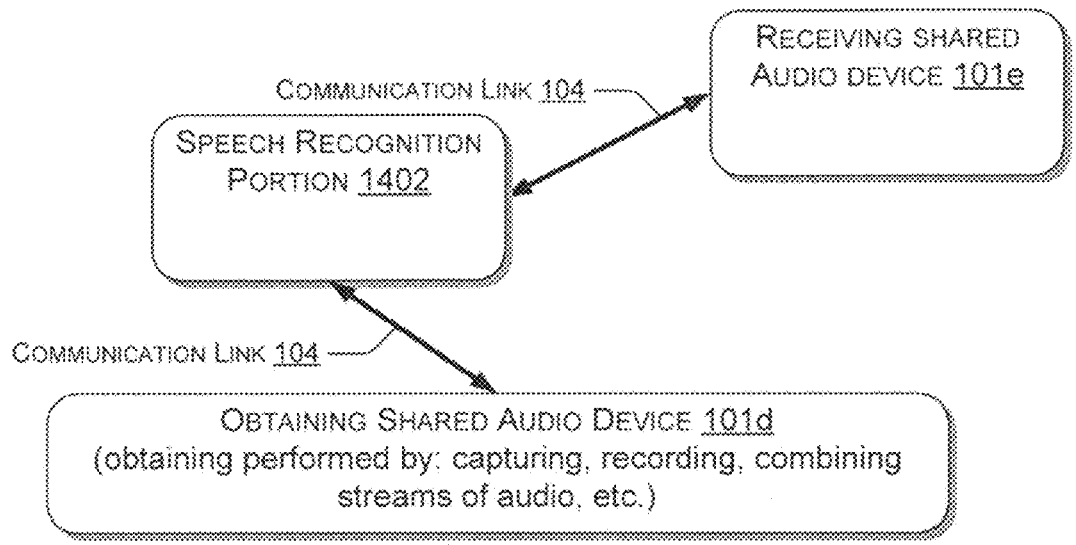
FIG. 14 shows a schematic diagram of one embodiment of multiple shared audio devices sharing shared audio.

FIG. 14 illustrates one embodiment of sharing mechanism that relies upon speech recognition. For example, FIG. 14 illustrates an obtaining shared audio device 101d, receiving shared audio device 101e, and the communication link 104 to allow data to be transferred from the obtaining shared audio device 101d to the receiving shared audio device 101e, and a speech recognition portion 1402. The speech recognition portion 1402 allows a user at the obtaining shared audio device 101d to input voice signals that alter the state of the temporally-associated dissimilar-media information and the receiving shared audio device 101e. For example, a user in the obtaining shared audio device 101d could input a vocal command (such as display next screen, next song, etc.) that would be recognized by the speech recognition portion 1402. Each particular recognized command can cause a modification of a state of the temporally-associated dissimilar-media information, as provided by the receiving shared audio device 101e. In certain embodiments, the state of the temporally-associated dissimilar-media information of both the obtaining shared audio device 101d and the receiving shared audio device 101e can both be affected by a suitable input to the speech recognition portion 1402.

Figure 15:
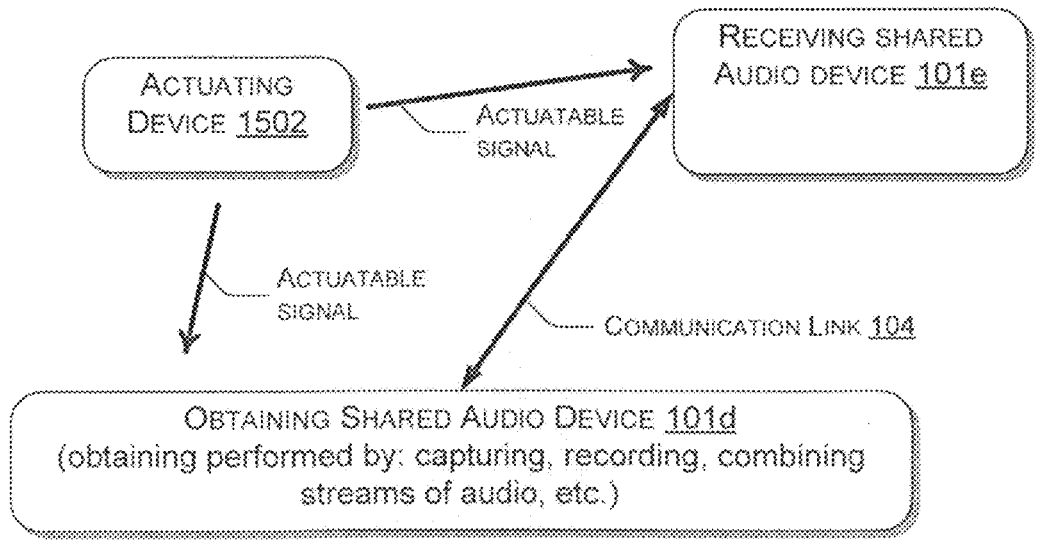
FIG. 15 shows a schematic diagram of one embodiment of multiple shared audio devices sharing shared audio.

In certain aspects such as described with respect to FIG. 15, sharing can be affected between an obtaining shared audio device 101d and a receiving shared audio device 101e. For example, FIG. 15 illustrates an obtaining shared audio device 101d, receiving shared audio device 101e, and the communication link 104 to allow data to be transferred from the obtaining shared audio device 101d to the receiving shared audio device 101e, and an actuating device 1502. The actuating device 1502 can be configured to change the state of the temporally-associated dissimilar-media information for the obtaining shared audio device 101d and/or the receiving shared audio device 101e in response to actuatable signals that can be controlled by the actuating device. Examples of the actuating device 1502 can include, but are not limited to, optical devices, sound-based devices, data transfer devices, etc. In certain embodiments, the actuating device of the shared audio device can be configured to provide authentication, as described in this disclosure.

FIGS. 13 through 15 thereby provide a variety of configurations to which a user can vary status of temporally-associated dissimilar-media information of one or more shared audio devices. These configurations are intended to be illustrative nature, but not limiting in scope. In certain embodiments, the shared audio devices can be utilized in a wide variety of sharing applications, including, but not limited to, live concerts, presentations, classes, sporting events, etc. Such audio sharing configurations can be utilized, for example, during presentations, concerts, sporting events, or other events in which live or recorded audio from one individual is being projected to one or more other individuals. A live presentation/concert configuration may utilize multiple audio sources, for example, an audience audio source may be directed from a speaker, or alternatively directly from the presenter or performer. A personal audio source, for example, may be associated with a particular member of the audience. In certain embodiments, the personal audio source can include a time delay that allows audio received via the personal audio source to be received closer to the same time as audio received via the audience audio source (reduce an echo between the audio sources). In certain embodiments, the time delay can be adjusted by the user, while in other embodiments, the time delay can be automated, such that similar sounds can be provided to the user via the different audio sources at, hopefully, substantially the same time.

In certain aspects, it may be desired to provide time-associated information to the shared audio device in addition to the shared audio. Within this disclosure, time-associated information can be considered as that information, data, media, etc. that can vary depending upon the shared audio that is provided by at least one shared audio device. For example, consider an individual attending a sporting event in which the shared audio includes, for example, an announcer describing the events of the game. During a hockey game, for example, the time-associated information may include the name and number of a player who has a puck, in addition to perhaps a defender. A variety of time-associated information can be provided along with transmission of the shared audio, and a user at a receiving shared audio device can determine which time-associated information to display, and in which format. In certain embodiments, the time-associated information might even include selected video, such as replays of scores, goals, etc. In other embodiments, a substantially continual video can be provided as time-associated information that is associated with the shared audio.

In lecture or teaching formats, for example, the time-associated information can include, perhaps, notes provided by the teacher. As such, perhaps a teacher or professor may be referred to a particular shared audio file, or associated temporally-associated dissimilar-media information, for example, by number such as would appear on the display. The shared audio devices may thereupon receive the shared audio provided by the teacher's or professor's shared audio device, in combination with the shared audio and/or other temporally-associated dissimilar-media information associated with that number. As such, with certain embodiments of the shared audio devices, students can concentrate on (or otherwise utilize) the shared audio and/or other temporally-associated dissimilar-media information provided by the professor instead of having to concentrate on taking corresponding notes. In certain embodiments, the users of shared audio devices can handwrite their notes over the temporally-associated dissimilar-media information in a similar fashion to PC handwriting programs such as provided by many tablet-PCs.

With concert formats, the time-associated information that is associated with the shared audio (the shared audio including, perhaps, an audio version of the performer) may include, for example, words of songs, metadata describing the particulars of songs, other information such as typically provided in the handout may also be provided as time-associated information. In certain embodiments, but not others, the user can have time-associated information to display and/or listen to using the shared audio device. In certain embodiments, but not others, all variety of shared audio may be provided for a single event. As such, users attending an event may, in certain embodiments, be able to select shared audio pertaining to different languages, commentators, performers, etc. pertaining to a particular event that can be provided utilizing the shared audio device. Consider that with a single concert that a variety of time-associated information can be tailored to individuals of different languages, tastes, etc. such that, for example, a Spanish-speaking user can read words to an English performer in Spanish using their shared audio device, while a German-speaking user can read the words in German using their shared audio device. As such, it is to be understood that the shared audio device utilizing a variety of temporally-associated dissimilar-media information can act as a language-translator for one or more users.

Certain aspects of the shared audio device allows the user to control the characteristics, quality, contents, volume, tone, filtering, etc. to the shared audio that they receive. By allowing the user to control the characteristics, content, and other parameters of the shared audio that they receive, it is also likely that in certain embodiments users may be able to obtain a more suitable quality audio utilizing their shared audio device. A user of the shared audio device that is attending a live concert at a large stadium, for example, may be able to obtain high-quality digital sound utilizing their shared audio device.

In certain embodiments, a room or other location can be devoted to users of shared audio devices. For example, during a presentation or a live concert, a video screen (e.g., short-circuit) can be provided, and a user can obtain their shared audio (with or without time-associated information in different embodiments) utilizing their individual shared audio devices. Perhaps in certain instances users would pay a certain entrance-fee to attend such rooms or locations that utilize shared audio devices. For example, a shared audio device that is being used for a teaching purpose may require a fee be paid that is associated with the particular course. In addition, a shared audio device that is being used for a sporting event may require a fee be paid to access the particular shared audio.

Certain embodiments of shared audio devices should be adaptable. For example, it is envisioned that the user may wish to attend the college lecture utilizing their shared audio devices, and later that night to perhaps attend a live concert utilizing the same shared audio device. The time-associated information should similarly be adaptable as desired by the user depending upon the particular instance. For example, for certain events, the desired time-associated dissimilar-media information may include other audio, text, images, metadata, information, etc.

Certain embodiments of shared audio devices (including those with or without time-associated information) can provide for enhanced interactivity between participants in this sharing session. Assume, for example, this sharing session pertaining to, for example, a classroom session, a presentation session, a teleconference session, or other such groups of individuals can be separated within different rooms. The individuals in certain embodiments of the shared audio devices may be separated by a considerable geographic distances, and still be able to interact/communicate freely using the shared audio device (perhaps in combination with a shared audio device and/or shared image device as described in certain embodiments of the above-referenced U.S. Patents and/or Patent Applications). In certain embodiments, a first user may provide the shared audio and/or time-associated information to one or more other shared audio devices in a sharing session; and a second user at one of the one or more other shared audio devices may respond with their shared audio and/or time-associated information in the sharing session. This type of interactive responsiveness of shared audio and/or time-associated information can provide a considerable amount of interactivity between a number of shared audio devices within a sharing session. These examples of shared audio devices with or without time-associated information are intended to be illustrative in nature, and not limiting in scope.

Figure 16:
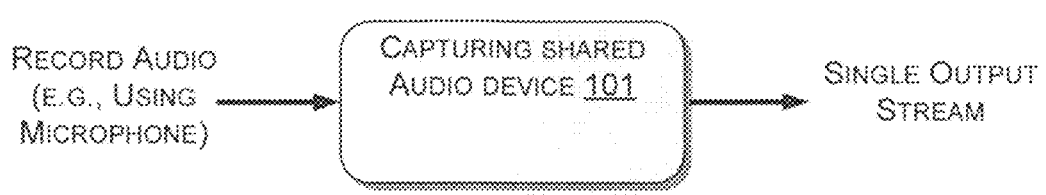
FIG. 16 shows a block diagram of one embodiment of a capturing shared audio device.
Figure 17:
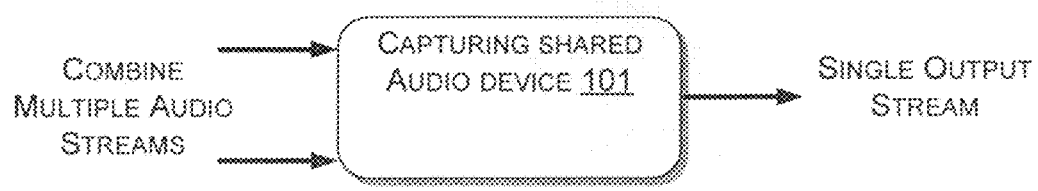
FIG. 17 shows a block diagram of another embodiment of a capturing shared audio device.
Figure 18:
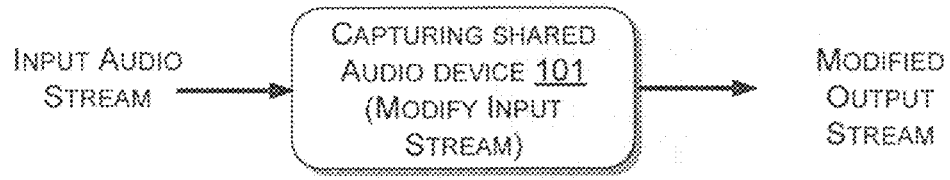
FIG. 18 shows block diagram of yet another embodiment of a capturing shared audio device.

There are a variety of techniques that can be used to capture shared audio using a capturing shared audio device. FIG. 16, for example, shows a capturing shared audio device 101 capturing audio using a microphone. As such, the capturing shared audio device 101 acts as an audio recorder to capture shared audio. FIG. 17 shows another embodiment of a capturing shared audio device 101 that can capture audio by combining multiple audio streams of data into the single stream of data. FIG. 18 shows another embodiment of a capturing shared audio device 101 that can capture shared audio by modifying an input audio stream. Considering FIGS. 16, 17, and 18 and the associated descriptions that are intended to be illustrative in nature and not limiting in scope, the terms "capturing shared audio device" and "capturing" shared audio can be performed using a variety of techniques.

Examples of Shared Audio Device Configurations, and Operational Flowcharts

A number of embodiments of configurations of shared audio devices are now described. Flowcharts that can be associated with the shared audio devices are also described. Within the disclosure, flowcharts of the type described in this disclosure can apply to method steps as performed by a computer or controller. The flowcharts can also apply to apparatus devices, such as a shared audio device 101 that includes, e.g., a general-purpose computer or specialized-purpose computer whose structure along with the software, firmware, electromechanical devices, and/or hardware, can perform the process or technique described in the flowchart.

Figure 19:
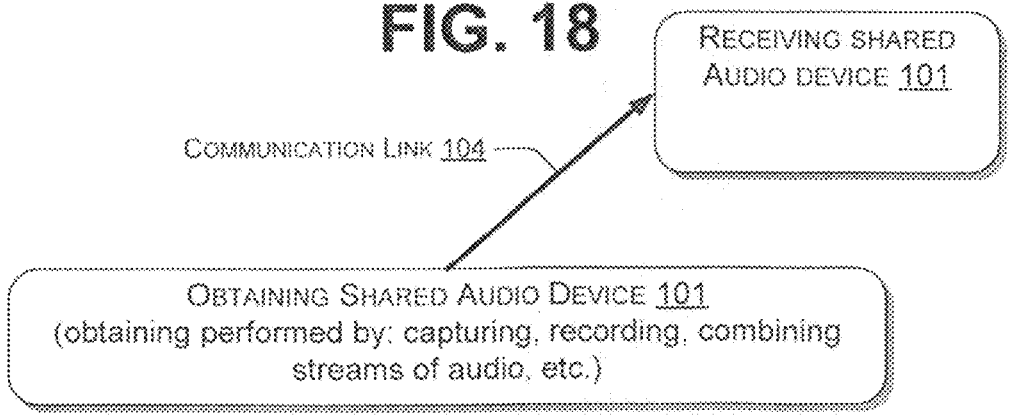
FIG. 19 shows a block diagram of one embodiment of the shared audio device.
Figure 20A:
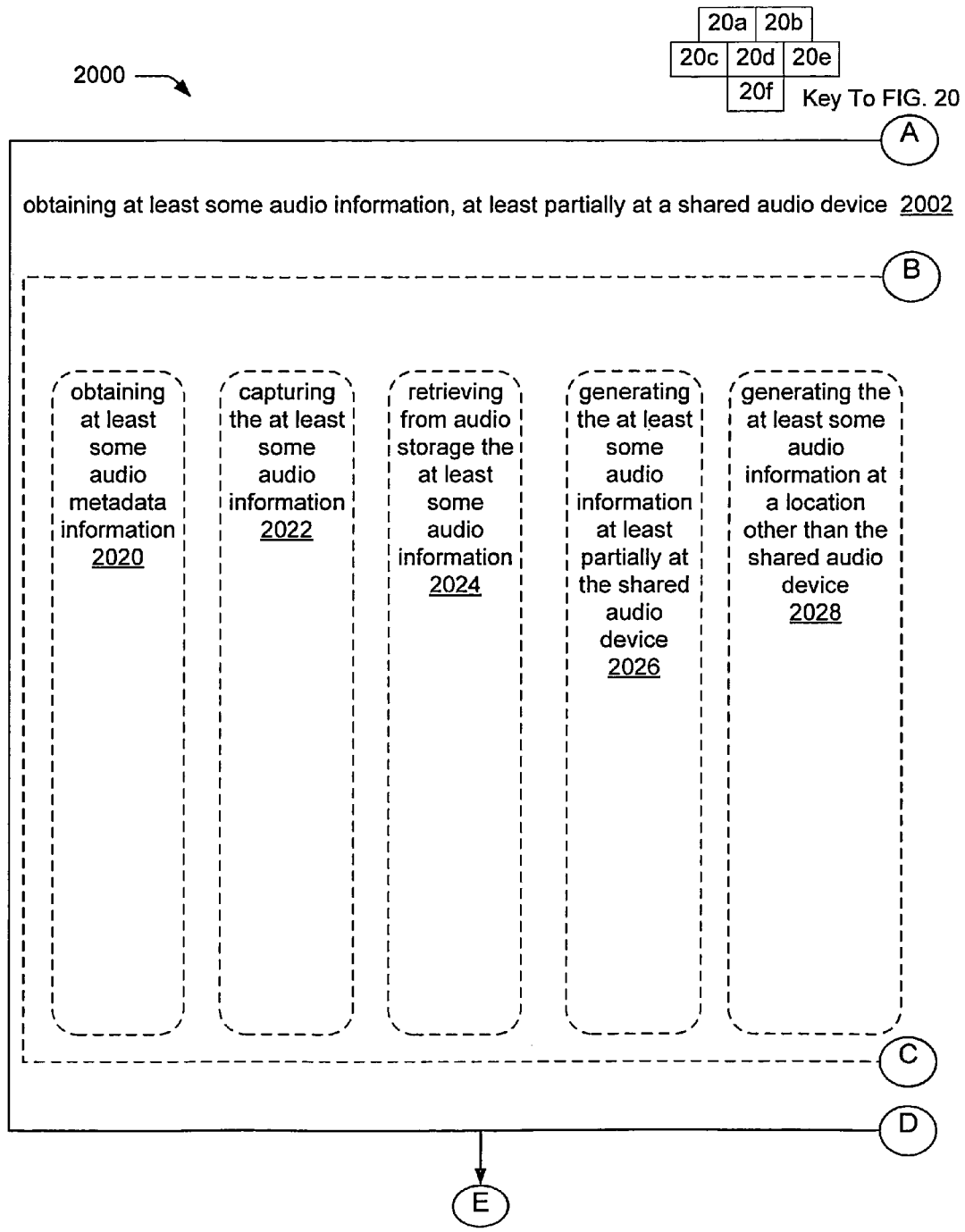
FIGS. 20a, 20b, 20c, 20d, 20e, and 20f show a flow diagram of one embodiment of sharing technique between multiple shared audio devices, similar to as described with respect to FIG. 19.
Figure 20B:
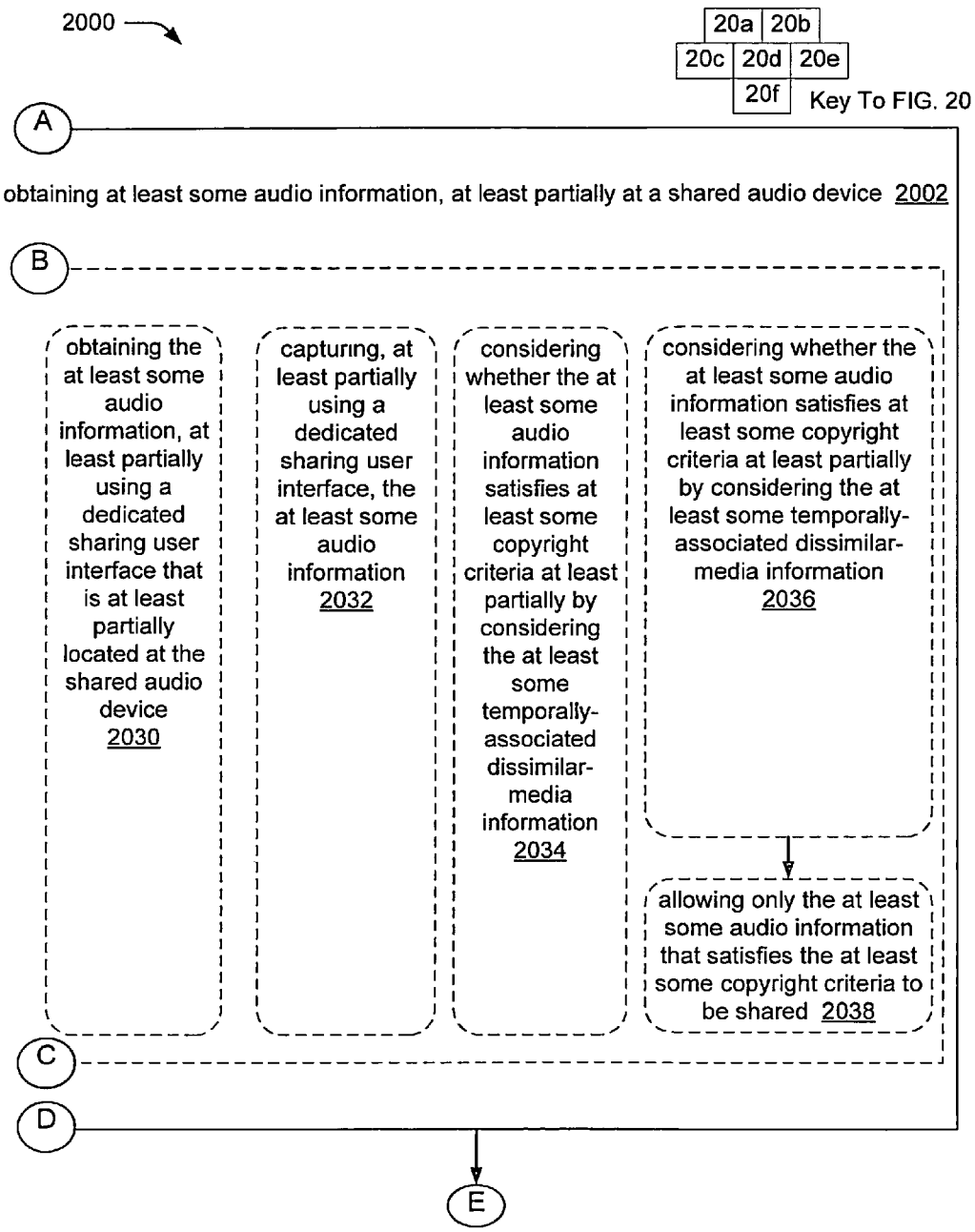
Figure 20C:
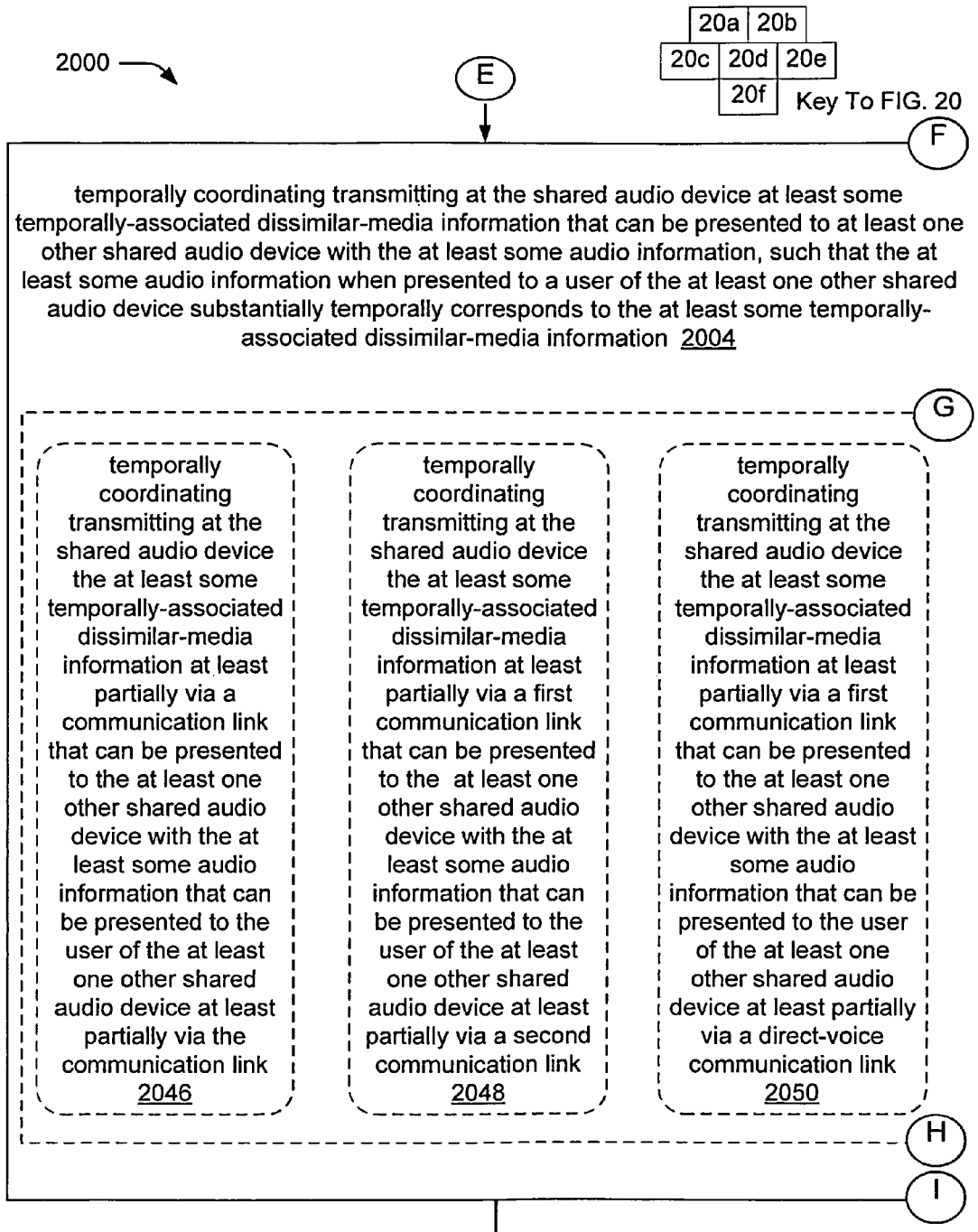
Figure 20D:
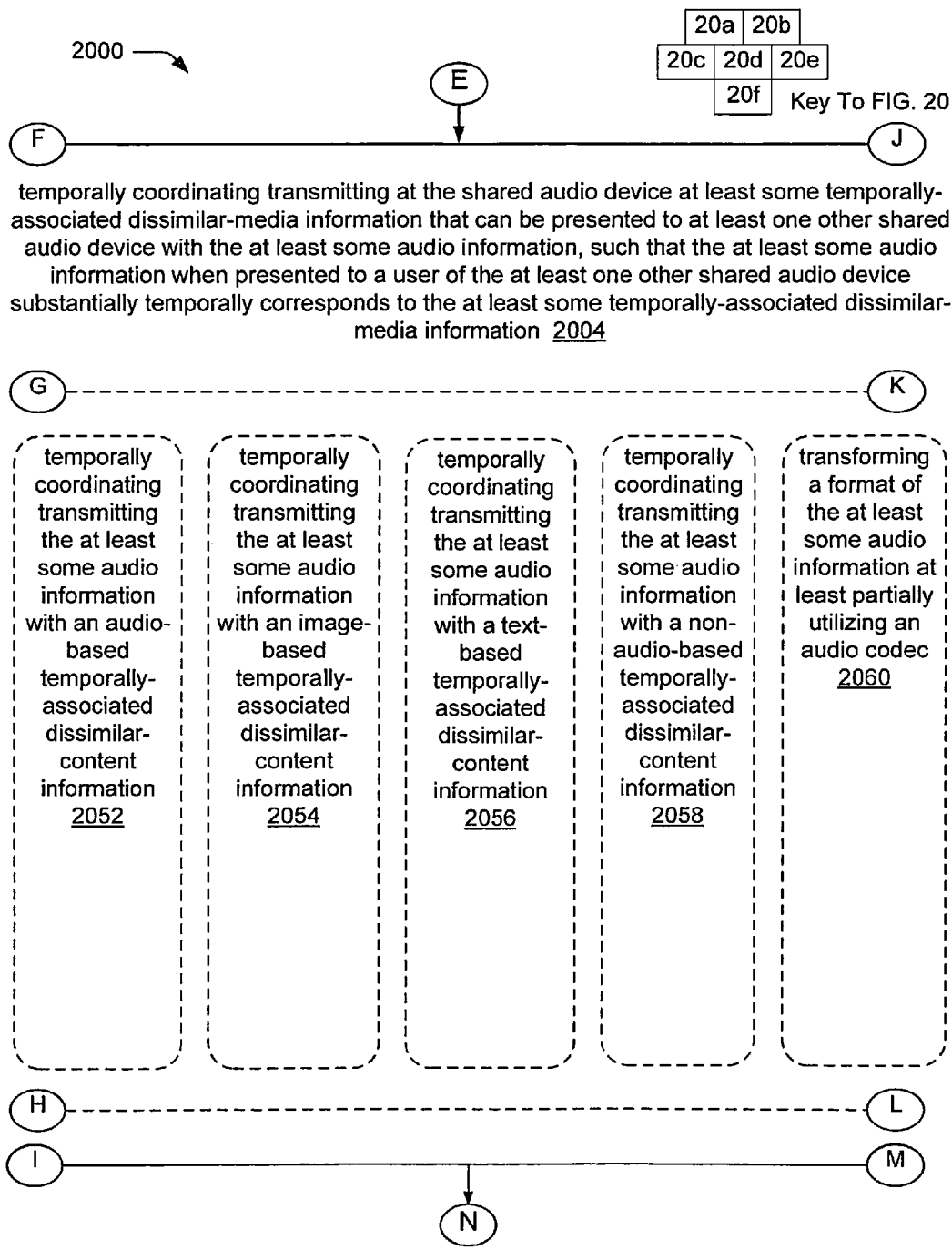
Figure 20E:
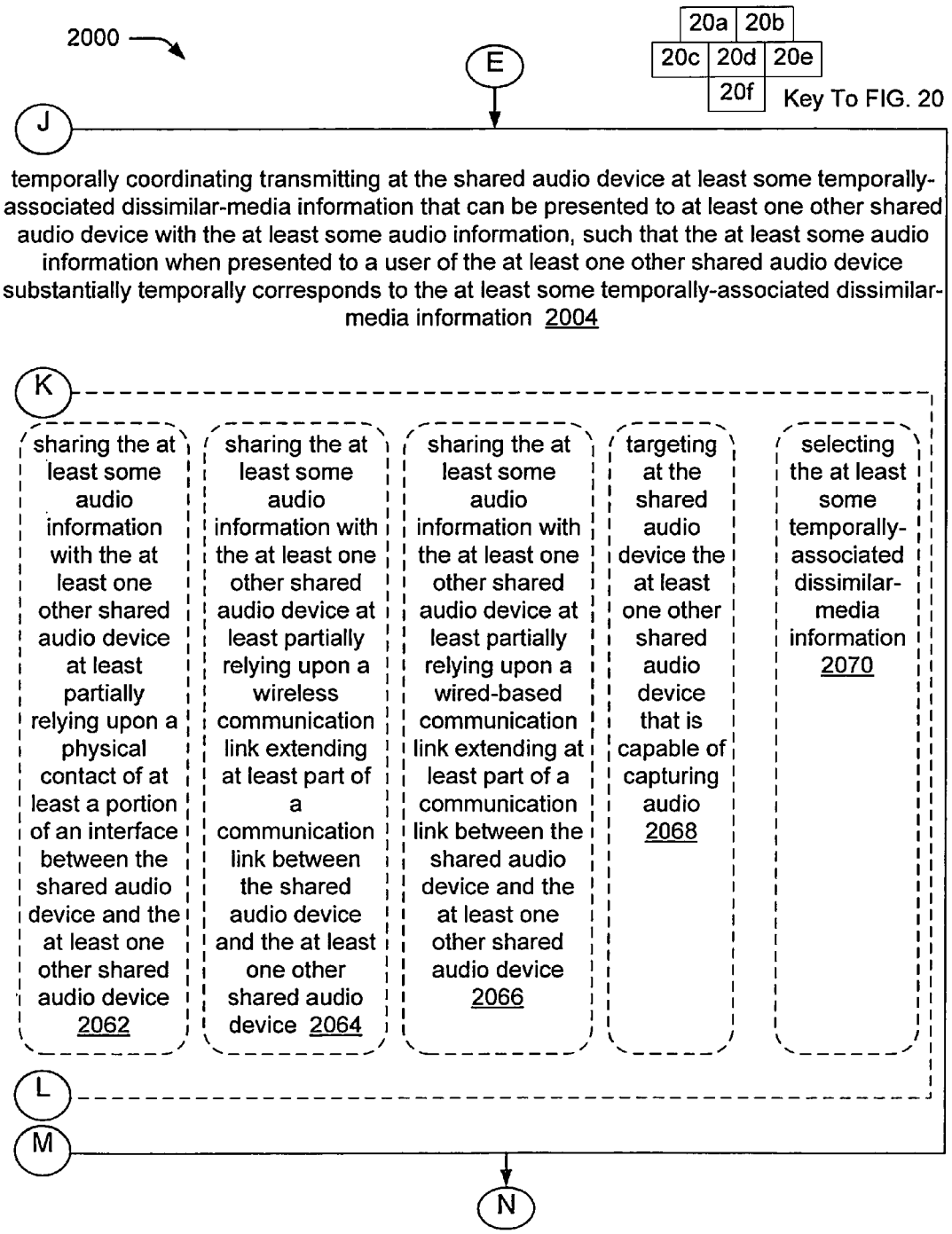
Figure 20F:
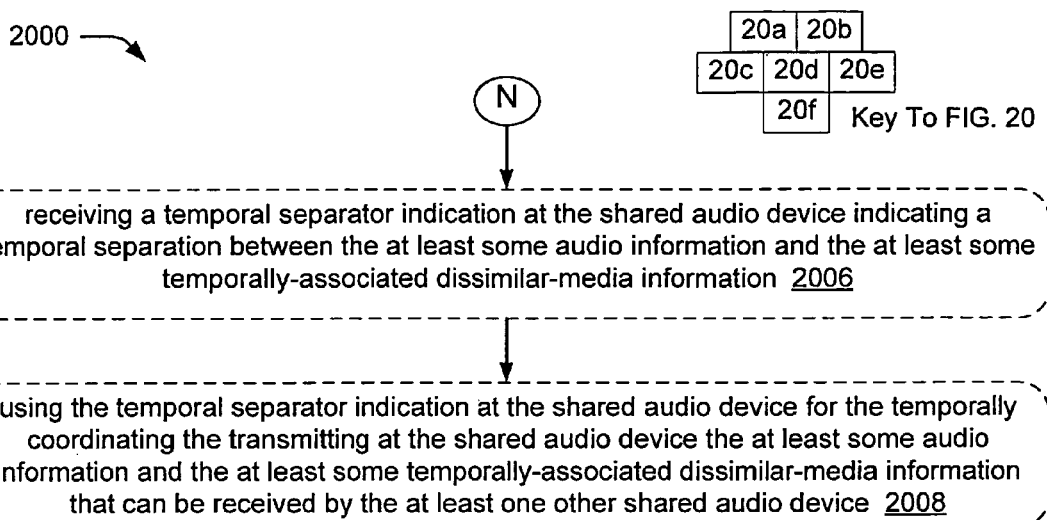

FIG. 19 shows one embodiment including an obtaining shared audio device 101, a receiving shared audio device 101, and a communication link 104 extending therebetween. The shared audio devices 101 as described with respect to FIG. 19 can be considered as examples of the shared audio devices as described in other portions of this disclosure. In certain embodiments, the obtaining shared audio device 101 can be configured to obtain shared audio, such as by recording, capturing, combining streams of audio, etc. In certain embodiments, the obtaining shared audio device 101 can be configured as a master shared audio device 101a, as described with respect to FIG. 1, that can disperse information to one or more other receiving shared audio devices that can be configured as satellite shared audio devices 101b. Alternatively, the obtaining shared audio device and the at least one receiving shared audio device can be configured in a peer-to-peer network configuration, similar to as described with respect to FIG. 2. In certain embodiments, the obtaining shared audio device and/or the receiving shared audio device, as described with respect to FIG. 19, can be configured to temporally coordinate transmitting the at least some audio information (e.g., shared audio) and at least some temporally-associated dissimilar-media information that can be received by the receiving shared audio device. The temporally-associated dissimilar-media information and the audio information can be transmitted over the same communication link, over different communication links, or over only partially the same communication link. In certain embodiments, the at least some audio information can be transmitted over a wireless link, a wired-based link, or over a direct audio connection. Certain embodiments of shared audio devices can transmit a temporal separation indication to be received by at least one other shared audio device that can indicate, e.g., a desired temporal separation of at least some audio information (e.g., shared audio) and the at least some temporally-associated dissimilar-media information. Certain embodiments of the receiving shared audio device(s) can receive the at least some audio information on the at least some temporally-associated dissimilar-media information that have been temporally separated.

One embodiment of a high-level flowchart of a processing and/or sharing technique 2000 that is described with respect to FIGS. 20a, 20b, 20c, 20d, 20e, and 20f and which includes, but is not limited to, operations 2002 and 2004; in addition to optional operations 2006 and 2008. Operation 2002 can include, but is not limited to, optional operations 2020, 2022, 2024, 2026, 2028, 2030, 2032, 2034, and 2036 and 2038. Operation 2004 can include, but is not limited to, optional operations 2046. 2048, 2050, 2052, 2054, 2056, 2058, 2060, 2062, 2064, 2066, 2068, and/or 2070. The high-level flowcharts of FIGS. 20a, 20b, 20c, 20d, 20e, and 20f should be considered in combination with the shared audio device 101, as described with respect to FIG. 19. One embodiment of operation 2002 can include, but is not limited to, obtaining at least some audio information, at least partially at a shared audio device. For example, the shared audio device 101 as illustrated in FIG. 19 obtains at least some audio information, such as by capturing or recording audio information, or alternatively by retrieving the audio information from some store location within, or external of, the shared audio device. One embodiment of operation 2004 can include, but is not limited to, temporally transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information when presented to the at least one other shared audio device. For example, the shared audio device 101 (e.g., the obtaining shared audio device of FIG. 19) transmits at least some audio information (e.g., shared audio) and at least some temporally-associated dissimilar-media information to at least one other shared audio device (e.g., the receiving shared audio device as described with respect to FIG. 19). One embodiment of the obtaining at least some audio information, at least partially at a shared audio device of operation 2002 can include operation 2020, that can include, but is not limited to, obtaining at least some audio metadata information. For example, the obtaining shared image device 101 as described with respect to FIG. 19 obtains at least some audio metadata information, in certain embodiments includes metadata that relates to shared audio. One embodiment of the obtaining at least some audio information, at least partially at a shared audio device of operation 2002 can include operation 2022, that can include, but is not limited to, capturing the at least some audio information. For example, the obtaining shared image device 101 as described with respect to FIG. 19 includes a capturing shared image device. One embodiment of the obtaining at least some audio information, at least partially at a shared audio device of operation 2002 can include operation 2024, that can include, but is not limited to, retrieving from audio storage the at least some audio information. For example, the obtaining shared image device 101 retrieves some audio information from audio storage. One embodiment of the obtaining at least some audio information, at least partially at a shared audio device of operation 2002 can include operation 2026, that can include, but is not limited to, generating the at least some audio information at least partially at the shared audio device. For example, the obtaining shared image device 101 as described with respect to FIG. 19 can generate the at least some audio information, such as shared audio. One embodiment of the obtaining at least some audio information, at least partially at a shared audio device of operation 2002 can include operation 2028, that can include, but is not limited to, generating the at least some audio information at a location other than the shared audio device. For example, some shared information is generated at another location than the shared audio device. One embodiment of the obtaining at least some audio information, at least partially at a shared audio device of operation 2002 can include operation 2030, that can include, but is not limited to, obtaining the at least some audio information, at least partially using a dedicated sharing user interface that is at least partially located at the shared audio device. For example, the obtaining shared audio device, as described with respect to FIG. 19, obtains at least some audio information at least partially utilizing the dedicated sharing user interface. One embodiment of the obtaining at least some audio information, at least partially at a shared audio device of operation 2002 can include operation 2032, that can include, but is not limited to, capturing, at least partially using a dedicated sharing user interface, the at least some audio information. For example, the obtaining shared audio device 101 of FIG. 19 captures at least some audio information at least partially utilizing a dedicated user interface. One embodiment of the obtaining at least some audio information, at least partially at a shared audio device of operation 2002 can include operation 2034, that can include, but is not limited to, considering whether the at least some audio information satisfies at least some copyright criteria at least partially by considering the at least some temporally-associated dissimilar-media information. For example, the obtaining shared image device 101 as described with respect to FIG. 19 considers whether certain shared audio satisfies at least some copyright criteria, such as violating copyright laws. One embodiment of the obtaining at least some audio information, at least partially at a shared audio device of operation 2002 can include operations 2036 and 2038, in which operation 2036 can include, but is not limited to, considering whether the at least some audio information satisfies at least some copyright criteria at least partially by considering the at least some temporally-associated dissimilar-media information; and operation 2038 can include, but is not limited to, allowing only the at least some audio information that satisfies the at least some copyright criteria to be shared. For example, the obtaining shared audio device 101 as described with FIG. 19 considers whether the at least some audio information violates copyright laws, and shares only that shared audio that does not violate copyright laws.

One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2046, that can include, but is not limited to, temporally coordinating transmitting at the shared audio device the at least some temporally-associated dissimilar-media information at least partially via a communication link that can be presented to the at least one other shared audio device with the at least some audio information that can be presented to the user of the at least one other shared audio device at least partially via the communication link. For example, the communication link 104 as described with respect 6 to FIG. 19 can include a single communication link that can transfer both the at least some temporally-associated dissimilar-media information and the at least some audio information.

One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2048, that can include, but is not limited to, temporally coordinating transmitting at the shared audio device the at least some temporally-associated dissimilar-media information at least partially via a first communication link that can be presented to the at least one other shared audio device with the at least some audio information that can be presented to the user of the at least one other shared audio device at least partially via a second communication link. For example, the communication link 104 as described with respect 6 to FIG. 19 can include multiple communication links, a first communication link can transfer the at least some temporally-associated dissimilar-media information and the second communication link can transfer the at least some audio information.

One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2050, that can include, but is not limited to, temporally coordinating transmitting at the shared audio device the at least some temporally-associated dissimilar-media information at least partially via a first communication link that can be presented to the at least one other shared audio device with the at least some audio information that can be presented to the user of the at least one other shared audio device at least partially via a direct-voice communication link. For example, the temporally-associated dissimilar-media information can be transmitted as voice (through the air without amplification, filtering, etc.) such as would be typical for transferring of audio in a classroom, small room or region, or any venue relying largely on the transmission of voice directly as described with respect to FIG. 19. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2052, that can include, but is not limited to, temporally coordinating transmitting the at least some audio information with an audio-based temporally-associated dissimilar-content information. For example, the obtaining shared audio device 101 as described with respect to FIG. 19 temporally coordinates transmitting the audio information with an audio-based temporally-associated dissimilar-content information. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2054, that can include, but is not limited to, temporally coordinating transmitting the at least some audio information with an image-based temporally-associated dissimilar-content information. For example, the obtaining shared audio device 101 as described with respect to FIG. 19 temporally coordinates transmitting the audio information with an image-based temporally-associated dissimilar-content information. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2056, that can include, but is not limited to, temporally coordinating transmitting the at least some audio information with a text-based temporally-associated dissimilar-content information. For example, the obtaining shared audio device 101 as described with respect to FIG. 19 temporally coordinates transmitting the audio information with a text-based temporally-associated dissimilar-content information. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2058, that can include, but is not limited to, temporally coordinating transmitting the at least some audio information with a non-audio-based temporally-associated dissimilar-content information. For example, the obtaining shared audio device 101 as described with respect to FIG. 19 temporally coordinates transmitting the audio information with a non-audio-based temporally-associated dissimilar-content information. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2060, that can include, but is not limited to, transforming a format of the at least some audio information at least partially utilizing an audio codec. For example, the obtaining shared audio device 101 as described with respect to FIG. 19 transforms the format of the audio information, such as a shared audio, at least partially utilizing the audio codec. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2062, that can include, but is not limited to, sharing the at least some audio information with the at least one other shared audio device at least partially relying upon a physical contact of at least a portion of an interface between the shared audio device and the at least one other shared audio device. For example, the obtaining shared audio device 101 as described with respect to FIG. 19 shares at least some audio information with the at least one other shared audio device at least partially relying upon a physical contact between the shared audio devices. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2064, that can include, but is not limited to, sharing the at least some audio information with the at least one other shared audio device at least partially relying upon a wireless communication link extending at least part of a communication link between the shared audio device and the at least one other shared audio device. For example, the obtaining shared audio device 101 as described with respect to FIG. 19 shares at least some audio information with the at least one other shared audio device at least partially relying upon a communication link extending at least part of the way between the shared audio devices. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2066, that can include, but is not limited to, sharing the at least some audio information with the at least one other shared audio device at least partially relying upon a wired-based communication link extending at least part of a communication link between the shared audio device and the at least one other shared audio device. For example, the obtaining shared audio device 101 as described with respect to FIG. 19 shares at least some audio information with the at least one other shared audio device at least partially relying upon a wired-based communication link extending at least part of the way between the shared audio devices. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2068, that can include, but is not limited to, targeting at the shared audio device the at least one other shared audio device that is capable of capturing audio. For example, the obtaining shared audio device 101 as described with respect to FIG. 19 targets the at least one other shared audio device that can also be configured to capture audio. One embodiment of the temporally coordinating transmitting at the shared audio device at least some temporally-associated dissimilar-media information that can be presented to at least one other shared audio device with the at least some audio information, such that the at least some audio information when presented to a user of the at least one other shared audio device substantially temporally corresponds to the at least some temporally-associated dissimilar-media information of operation 2004 can include operation 2070, that can include, but is not limited to, selecting the at least some temporally-associated dissimilar-media information. For example, the obtaining shared audio device 101 as described with respect to FIG. 19, selects at least some temporally-associated dissimilar-media information. One embodiment of operation 2006 can include, but is not limited to, receiving a temporal separator indication at the shared audio device indicating a temporal separation between the at least some audio information and the at least some temporally-associated dissimilar-media information. For example, the shared audio device receives a temporal separator indication. One embodiment of operation 2008 can include, but is not limited to, using the temporal separator indication at the shared audio device for the temporally coordinating the transmitting at the shared audio device the at least some audio information and the at least some temporally-associated dissimilar-media information that can be received by the at least one other shared audio device. For example, the obtaining shared audio device 101 as described with respect to FIG. 19 receives and utilizes a temporal separator indicator to temporally coordinate the transmitting. The order of the operations, methods, mechanisms, etc. as described with respect to FIGS. 20a, 20b, 20c, 20d, 20e, and 20f are intended to be illustrative in nature, and not limited in scope.

Figure 21:
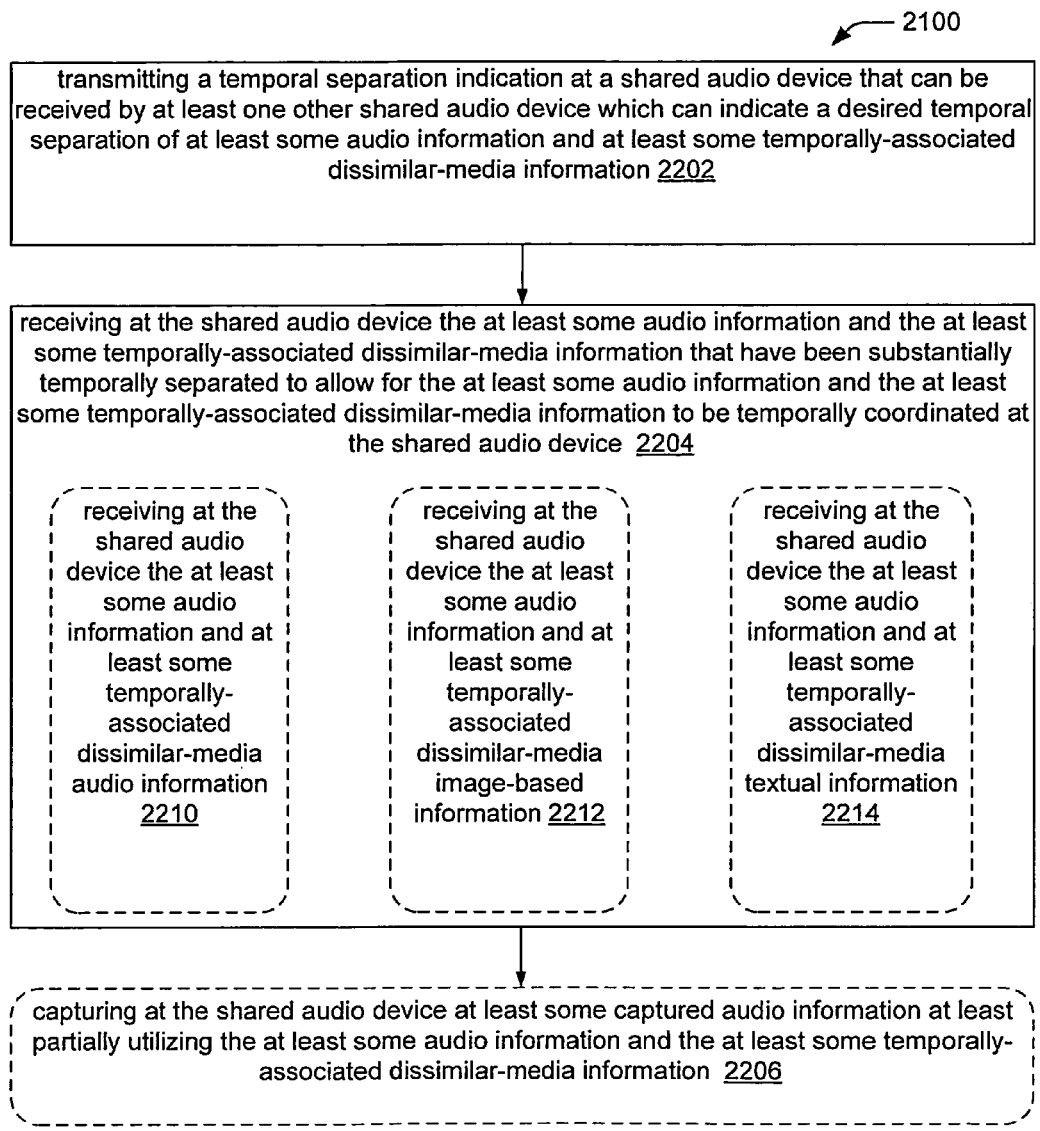
FIG. 21 shows a flow diagram of one embodiment of a sharing technique between multiple shared audio devices as described with respect to FIG. 19.

One embodiment of a high-level flowchart of a processing and/or sharing technique 2200 that is described with respect to FIG. 21 and which includes, but is not limited to, operations 2202 and 2204; in addition to optional operation 2206. Operation 2204 can include, but is not limited to, optional operations 2210, 2212, and/or 2214. The high-level flowchart of FIG. 21 should be considered in combination with the shared audio device 101, as described with respect to FIG. 19. One embodiment of operation 2202 can include, but is not limited to, transmitting a temporal separation indication at a shared audio device that can be received by at least one other shared audio device which can indicate a desired temporal separation of at least some audio information and at least some temporally-associated dissimilar-media information. For example, the shared audio device, such as the obtaining shared audio device 101 as described with respect to FIG. 19, transmits the temporal separation indication that can indicate a desired temporal separation of the at least some audio information, such a shared audio and they at least some temporally-associated dissimilar-media information, to be received by at least one other shared audio device. One embodiment of operation 2204 can include, but is not limited to, receiving at the shared audio device the at least some audio information and the at least some temporally-associated dissimilar-media information that have been substantially temporally separated to allow for the at least some audio information and the at least some temporally-associated dissimilar-media information to be temporally coordinated at the shared audio device. For example, receiving at the obtaining shared audio device 101 as described with respect to FIG. 19 the at least some audio information that is substantially temporally separated with respect to the at least some temporally-associated dissimilar-media information. One embodiment of the receiving at the shared audio device the at least some audio information and the at least some temporally-associated dissimilar-media information of operation 2204 can include operation 2210, that can include, but is not limited to, receiving at the shared audio device the at least some audio information and at least some temporally-associated dissimilar-media audio information. For example, receiving at the obtaining shared audio device 101 as described with respect to FIG. 19 the at least some audio information that is substantially temporally separated with respect to the at least some temporally-associated dissimilar-media audio information. One embodiment of the receiving at the shared audio device the at least some audio information and the at least some temporally-associated dissimilar-media information of operation 2204 can include operation 2212, that can include, but is not limited to, receiving at the shared audio device the at least some audio information and at least some temporally-associated dissimilar-media image-based information. For example, receiving at the obtaining shared audio device 101 as described with respect to FIG. 19 the at least some audio information that is substantially temporally separated with respect to the at least some temporally-associated dissimilar-media image-based information. One embodiment of the receiving at the shared audio device the at least some audio information and the at least some temporally-associated dissimilar-media information of operation 2204 can include operation 2214, that can include, but is not limited to, receiving at the shared audio device the at least some audio information and at least some temporally-associated dissimilar-media textual information. For example, receiving at the obtaining shared audio device 101 as described with respect to FIG. 19 the at least some audio information that is substantially temporally separated with respect to the at least some temporally-associated dissimilar-media textual information. One embodiment of operation 2206 can include, but is not limited to, capturing at the shared audio device at least some captured audio information at least partially utilizing the at least some audio information and the at least some temporally-associated dissimilar-media information. For example, capturing at the obtaining shared audio device 101 as described with respect to FIG. 19 the at least some audio information that is substantially temporally separated with respect to the at least some temporally-associated dissimilar-media information. The order of the operations, methods, mechanisms, etc. as described with respect to FIG. 21 are intended to be illustrative in nature, and not limited in scope.

Figure 22:
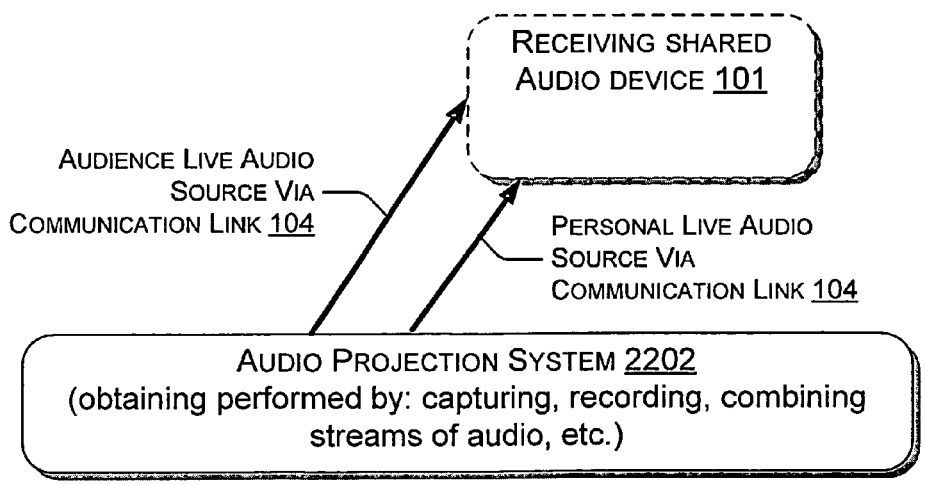
FIG. 22 shows a block diagram of one embodiment of the shared audio device.

FIG. 22 illustrates one embodiment of an audio projection system 2202, that can be configured to provide shared audio and/or temporally-associated dissimilar-media information that can be provided to at least one shared audio device via an audience live audio source and via a personal live audio source. In one embodiment, the audio projection system 2202 can be configured to include a shared audio device 101 (similar to as described in this disclosure) that can transmit shared audio (and can also be configured to perform other operations such as capturing audio, recording audio, etc.).

Figure 23:
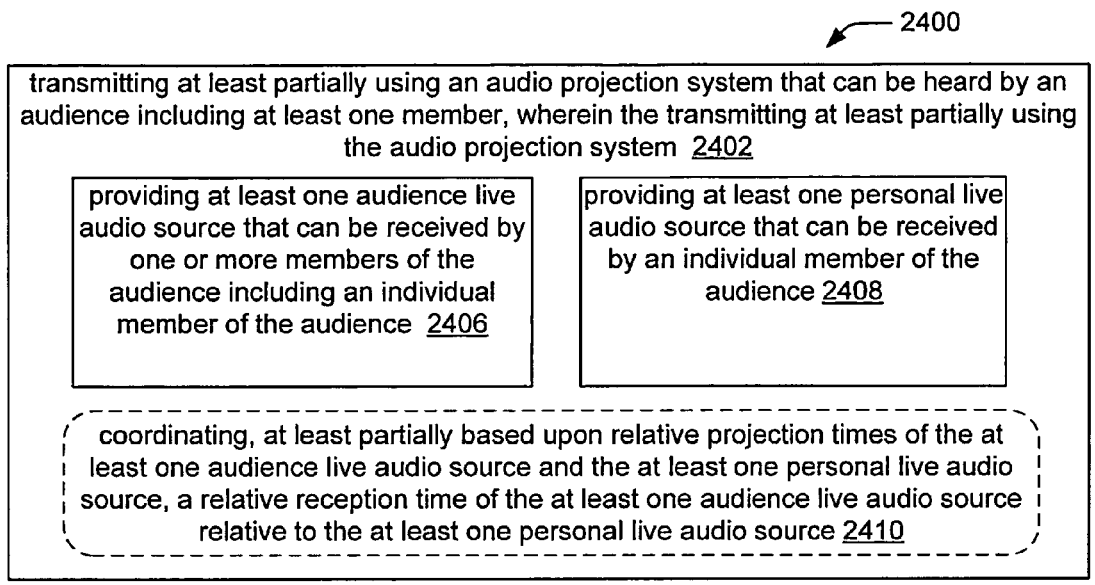
FIG. 23 shows a flow diagram of one embodiment of a transmitting technique that can utilize multiple shared audio devices, similar to as described with respect to FIG. 22.

One embodiment of a high-level flowchart of a processing and/or sharing technique 2400 that is described with respect to FIG. 23 and which includes, but is not limited to, operation 2402. Operation 2402 can include, but is not limited to, operations 2406, 2408, and/or 2410. The high-level flowchart of FIG. 23 should be considered in combination with the shared audio device 101, as described with respect to FIG. 22. One embodiment of operation 2402 can include, but is not limited to transmitting at least partially using an audio projection system that can be heard by an audience including at least one member. For example, the audio projection system 2202, as described with respect to FIG. 22, at least partially transmitting. One embodiment of the transmitting at least partially using the audio projection system of operation 2402 can include operation 2406, that can include, but is not limited to, providing at least one audience live audio source that can be received by one or more members of the audience including an individual member of the audience. For example, transmitting using the audio projection system 2202, as described with respect to FIG. 22, that provides at least one audience live audio source 2204 that can be received by one or more members of the audience. One embodiment of the transmitting at least partially using the audio projection system of operation 2402 can include operation 2408, that can include, but is not limited to, providing at least one personal live audio source that can be received by an individual member of the audience. For example, transmitting using the audio projection system 2202, as described with respect to FIG. 22, that provides at least one personal live audio source 2206 that can be received by one member of the audience. One embodiment of the transmitting at least partially using an audio projection system that can be heard by an audience including at least one member of operation 2402 can include operation 2410, that can include, but is not limited to, coordinating, at least partially based upon relative projection times of the at least one audience live audio source and the at least one personal live audio source, a relative reception time of the at least one audience live audio source relative to the at least one personal live audio source. For example, coordinating the relative reception time of the at least of audience live audio source and the at least one personal live audio source. The order of the operations, methods, mechanisms, etc. as described with respect to FIG. 23 and/or 22 are intended to be illustrative in nature, and not limited in scope.

Figure 24:
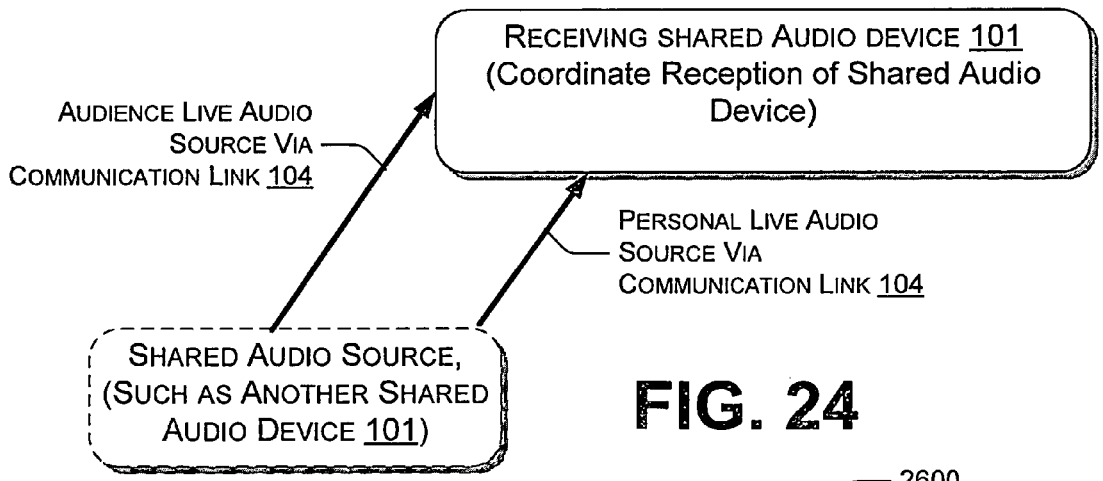
FIG. 24 shows a block diagram of one embodiment of the shared audio device.

FIG. 24 illustrates one embodiment of a receiving shared audio device 101 that can interface with another shared audio device, such as by receiving audience live audio via a communication link 104, and also receiving personal live audio via the communication link. The receiving shared audio device, as well as the other shared audio device, as illustrated in FIG. 24, represent examples of the shared audio devices 101 as described in other portions of this disclosure. Certain embodiments of the receiving shared audio device 101 are configured to coordinate reception of the audience live audio with the personal live audio.

Figure 25:
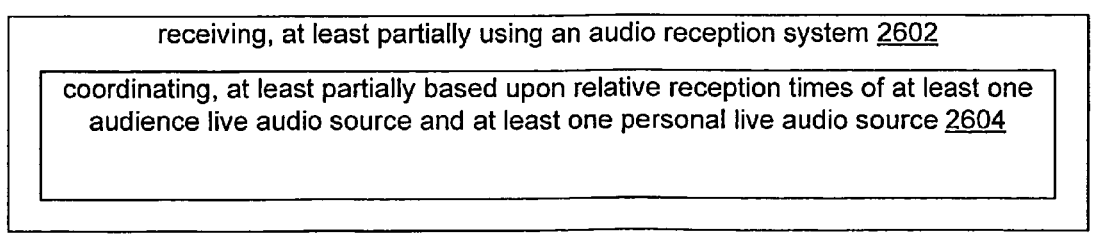
FIG. 25 shows a flow diagram of one embodiment of receiving technique that can utilize multiple shared audio devices, similar to as described with respect to FIG. 24.
Figure 29A:
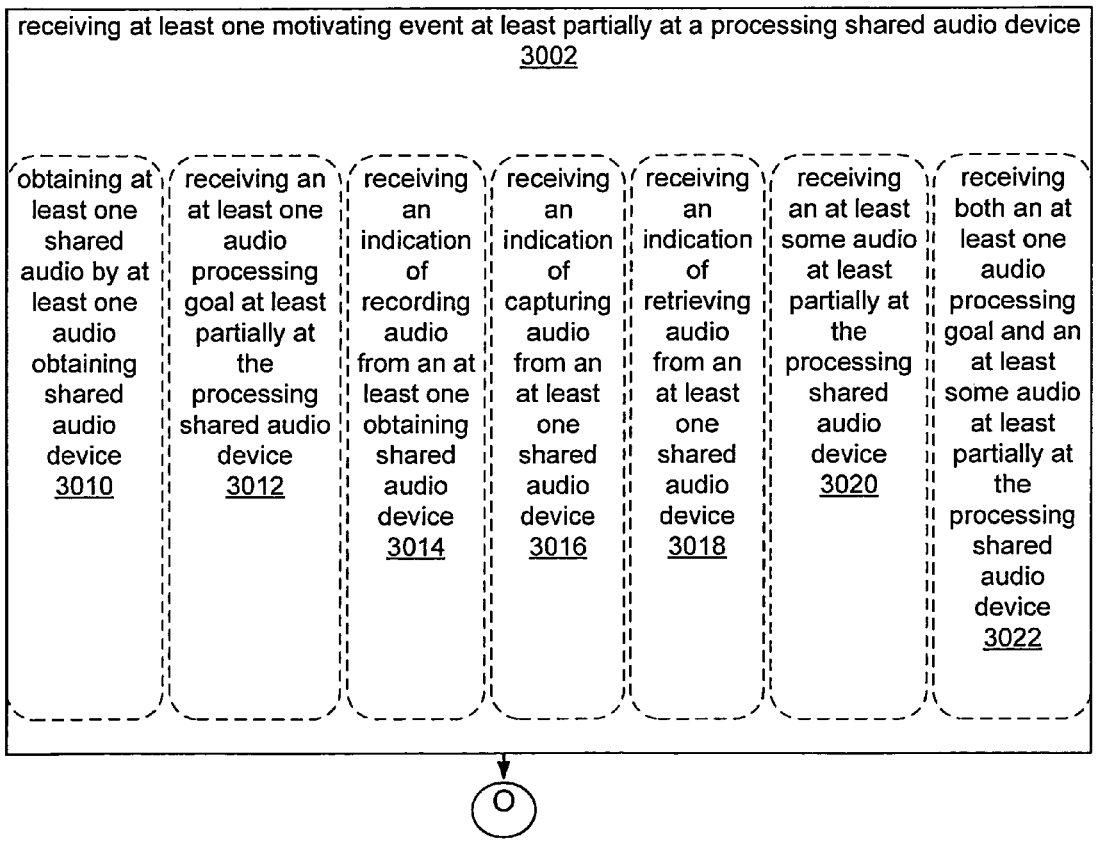
Figure 29B:
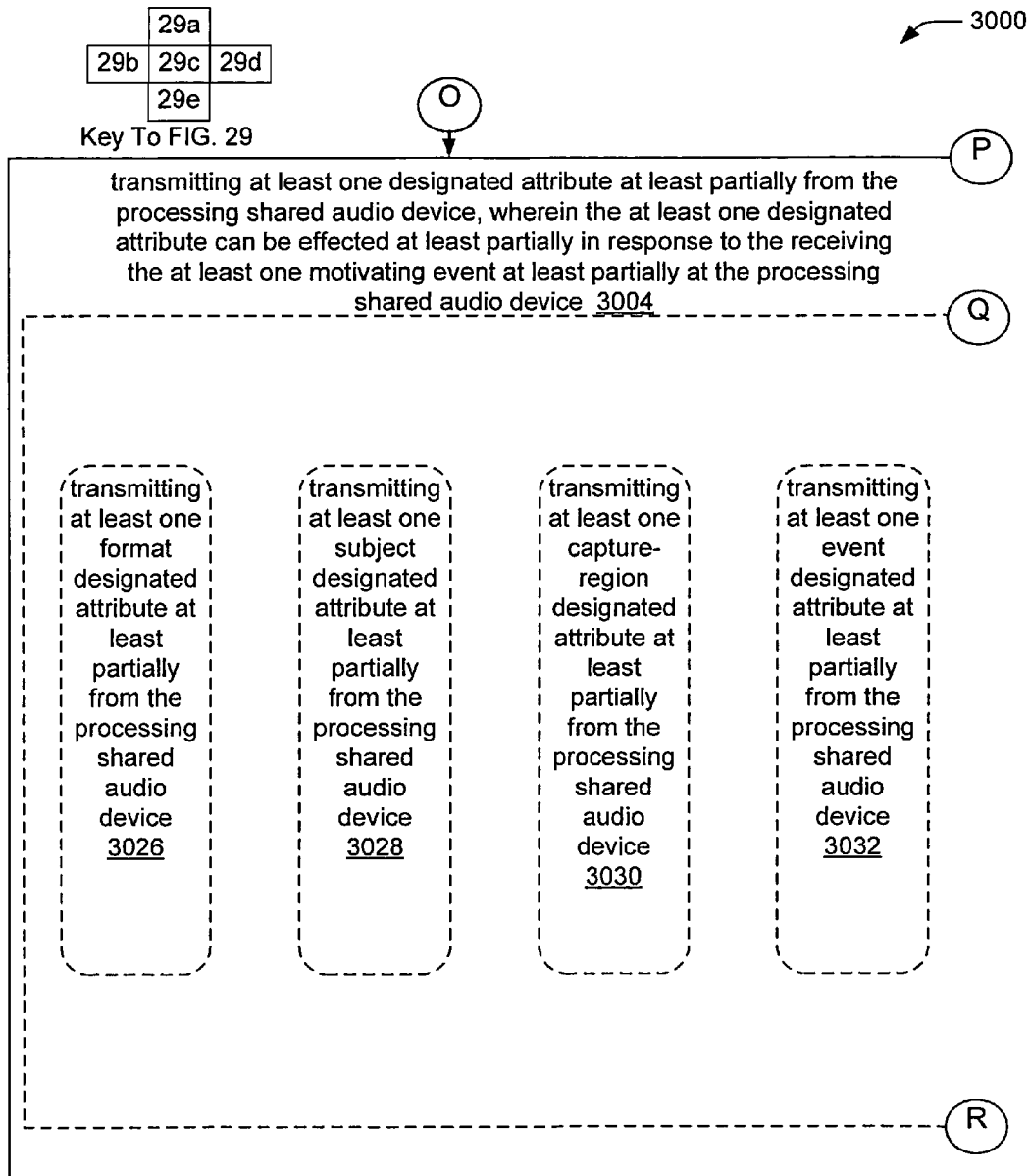
Figure 29D:
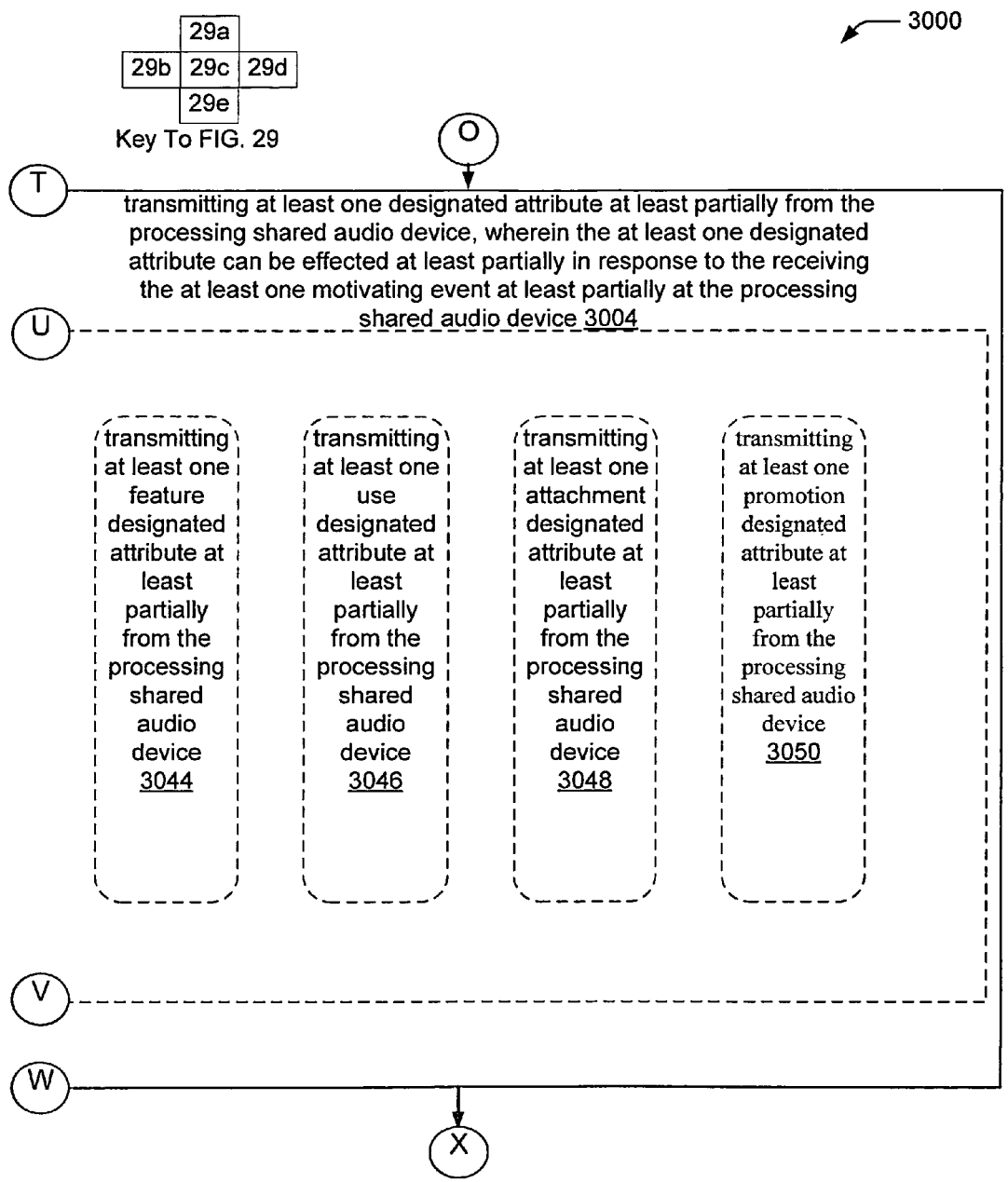
Figure 29E:
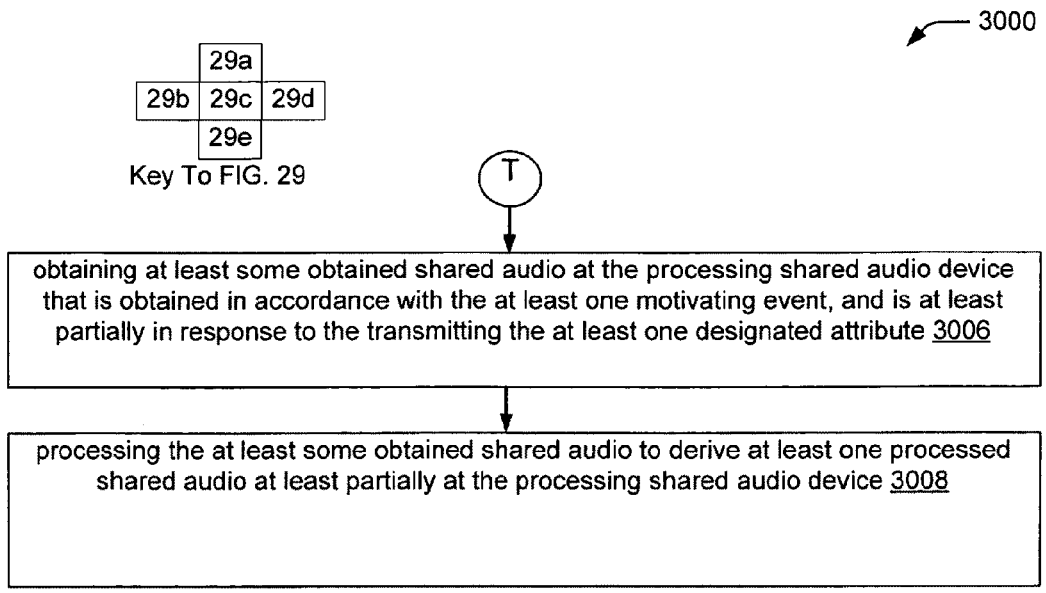

One embodiment of a high-level flowchart of a processing and/or sharing technique 2600 that is described with respect to FIG. 25 and which includes, but is not limited to, operation 2602. Operation 2602 can include, but is not limited to, operation 2604. The high-level flowchart of FIG. 25 should be considered in combination with the shared audio device 101, as described with respect to FIG. 24. One embodiment of operation 2602 can include, but is not limited to, receiving, at least partially using an audio reception system. For example, the shared audio device 101 having an audio reception system receiving at least some shared audio, as described with respect to FIG. 24. The receiving of operation 2602 can include operation 2604, that can include, but is not limited to, coordinating, at least partially based upon relative reception times of at least one audience live audio source and at least one personal live audio source. For example, the receiving shared audio device 101, as described with respect to FIG. 24, can at least partially coordinate the reception of the audience live audio source and the personal live audio source as transmitted over the communication links 104. The order of the operations, methods, mechanisms, etc. as described with respect to FIG. 25 are intended to be illustrative in nature, and not limited in scope.

FIG. 26 illustrates one embodiment of a receiving shared audio device that can be configured to receive shared audio from at least one other shared audio source (such as another shared audio device). The shared audio devices 101, such as a receiving shared audio device, as illustrated in FIG. 26 represent examples of the shared audio device 101 as described within this disclosure, most particularly with reference to FIGS. 1 to 6. In one embodiment, the receiving shared audio device 101 can be configured to control acoustical characteristics of the shared audio as received at the receiving shared audio device. Examples of acoustical characteristics that can be controlled include, but are not limited to, balance, tone, audio fidelity, etc.

One embodiment of a high-level flowchart of a processing and/or sharing technique 2800 that is described with respect to FIG. 27 and which includes, but is not limited to, operations 2802 and 2804; as well as optional operation 2806. The high-level flowchart of FIG. 27 should be considered in combination with the shared image device 101, as described with respect to FIG. 26. Operation 2802 can include, but is not limited to receiving at a personal live audio system, for a member of an audience or a class, at least some shared audio input pertaining to at least some audio relating to a substantially-live captured event. For example, a personal live audio system receives at least some shared audio input (e.g., from a shared audio device). Operation 2804 can include, but is not limited to, controlling acoustical characteristics of at least some substantially live audio as can be provided to a user of the personal live audio system by the personal live audio system, wherein the substantially live audio can be generated at least partially in response to the audio input. For example, controlling acoustical characteristics of at least some substantially live audio (at, for example, a receiving shared audio device). Operation 2806 can include, but is not limited to, allowing a user to access audio corresponding to the at least some shared audio input if the at least some shared audio input satisfies copyright considerations. For example, allowing a user at the receiving shared audio device 101 of FIG. 26 to access audio corresponding to the shared audio input if the shared audio input satisfies copyright considerations. The order of the operations, methods, mechanisms, etc. as described with respect to FIG. 27 are intended to be illustrative in nature, and not limited in scope.

FIG. 28 illustrates one embodiment of the receiving shared audio device 101 that can receive at least one motivating event. Examples of the at least one motivating event can include, but are not limited, to, an indication of a desire to capture or record some shared audio. The shared audio devices 101, such as the processing shared audio device as illustrated with respect to FIG. 28, represent examples of the shared audio device 101 as described in this disclosure, for example with respect to FIGS. 1 to 6. The processing shared audio device should be configured to process a shared audio, and/or other audio or other related information. Certain embodiments of the receiving shared audio device can be configured to transmit at least one designated attribute at least partially from the processing shared device at least partially in response to the receiving the at least one motivating event. Certain embodiments of the processing shared audio device can obtain at least some obtained shared audio obtained in accordance with the motivating event. Certain embodiments of the processing shared audio device can process the at least some obtained shared audio.

One embodiment of a high-level flowchart of a processing and/or sharing technique 3000 that is described with respect to FIGS. 29a to 29e and which includes, but is not limited to, operations 3002, 3004, 3006, and 3008. The high-level flowchart of FIGS. 29a to 29e should be considered in combination with the shared image device 101, as described with respect to FIG. 28. One embodiment of operation 3002 can include, but is not limited to, receiving at least one motivating event at least partially at a processing shared audio device. For example, the processing shared audio device 101 as described with respect to FIG. 28 receives a motivating event, for example, it may be requested to capture or record some audio, or to vary a particular attribute. One embodiment of operation 3004 can include, but is not limited to, transmitting at least one designated attribute at least partially from the processing shared audio device, wherein the at least one designated attribute can be effected at least partially in response to the receiving the at least one motivating event at least partially at the processing shared audio device. For example, a processing shared audio device 101 as described with respect to FIG. 28 transmits at least one designated attribute in response to the motivating event. One embodiment of operation 3006 can include, but is not limited to, obtaining at least some obtained shared audio at the processing shared audio device that is obtained in accordance with the at least one motivating event, and is at least partially in response to the transmitting the at least one designated attribute. For example, obtaining shared audio at a processing shared audio device 101 that is obtained in accordance with the motivating event, as described with respect to FIG. 28. One embodiment of operation 3008 can include, but is not limited to, processing the at least some obtained shared audio to derive at least one processed shared audio at least partially at the processing shared audio device. For example, processing the at least some shared audio at a processing shared audio device, as described with respect to FIG. 28. One embodiment of the receiving at least one motivating event at least partially at a processing shared audio device of operation 3002 can include operation 3010, that can include, but is not limited to, obtaining at least one shared audio by at least one audio obtaining shared audio device. For example, obtaining at least one shared audio using at least one obtaining shared audio device 101 as described with respect to FIG. 28. One embodiment of the receiving at least one motivating event at least partially at a processing shared audio device of operation 3002 can include operation 3012, that can include, but is not limited to, receiving an at least one audio processing goal at least partially at the processing shared audio device. For example, receiving at least one audio processing goal at the processing shared audio device as described with respect to FIG. 28. One embodiment of the receiving at least one motivating event at least partially at a processing shared audio device of operation 3002 can include operation 3014, that can include, but is not limited to, receiving an indication of recording audio from an at least one obtaining shared audio device. For example, the processing shared audio device 101 receives an indication of recording audio from at least one obtaining shared audio device as described with respect to FIG. 28. One embodiment of the receiving at least one motivating event at least partially at a processing shared audio device of operation 3002 can include operation 3016, that can include, but is not limited to, receiving an indication of capturing audio from an at least one shared audio device. For example, the processing shared audio device 101 receives an indication of capturing audio from at least one shared audio device as described with respect to FIG. 28. One embodiment of the receiving at least one motivating event at least partially at a processing shared audio device of operation 3002 can include operation 3018, that can include, but is not limited to, receiving an indication of retrieving audio from an at least one shared audio device. For example, the processing shared audio device 101 as described with respect to FIG. 28 receives indication of retrieving audio. One embodiment of the receiving at least one motivating event at least partially at a processing shared audio device of operation 3002 can include operation 3020, that can include, but is not limited to, receiving an at least some audio at least partially at the processing shared audio device. For example, the processing shared audio device 101 as described with respect to FIG. 28 receives at least some audio. One embodiment of the receiving at least one motivating event at least partially at a processing shared audio device of operation 3002 can include operation 3022, that can include, but is not limited to, receiving both an at least one audio processing goal and an at least some audio at least partially at the processing shared audio device. For example, the processing shared audio device 101, as described with respect to FIG. 28, receives both at least one audio processing goal and at least some shared audio. One embodiment of the transmitting at least one designated attribute of operation 3004 can include operation 3026, that can include, but is not limited to, transmitting at least one format designated attribute at least partially from the processing shared audio device. For example, the processing shared audio device 101, as described with respect to FIG. 28, transmits at least one format designated attribute. One embodiment of the transmitting at least one designated attribute of operation 3004 can include operation 3028, that can include, but is not limited to, transmitting at least one subject designated attribute at least partially from the processing shared audio device. For example, the processing shared audio device 101, as described with respect to FIG. 28, transmits at least one subject designated attribute. One embodiment of the transmitting at least one designated attribute of operation 3004 can include operation 3030, that can include, but is not limited to, transmitting at least one capture-region designated attribute at least partially from the processing shared audio device. For example, the processing shared audio device 101, as described with respect to FIG. 28, transmits at least one capture-region designated attribute. One embodiment of the transmitting at least one designated attribute of operation 3004 can include operation 3032, that can include, but is not limited to, transmitting at least one event designated attribute at least partially from the processing shared audio device. For example, the processing shared audio device 101, as described with respect to FIG. 28, transmits at least one event designated attribute. One embodiment of the transmitting at least one designated attribute of operation 3004 can include operation 3034, that can include, but is not limited to, transmitting at least one cost designated attribute at least partially from the processing shared audio device. For example, the processing shared audio device 101, as described with respect to FIG. 28, transmits at least one cost designated attribute. One embodiment of the transmitting at least one designated attribute of operation 3004 can include operation 3036, that can include, but is not limited to, transmitting at least one rights designated attribute at least partially from the processing shared audio device. For example, the processing shared audio device 101, as described with respect to FIG. 28, transmits at least one rights designated attribute. One embodiment of the transmitting at least one designated attribute of operation 3004 can include operation 3038, that can include, but is not limited to, transmitting at least one creator designated attribute at least partially from the processing shared audio device. For example, the processing shared audio device 101, as described with respect to FIG. 28, transmits at least one creator designated attribute. One embodiment of the transmitting at least one designated attribute of operation 3004 can include operation 3040, that can include, but is not limited to, transmitting at least one owner designated attribute at least partially from the processing shared audio device. For example, the processing shared audio device 101, as described with respect to FIG. 28, transmits at least one owner designated attribute. One embodiment of the transmitting at least one designated attribute of operation 3004 can include operation 3042, that can include, but is not limited to, transmitting at least one size designated attribute at least partially from the processing shared audio device. For example, the processing shared audio device 101, as described with respect to FIG. 28, transmits at least one size designated attribute. One embodiment of the transmitting at least one designated attribute of operation 3004 can include operation 3044, that can include, but is not limited to, transmitting at least one feature designated attribute at least partially from the processing shared audio device. For example, the processing shared audio device 101, as described with respect to FIG. 28, transmits at least one feature designated attribute. One embodiment of the transmitting at least one designated attribute of operation 3004 can include operation 3046, that can include, but is not limited to, transmitting at least one use designated attribute at least partially from the processing shared audio device. For example, the processing shared audio device 101, as described with respect to FIG. 28, transmits at least one use designated attribute. One embodiment of the transmitting at least one designated attribute of operation 3004 can include operation 3048, that can include, but is not limited to, transmitting at least one attachment designated attribute at least partially from the processing shared audio device. For example, the processing shared audio device 101, as described with respect to FIG. 28, transmits at least one attachment designated attribute. One embodiment of the transmitting at least one designated attribute of operation 3004 can include operation 3050, that can include, but is not limited to, transmitting at least one promotion designated attribute at least partially from the processing shared audio device. For example, the processing shared audio device 101, as described with respect to FIG. 28, transmits at least one promotion designated attribute. The order of the operations, methods, mechanisms, etc. as described with respect to FIGS. 29*a*, 29*b*, 29*c*, 29*d*, and 29*e* are intended to be illustrative in nature, and not limited in scope.

Figure 30:
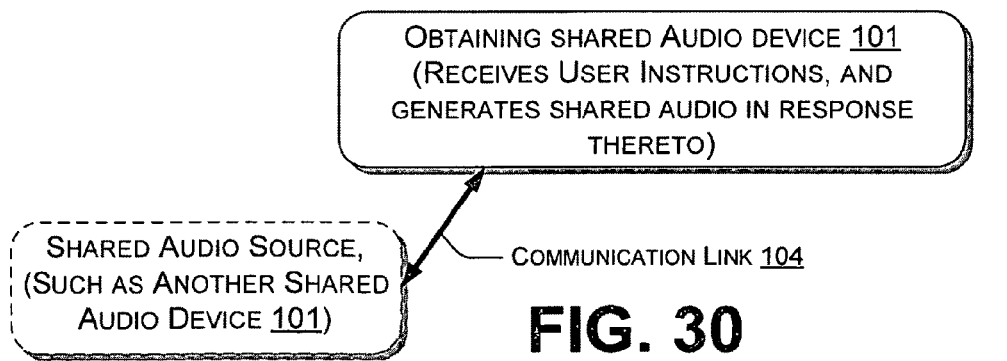
FIG. 30 shows a block diagram of one embodiment of the shared audio device.

One embodiment of an obtaining shared audio device 101, as described with respect to FIG. 30, can be configured to receive the user instructions relating to at least one designated attribute such as over a communication link 104 via another shared audio device 101. Certain embodiments of the user instructions can be used by capturing shared audio devices to indicate particulars about capturing shared audio, such as, and not limited to, desired fidelity, desired balance, audio recording data rate, etc. The obtaining shared audio device 101 can thereupon generate at least some obtained shared audio, such as by recording and/or capturing the shared audio. Certain embodiments of the obtaining shared audio device 101 can thereupon transmit the obtained shared audio to another shared audio device such as over the communication link 104. The shared audio devices 101, as described with respect to FIG. 30, represent examples of shared audio devices as described with respect to FIGS. 1 to 6.

Figure 31:
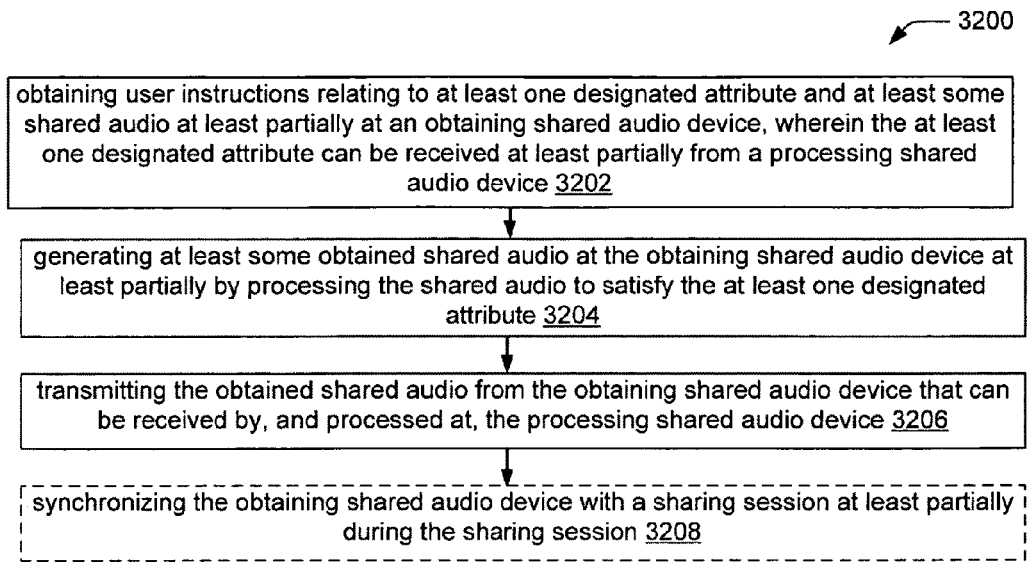
FIG. 31 shows a flow diagram of one embodiment of a processing and/or sharing technique that can utilize multiple shared audio devices, similar to as described with respect to FIG. 30.

One embodiment of a high-level flowchart of a processing and/or sharing technique 3200 that is described with respect to FIG. 31 and which includes, but is not limited to, operations 3202, 3204, and 3206, as well as optional operation 3208. The high-level flowchart of FIG. 31 should be considered in combination with the shared audio device 101, as described with respect to FIG. 30. One embodiment of operation 3202 can include, but is not limited to, obtaining user instructions relating to at least one designated attribute and at least some shared audio at least partially at an obtaining shared audio device, wherein the at least one designated attribute can be received at least partially from a processing shared audio device. For example, an obtaining shared audio device as described with respect to FIG. 30 can obtain users instructions and at least some shared audio. One embodiment of operation 3204 can include, but is not limited to, generating at least some obtained shared audio at the obtaining shared audio device at least partially by processing the shared audio to satisfy the at least one designated attribute. For example, the obtaining shared audio device 101 as described with respect to FIG. 30 generates at least some obtained shared audio that satisfies the designated attribute. One embodiment of operation 3206 can include, but is not limited to, transmitting the obtained shared audio from the obtaining shared audio device that can be received by, and processed at, the processing shared audio device. For example, transmitting the obtained shared audio from the obtaining shared audio device 101, as described with respect to FIG. 30. One embodiment of operation 3208 include, but is not limited to, synchronizing the obtaining shared audio device with a sharing session at least partially during the sharing session. For example, synchronizing the obtaining shared audio device 101, as described with respect to FIG. 30 to a sharing session. The order of the operations, methods, mechanisms, etc. as described with respect to FIG. 31 are intended to be illustrative in nature, and not limited in scope.

Figure 32:
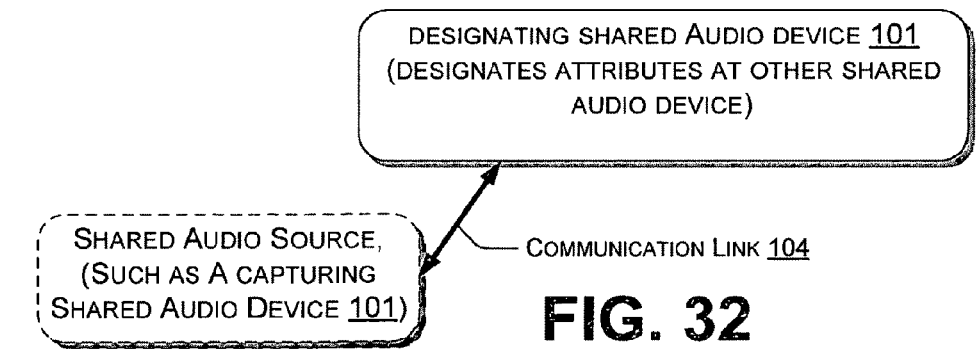
FIG. 32 shows a block diagram of one embodiment of the shared audio device.

FIG. 32 illustrates one embodiment of designating shared audio device 101, that can be configured to designate attribute and other shared audio devices. The designating shared audio device 101 can utilize the communication link 104 to designate to the capturing shared audio device that capture audio. The designating shared audio device and the capturing shared audio device as described with respect to FIG. 32 represent examples of shared audio devices 101, as described with respect to FIGS. 1 to 6. In one embodiment, the designating shared audio device designates an attribute, and the attribute can be at least partially used at the capturing shared audio device to capture at least some shared audio.

Figure 33:
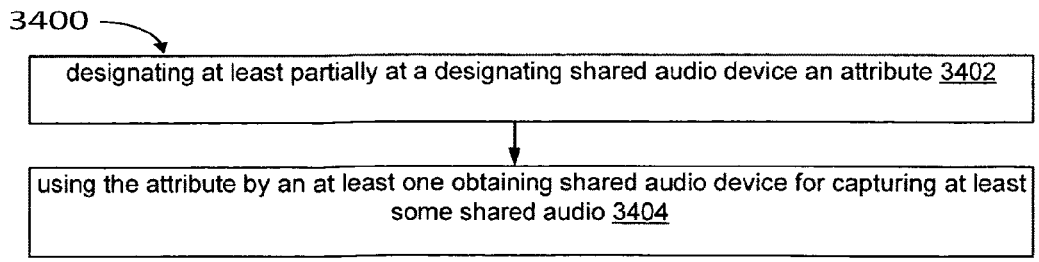
FIG. 33 shows a flow diagram of one embodiment of a processing and/or sharing technique that can utilize multiple shared audio devices, similar to as described with respect to FIG. 32.

One embodiment of a high-level flowchart of a processing and/or sharing technique 3400 that is described with respect to FIG. 33 and which includes, but is not limited to, operations 3402 and 3404. The high-level flowchart of FIG. 33 should be considered in combination with the shared audio device 101, as described with respect to FIG. 32. One embodiment of operation 3402 can include, but is not limited to, designating at least partially at a designating shared audio device an attribute. For example, designating an attribute at least partially at a designating shared audio device 101, as described with respect to FIG. 32. One embodiment of operation 3404 can include, but is not limited to, using the attribute by an at least one obtaining shared audio device for capturing at least some shared audio. For example, the obtaining shared audio device uses the attribute to capture at least some audio to be shared. The order of the operations, methods, mechanisms, etc. as described with respect to FIG. 33 are intended to be illustrative in nature, and not limited in scope.

Figure 34:
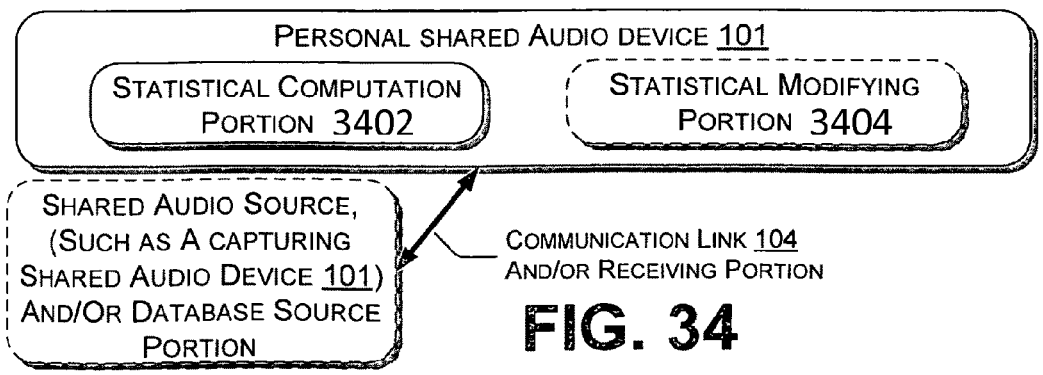
FIG. 34 shows a block diagram of one embodiment of a personal shared audio device that can be configured to perform statistical computations

FIG. 34 illustrates one embodiment of a personal shared audio device that can include, but is not limited to, a statistical computation portion and a receiving portion. The statistical computation portion can be operable to perform statistical arithmetic calculations relative to statistical information. For example, statistical information can represent one embodiment of at least some temporally-associated dissimilar-media information that can be received from another statistical database source, or even another shared audio device. In certain embodiments, the personal shared audio device can include a receiving portion that can be operable to receive shared audio. For example, the receiving portion of the personal shared audio device can receive shared audio or audio information pertaining to an event (sporting, financial, teaching, medical, etc.). Certain embodiments of the personal shared audio device can include a statistical modifying portion by which the statistical information can be modified at least partially in response to the shared audio. For example, during an event, as database information relating to the event (baseball hitter strikes out, etc.), then the statistical database information can be modified accordingly, either based upon user input or automatically by determining according to the shared audio and/or the at least some temporally-associated dissimilar-media information how the statistical information should be modified.

Examples of Authorization Mechanisms

As described in this disclosure, certain embodiments of shared audio devices can be provided with a variety of temporary authorizations to join a particular sharing session such as for a particular live concert, classroom event, presentation, translation, etc. Alternatively, certain shared audio devices can be configured to more permanently share shared audio and/or temporally-associated dissimilar-media information therebetween. It is envisioned that a variety of techniques may be used to provide authorization to certain shared audio devices. These authorization techniques may be made temporary or permanent, and are intended to be illustrative in nature but not limiting in scope.

In one embodiment, the shared audio device can be provided with an attachable transmitter, receiver, and/or transceiver portion that is configured to that particular sharing session. For example, users of shared audio devices entering a classroom event, live concert event, translated event, presentation event, etc. may be provided with shared their individual authorizable transmitter, receiver, and/or transceiver portion prior to the event, and the individual authorizable transmitter, receiver, and/or transceiver portions can be collected following the event.

With other embodiments of shared audio devices, users of the shared audio devices can be provided with an antenna that can transmit and/or receive the shared audio and/or the temporally-associated dissimilar-media information. Certain embodiments of frequency-authorizing antennas can transmit/receive shared audio and/or temporally-associated dissimilar-media information that pertain to a particular sharing session, and following the sharing session, in certain embodiments, the frequency-authorizing antennas can be collected.

With still other embodiments of shared audio devices, authorizing software, hardware, and/or firmware can be integrated within at least certain ones of the shared audio devices that are joining a sharing session. The use of authorization software, hardware, and/or firmware as related to many computer applications is generally understood, and commercially available.

This segment describes a number of embodiments of authorization techniques that can be used with a variety of shared audio devices. These authorization techniques are intended to be illustrative in nature, and not limiting in scope. Other techniques that provide authorization for users/shared audio devices to join particular sharing sessions related to particular events are intended to be within the scope of the present disclosure.

Examples of Controlling Receiving Temporally-Associated Dissimilar-Media Information with Shared Audio There a variety of techniques by which the temporally-associated dissimilar-media information can be associated with the shared audio. Certain of these techniques can be controlled by the transmitting shared audio device, others of the techniques can be controlled by the receiving shared audio device, and yet other techniques can be controlled by combination of the transmitting shared audio device and the receiving shared audio device. The particular roles of certain shared audio devices can be somewhat arbitrary depending at least partially on a particular user(s) of each shared audio device, the role(s) of the user, etc. As such, certain embodiments of shared audio devices can be utilized as a transmitting shared audio device for particular communications and/or particular sharing sessions; and those embodiments of shared audio devices can be utilized as receiving shared audio device for other communications and/or other sharing sessions.

In certain embodiments, a user of the transmitting shared audio device (who may be a teacher, presenter, performer, etc.) can either manually or automatically control transmission of some temporally-associated dissimilar-media information or shared audio (that has been either previously-prepared or concurrently-prepared) to the receiving shared audio device(s). For example, in certain embodiment, a user of the transmitting shared audio device can press a button, or actuate a user interface that might cause the shared audio device to switch to another slide, figure, segment of text, or other temporally-associated dissimilar-media information. In certain embodiments, the user of the transmitting shared audio device can provide a verbal command that can be recognized by certain embodiments of the shared audio devices, such as "next slide", "next classroom equation", "go to FIG. 24 in the text", etc. These commands, however actuated by the transmitting shared audio device, will many embodiments results in a corresponding change in the transmitting shared audio devices, the may be possessed by the students, attendees, sports fans, and other users of the receiving shared audio devices.

In certain embodiments, a user of the receiving shared audio device may control the reception of at least some temporally-associated dissimilar-media information and/or shared audio to be received in the receiving shared audio device. For example, consider that a particular students, concert attendee, sports fans, etc. which is to control the particular information, statistics, etc. that they are going to receive over their shared audio device. As such, the user of a particular receiving shared audio device may input such commands as "display/present only that temporally-associated dissimilar-media information that pertains to figures", "do not store temporally-associated dissimilar-media information that pertains to equations", "record this shared audio", "do not receive this shared audio", etc. as such, it is to be understood that users of many embodiments of the receiving shared audio device can control, to a great degree, the shared audio and/or the temporally-associated dissimilar-media information that they will receive.

It is therefore envisioned that there can be a wide variety of control techniques by which users the transmitting shared audio devices can control the shared audio and/or the temporally-associated dissimilar-media information that can be transmitted by their transmitting shared audio device to other receiving shared audio devices. It is also envisioned that there can be a wide variety of controlled techniques by which users of the receiving shared audio devices can control the shared audio and/or the temporally-associated dissimilar-media information that can be: a) received by their receiving shared audio device, b) presented by their receiving shared audio device, and/or see) stored in their receiving shared audio device that have been transmitted from one or more transmitting shared audio devices.

Certain embodiments of temporally-associated dissimilar-media information can be highly correlated to corresponding shared audio. Alternatively, certain embodiments of temporally-associated dissimilar-media information can be loosely coordinated to corresponding audio. Consider, for example, a large portion of a single lecture that relates to temporally-associated dissimilar-media information configured as a single complex figure, image, text, etc. By comparison, other embodiments of temporally-associated dissimilar-media information can be configured as a brief line in the song or speech provided by an individual. As such, certain embodiments of temporally-associated dissimilar-media information can indicate exactly what is being said or sung by teacher, performer, presenter, etc.; while other embodiments of temporally-associated dissimilar-media information can indicate more general information about the session, the class, a performer, etc.

CONCLUSION

This disclosure provides a number of embodiments of the sharing mechanisms to be associated with one or more shared audio devices that can allow audio that is located at one shared audio device to be transferred to another shared audio device. Different configurations of peripheral shared audio devices and/or obtaining shared audio devices may be combined using networking techniques. Different embodiments of the sharing mechanisms can be included in such embodiments of the shared audio network 100 as digital audio devices, audio recording devices, telecommunication systems, computer systems, video systems, teleconferencing systems, and/or hybrid combinations of certain ones of these systems. The embodiments of the shared audio devices as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer may opt for mainly a hardware and/or firmware vehicle; alternatively, if flexibility is paramount, the implementer may opt for mainly a software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" located prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A method comprising:
   obtaining at least some audio information; and
   transmitting, to at least one device joined in at least one sharing session, at least some dissimilar-media information
      (i) that can be presented by the at least one device in association with the at least some audio information, such that the at least some dissimilar-media information substantially temporally corresponds to the at least some audio information when presented by the at least one device, and
      (ii) that is at least partially selected based on one or more locations of the at least one device.

2. The method of claim 1, wherein the obtaining at least some audio information comprises:
   capturing at least some audio information.

3. The method of claim 1, wherein the obtaining at least some audio information comprises:
   retrieving from storage at least some audio information.

4. The method of claim 1, wherein the obtaining at least some audio information comprises:
   obtaining at least some audio information at least partially using at least one sharing user interface.

5. The method of claim 1, wherein the obtaining at least some audio information comprises:
   capturing, at least partially using at least one sharing user interface, at least some audio information.

6. The method of claim 1, further comprising:
   considering whether the at least some audio information satisfies at least some copyright criteria.

7. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
   transmitting, via at least one communication link and to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device.

8. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
   transmitting, to at least one device joined in at least one sharing session, (A) the at least some audio information and (B) at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device.

9. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
   transmitting, to at least one device joined in at least one sharing session, at least some dissimilar-audio information (i) that can be presented by the at least one device in association with the at least some audio information, such that the at least some dissimilar-audio information substantially temporally corresponds to the at least some audio information when presented by the least one device, and (ii) that is at least partially selected based on one or more locations of the at least one device.

10. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
   transmitting, to at least one device joined in at least one sharing session, at least some image information (i) that can be presented by the at least one device in association with the at least some audio information, such that the at least some image information substantially temporally corresponds to the at least some audio information when presented by the at least one device, and (ii) that is at least partially selected based on one or more locations of the at least one device.

11. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
   transmitting, to at least one device joined in at least one sharing session, at least some non-audio information (i) that can be presented by the at least one device in association with the at least some audio information, such that the at least some non-audio information substantially temporally corresponds to the at least some audio information when presented by the at least one device, and (ii) that is at least partially selected based on one or more locations of the at least one device.

12. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one device joined in at least one sharing session and in response to physical contact with the at least one device, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device.

13. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one device joined in at least one sharing session and via at least one wireless communication link, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device.

14. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one device joined in at least one sharing session and via at least one wired-based communication link, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device.

15. The method of claim 1, further comprising:
 receiving one or more user selections associated with the at least some temporally-associated dissimilar-media information.

16. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device and on one or more user selections.

17. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one device joined in at least one sharing session, at least some textual information (i) that can be presented by the at least one device in association with the at least some audio information, such that the at least some textual information substantially temporally corresponds to the at least some audio information when presented by the at least one device, and (ii) that is at least partially selected based on one or more locations of the at least one device.

18. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one device joined in at least one sharing session, at least some language translation information (i) that can be presented by the at least one device in association with the at least some audio information, such that the at least some language translation information substantially temporally corresponds to the at least some audio information when presented by the at least one device, and (ii) that is at least partially selected based on one or more locations of the at least one device.

19. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one device joined in at least one sharing session, at least some video information (i) that can be presented by the at least one device in association with the at least some audio information, such that the at least some video information substantially temporally corresponds to the at least some audio information when presented by the at least one device, and (ii) that is at least partially selected based on one or more locations of the at least one device.

20. The method of claim 1, wherein the transmitting, to at least one device joined in at least one sharing session, at least some dissimilar-media information (i) that can be presented by the at least one device in association with the at least some audio information, such that the at least some dissimilar-media information substantially temporally corresponds to the at least some audio information when presented by the at least one device, and (ii) that is at least partially selected based on one or more locations of the at least one device comprises:
 transmitting, to at least one phone device joined in at least one sharing session, at least some dissimilar-media information (i) that can be presented by the at least one phone device in association with the at least some audio information, such that the at least some dissimilar-media information substantially temporally corresponds to the at least some audio information when presented by the at least one phone device, and (ii) that is at least partially selected based on one or more locations of the at least one phone device.

21. A system comprising:
 at least one article of manufacture bearing one or more instructions for facilitating a process including at least:
 obtaining at least some audio information; and
 transmitting, to at least one device joined in at least one sharing session, at least some dissimilar-media information
  (i) that can be presented by the at least one device in association with the at least some audio information, such that the at least some dissimilar-media information substantially temporally corresponds to the at least some audio information when presented by the at least one device, and
  (ii) that is at least partially selected based on one or more locations of the at least one device.

22. A system comprising:
 circuitry configured for obtaining at least some audio information; and
 circuitry configured for transmitting, to at least one device joined in at least one sharing session, at least some dissimilar-media information
  (i) that can be presented by the at least one device in association with the at least some audio information, such that the at least some dissimilar-media information substantially temporally corresponds to the at least some audio information when presented by the at least one device, and
  (ii) that is at least partially selected based on one or more locations of the at least one device.

\* \* \* \* \*